US006955210B2

(12) United States Patent

Matsuura et al.

(10) Patent No.: US 6,955,210 B2

(45) Date of Patent: Oct. 18, 2005

(54) MOLDING DIE AND DIE CHANGING METHOD OF THE SAME

(75) Inventors: Yoshiki Matsuura, Aichi-ken (JP); Tsukasa Kato, Aichi-ken (JP); Ikuo Suzuki, Aichi-ken (JP); Yukio Hamada, Aichi-ken (JP); Masakatsu Kondo, Aichi-ken (JP); Toru Funahashi, Aichi-ken (JP); Kazuya Matsunaga, Aichi-ken (JP); Hideaki Sukesada, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 10/325,855

(22) Filed: Dec. 23, 2002

(65) Prior Publication Data

US 2003/0150586 A1 Aug. 14, 2003

(30) Foreign Application Priority Data

| | | |
|---|---|---|
| Dec. 26, 2001 | (JP) | 2001-394717 |
| Dec. 26, 2001 | (JP) | 2001-395215 |
| Oct. 31, 2002 | (JP) | 2002-317814 |

(51) Int. Cl.[7] .......... B22D 33/04

(52) U.S. Cl. .......... 164/339; 164/341; 164/342; 164/312

(58) Field of Search .......... 164/339, 341, 164/342, 312, 137, 113

(56) References Cited

U.S. PATENT DOCUMENTS

| | | | | |
|---|---|---|---|---|
| 4,953,614 A | * | 9/1990 | Lemper | 164/416 |
| 5,080,576 A | * | 1/1992 | Bethurum et al. | 425/577 |
| 5,623,984 A | * | 4/1997 | Nozaki et al. | 164/457 |
| 6,422,297 B2 | * | 7/2002 | Salata | 164/312 |

FOREIGN PATENT DOCUMENTS

| | | |
|---|---|---|
| DE | 42 19 920 | 1/1993 |
| DE | 100 33 207 | 12/2001 |
| JP | 01-271213 | 10/1989 |
| JP | 06-190531 | 7/1994 |
| JP | 09-070653 | 3/1997 |
| JP | 09-122871 | 5/1997 |

OTHER PUBLICATIONS

*Giesserei–Erfahrungsaustausch* [Exchange of experience in Foundry], 1999, 4, pp. 165–167.

* cited by examiner

*Primary Examiner*—Kiley Stoner
*Assistant Examiner*—I.-H. Lin
(74) *Attorney, Agent, or Firm*—Finnegan, Henderson, Farabow, Garrett & Dunner, LLP

(57) ABSTRACT

The invention provides a molding die in which a whole or a part of an exclusive portion forming a cavity can be swiftly changed while leaving a general portion in a molding machine. A fixed insert, a movable insert, a pressing plate and a slide core which correspond to an exclusive portion can be automatically attached to and detached from a fixed main die, a movable main die, a pressing rod and a slide holder which correspond to a general portion by an attaching and detaching mechanism. Further, the fixed insert, the movable insert, the pressing plate and the slide core can be integrated in a die close state by a connection mechanism. By utilizing cross-feed means of a die changing apparatus and a die opening and closing motion on a molding machine side, the exclusive portion is automatically removed from the general portion in a form of an assembly, and the exclusive portion assembly which is transferred into the molding machine from outside the molding machine is automatically mounted to the general portion.

19 Claims, 33 Drawing Sheets

MOLDING DIE AND DIE CHANGING METHOD OF THE SAME

BACKGROUND OF THE INVENTION

1. Field of the Invention

The present invention relates to a molding die which is used for an injection molding, a blow molding and the like in addition to various kinds of casting such as a die casting, a low pressure die casting, a gravity casting and the like, and a die changing method of the same.

2. Description of the Related Art

In a recent production line, a large item small scale production is generalized, and a cycle for replacing a die has become significantly short. Further, a product formed by the casting, the injection molding or the like is becoming more complex or larger in size, which makes it impossible to avoid shortening of a service life of the die, thereby increasing a frequency of replacement. In particular, in the die casting, since a high temperature molten metal is charged within the die at a high speed and a high pressure, the die is seriously damaged, thus requiring highly frequent replacement of the die.

Therefore, recently, die constituting elements such as a fixed die, a movable die and the like are separated into a commonly formed general portion and an exclusive portion forming a cavity, so that the die changing is performed by replacing only the exclusive portion (for example, Japanese Patent Laid-Open Publication Nos. 9-70653, 9-122871 and 1-271213, and the like).

However, in accordance with the conventional die changing method in which only the exclusive portion is replaced, the general portion and the exclusive portion are integrally removed from a molding machine, and are taken to outside the molding machine, and then the exclusive portion is replaced. Accordingly, in this case, a troublesome work of taking out the general portion from the molding machine still remains, and particularly in the case of the die for the die casting, it is necessary to attach and detach a complex cooling system for cooling inside the die and a control system, and there is a problem that a die changing time can not be totally shortened significantly. Further, for example, obtaining a large-sized die cast product with a complex structure such as a cylinder block, requires a slide, and thus the total die becomes heavy (196 kN (about 20 tons) for one example) and large in size (about 2 m for one example). As a result, not only has it become extremely troublesome to take out the die from the molding machine, but also it is necessary to take out and insert a tie bar connecting a fixed portion to a movable portion, creating a problem that only extremely little effect can be obtained in shortening of the die changing time.

Meanwhile, in a structure disclosed in Japanese Patent Laid-Open Publication No. 6-190531, only a part (a core) of the exclusive portion is replaced while leaving the general portion in the molding machine. According to this structure, however, since the exclusive portion is fastened by bolts, it is necessary to perform the fastening operation within the molding machine with a limited space, and a deterioration in workability and a unsafe operation can not be avoided. Further, since the bolts are tightened to the exclusive portion from a front surface thereof, this structure can not be applied to the exclusive portion whose front surface constitutes the cavity forming surface, thereby limiting an applicable range of such structure.

SUMMARY OF THE INVENTION

The present invention is made in consideration of the problems mentioned above, and an object of the present invention is to provide a molding die in which a whole or a part of an exclusive portion forming a cavity can be swiftly changed while leaving a general portion in a molding machine, and a die changing method of the same.

In order to achieve the object mentioned above, according to a molding die and a die changing method thereof in accordance with the present invention, in a die constituted by a commonly formed general portion and an exclusive portion forming a cavity, the exclusive portion is automatically attached to and detached from the general portion mounted to a molding machine by an attaching and detaching mechanism.

By attaching and detaching the exclusive portion with respect to the general portion mounted to the molding machine as mentioned above, not only the troublesome work of taking out the general portion from the molding machine or mounting the general portion to the molding machine can be eliminated, but also a work of transferring the general portion inside and outside the molding machine can be eliminated. Further, since the exclusive portion is automatically attached to and detached from the general portion by the attaching and detaching mechanism, the troublesome fastening work can also be eliminated.

The molding die desirably structured such that each of a fixed die and a movable die fits an insert corresponding to the exclusive portion to a recess portion provided in a main die corresponding to the general portion, and the attaching and detaching mechanism is arranged between a bottom portion of the recess portion in the main die and a back surface portion of the insert. With this structure, since the attaching and detaching mechanism does not protrude to peripheries of the general portion and the exclusive portion, the overall structure can be made simple. In this case, since the attaching and detaching mechanism can be a simple structure and compact in size, it is desirable to employ a clamp apparatus which engages and inserts a T-shaped clamper extended from each of the main dies into a T-shaped slot provided in a back surface portion of the insert so as to clamp the insert within the recess portion of the main die.

This molding die may be structured such that at least the recess portion of the main die and the portion of the insert fitted to the recess portion are formed in a rectangular shape, a wedge member is floatably arranged along two adjacent wall surfaces within the recess portion of the main die in a fitting direction, a taper surface formed on a side surface of the insert is wedged to the wedge member, and remaining two surfaces of the insert are closely contacted with remaining two wall surfaces within the recess portion. Accordingly, a positioning accuracy of the insert with respect to the main die can be improved.

Further, this molding die may be structured such that at least the insert on the movable die side is provided with pressing guide means elastically brought into contact with the wall surface of the recess portion in the corresponding main die. Accordingly, it is possible to set a large clearance between the recess portion of the main die and the insert.

Further, this molding die may be structured such that a high-hardness material is arranged on a portion, which is susceptible to galling, of an inner wall surface of the recess portion in the main die. Accordingly, a durability of the main die and the insert is improved.

In this molding die, the types of the die constituting elements to be formed as the general portion and the exclusive portion are not particularly specified. However, in the case that pressing means for knocking out the molded product is included, the pressing means is constituted by a pressing rod corresponding to the general portion and a pressing plate, corresponding to the exclusive portion, on which a pressing pin stands erect. The pressing rod is arranged so as to penetrate through the main die on the movable die side, and the pressing plate is arranged between the main die on the movable die side and the insert.

Further, in the case that a slide which moves in a direction intersecting the die clamping direction is included, the slide is constituted by a slide holder corresponding to the general portion and a slide core corresponding to the exclusive portion. In this case, a slide attaching and detaching mechanism which automatically attaches and detaches the slide core and the slide holder may be a floating type clamp apparatus which provides floatable connection, or a rigid connection type clamp apparatus which provides rigid connection. With the floating type clamp apparatus, at a time of inserting the slide core to a die close position, the slide core is floated so as to be inserted smoothly. With the rigid connection type clamp apparatus, since the slide core and the slide holder are connected in a rigid manner, the slide core can be taken out smoothly without being inclined at a time of opening the die after casting.

Further, in the case that a cooling water passage is provided in the exclusive portion, a pipe joint which communicates the cooling water passage with a water passage within the general portion or shutting off the communication in correspondence to the attachment and detachment of the exclusive portion with respect to the general portion is arranged between the general portion and the exclusive portion.

Further, in the case that the exclusive portion includes a core pin such as a cast pin or the like, it is desirable to attach an elastic ring, that is frictionally in contact with the core pin to restrict the core pin from coming off, to an inner surface of an insertion hole of the core pin provided in the exclusive portion.

Further, in the case that the exclusive portion includes a pressure pin, a cylinder for driving the pressure pin is inserted in the exclusive portion, and a pipe joint which communicates the cylinder with a fluid pressure source or shutting off the communication in correspondence to the attachment and detachment of the exclusive portion with respect to the general portion is arranged between the exclusive portion and the general portion.

A molding die and a die changing method of the same in accordance with the present invention may be structured such that a connection mechanism for automatically integrating exclusive portions in a die close state is provided between the exclusive portions, whereby die changing is performed with the exclusive portions integrated in the die close state. In the case of integrating the exclusive portions by the connection mechanism and performing the die changing, it is not necessary to attach and detach the exclusive portions individually with respect to the general portion, thereby enabling efficient die changing.

In this case, in the die changing method mentioned above, the structure may be made such that the used exclusive portions are integrated with each other by utilizing a die opening and closing motion of the molding machine so as to be taken out from the general portion, and a new exclusive portion which is previously integrated outside the molding machine is brought in the molding machine. Then, each of the exclusive portions is attached to the general portion by utilizing the die opening and closing motion, and the connection between the exclusive portions is automatically cancelled. Accordingly, it is possible to perform the die changing more efficiently.

As described above, in accordance with the molding die and the die changing method thereof of the present invention, it is possible to swiftly change the whole or a part of the exclusive portion forming the cavity while leaving the general portion in the molding machine, thereby allowing to swiftly deal with the large item small scale production, the early wear of the die and the like.

Further, in the case of die changing with the exclusive portions being integrated, a time required for the die changing is further shortened, providing a great effect.

DESCRIPTION OF THE PREFERRED EMBODIMENTS

A description will be given below of embodiments in accordance with the present invention with reference to the accompanying drawings.

Figure 3:
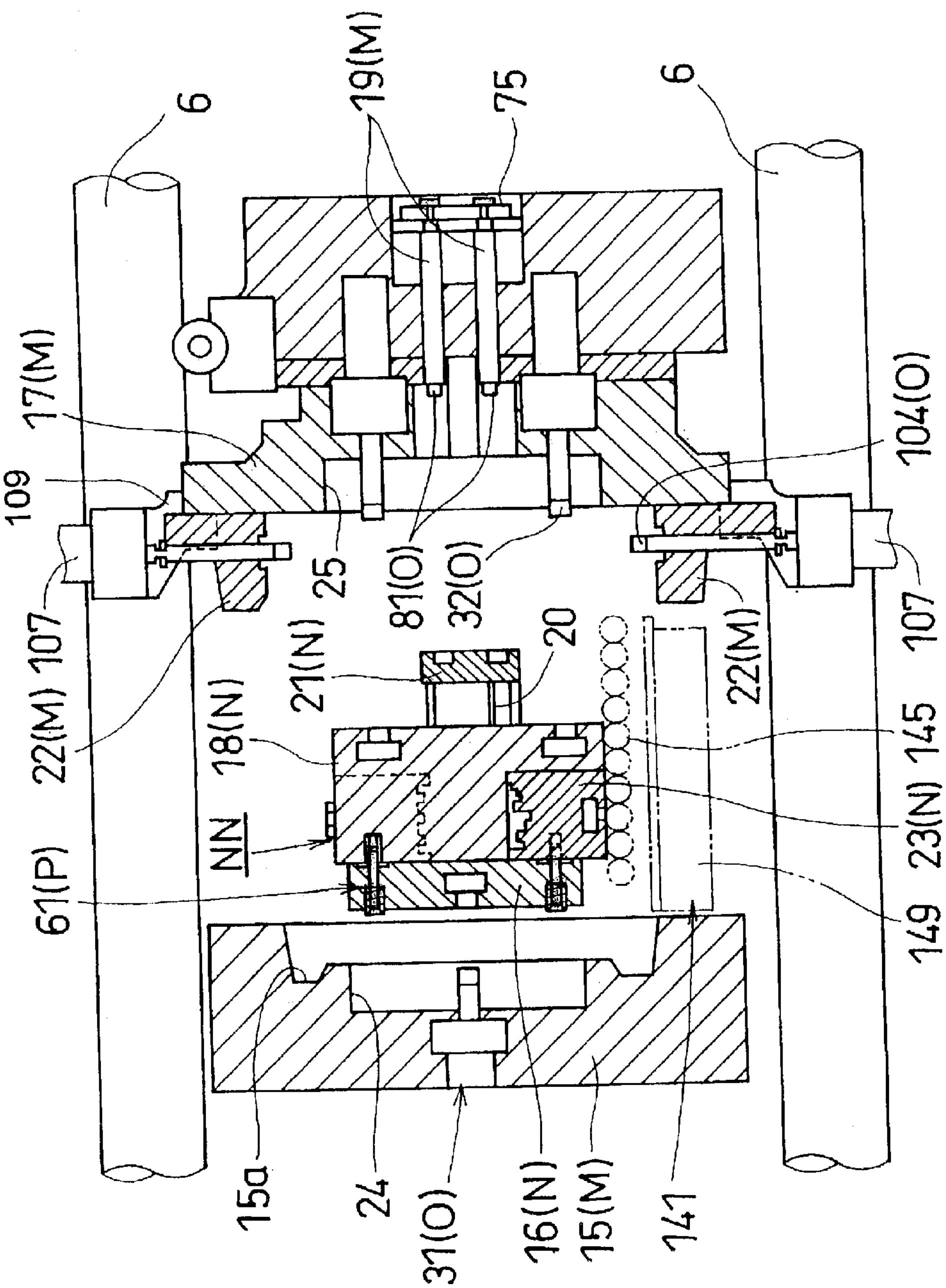
FIG. 3 is a cross sectional view which shows the overall structure of the molding die during die changing.
Figure 4:
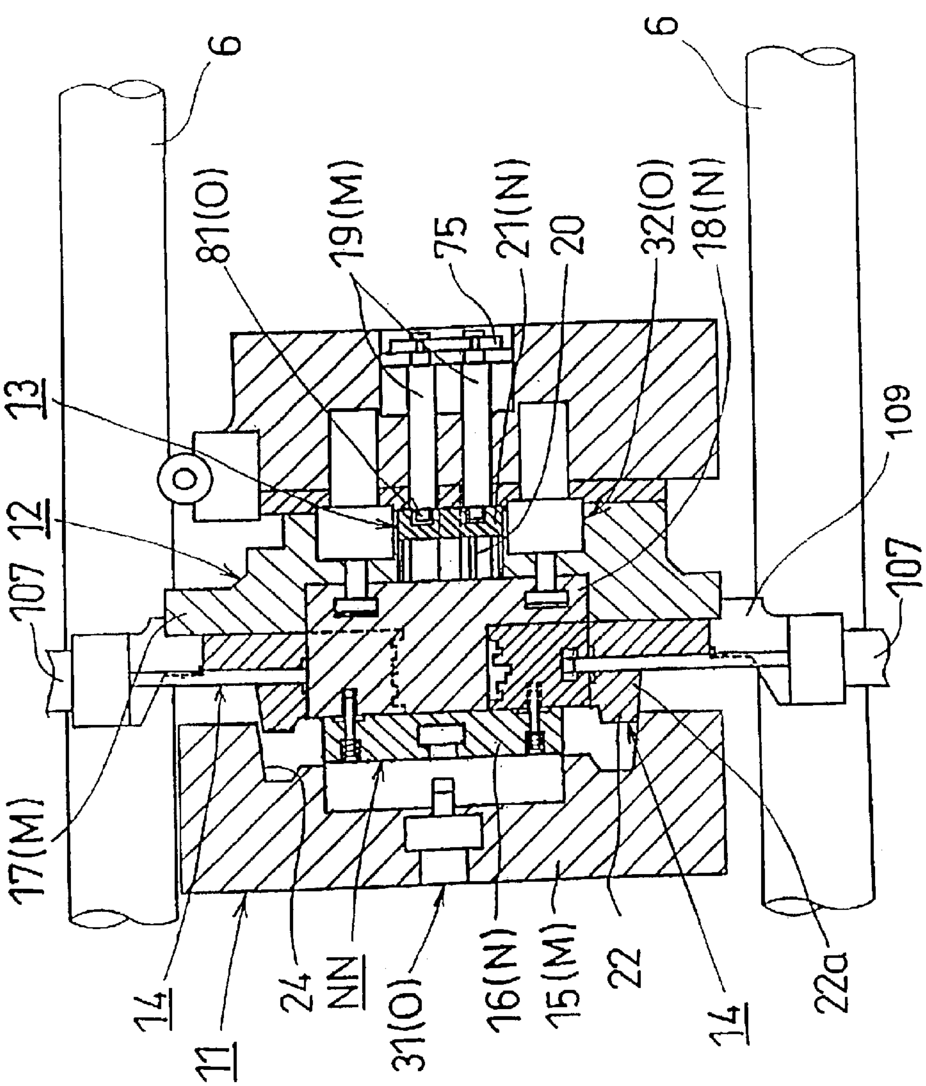
FIG. 4 is a cross sectional view which shows the overall structure of the molding die during die changing.
Figure 5:
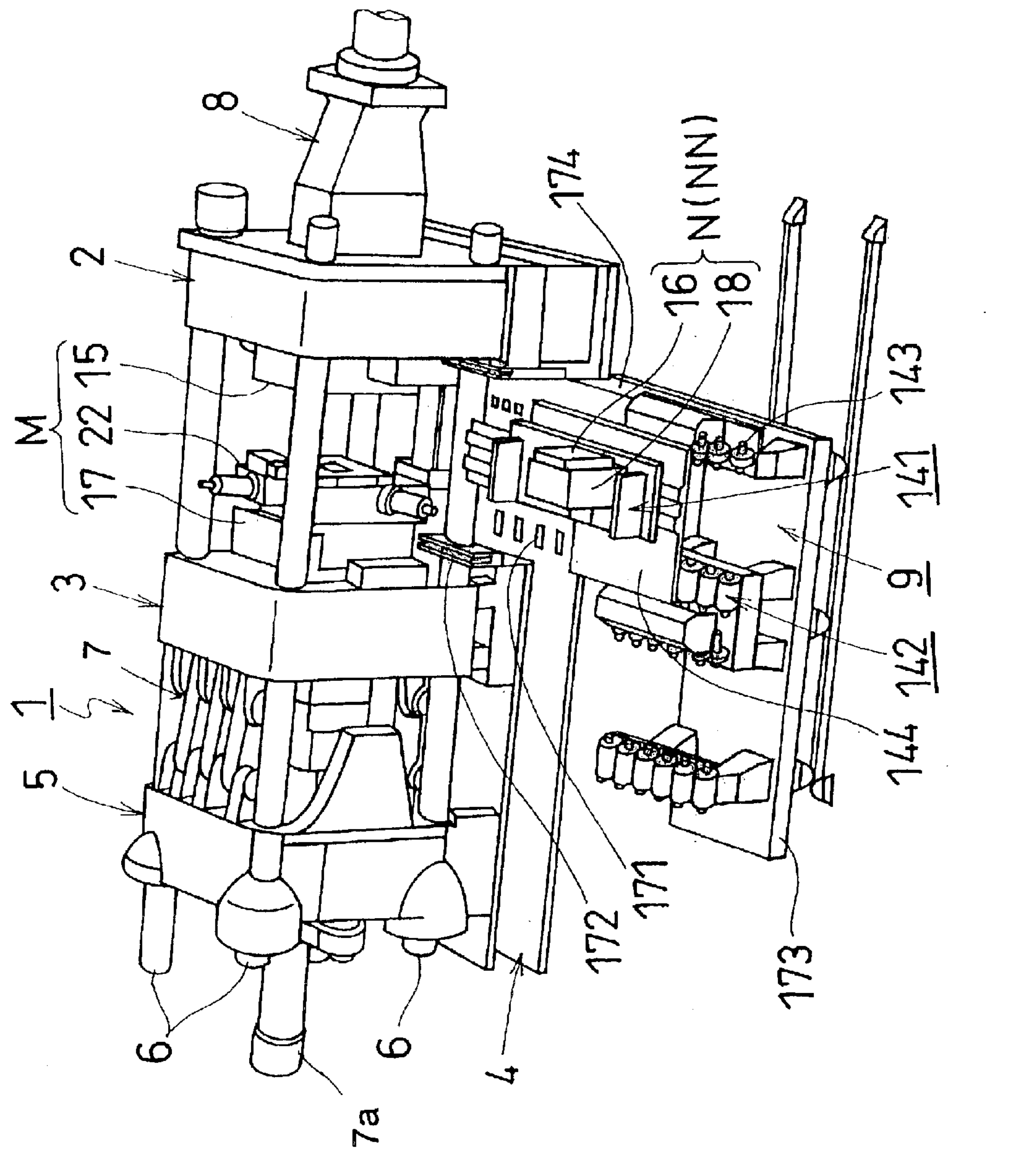
FIG. 5 is a perspective view which shows an overall structure of a die casting machine including the molding die.

FIGS. 1 to 4 show an overall structure of a molding die corresponding to one embodiment in accordance with the present invention. The embodiment is structured as a die casting die which is provided in a horizontal die casting machine (molding machine), and is generally constituted by a fixed die 11 mounted to a fixed platen 2 of a die casting machine (hereinafter, simply referred to as a machine) 1 shown in FIG. 5, a movable die 12 mounted to a movable platen 3 of the machine 1, and pressing means 13 and a plurality of (four) slides 14 that are attached to the movable die 12. The movable platen 3 of the machine 1 is slidably supported to four tie bars 6 which are bridged between the fixed platen 2 arranged at one end portion on a stand 4 and a fixed table 5 arranged at the other end portion on the stand 4. Further, the movable platen 3 is driven by a toggle type die clamping mechanism 7, whose drive source is a die clamping cylinder 7*a* provided in the fixed table 5. According to this drive, the movable die 12 is selectively positioned to a die close state (FIG. 2) in which the movable die 12 is aligned with the fixed die 11 and a die open state (FIG. 1) in which the movable die 12 is apart from the fixed die 11 by a predetermined distance. In FIG. 5, reference numeral 8 denotes an injection cylinder, which is provided in a back surface side of the fixed platen 2, for injecting a molten metal into the die. Reference numeral 9 denotes a die changing apparatus for changing the die, which is described below.

Each of the fixed die 11, the movable die 12, the pressing means 13 and the slide 14 mentioned above is separated into a commonly formed general portion M and an exclusive portion N forming a cavity. More specifically, the fixed die 11 is constituted by a main die 15 corresponding to the general portion M and an insert 16 corresponding to the exclusive portion N. The movable die 12 is constituted by a main die 17 corresponding to the general portion M and an insert 18 corresponding to the exclusive portion N. The pressing means 13 is constituted by a pressing rod 19 corresponding to the general portion M and a pressing plate 21, on which a pressing pin 20 stands erect, corresponding to the exclusive portion N. The slide 14 is constituted by a slide holder 22 corresponding to the general portion M and a slide core 23 corresponding to the exclusive portion N. Further, these exclusive portions N are automatically attached and detached with respect to the corresponding general portions M by attaching and detaching mechanisms O, and the exclusive portions N are automatically integrated with each other by a connection mechanism P. According to the casting die structured as described above, the exclusive portions N can be changed as one assembly NN (FIGS. 3 and 4) while leaving the general portions M in the machine 1. Hereinafter, a description will be given of a detailed structure for achieving such die changing.

The aforementioned fixed die 11 and movable die 12 are respectively structured such that the inserts 16 and 18 are fitted to recess portions 24 and 25 provided in the main dies 15 and 17, and, in this state, the inserts 16 and 18 are attached and detached to and from the main dies 15 and 17, respectively, by the attaching and detaching mechanisms O provided between bottom portions of the recess portions 24 and 25 and back surface portions of the inserts 16 and 18.

Figure 6:
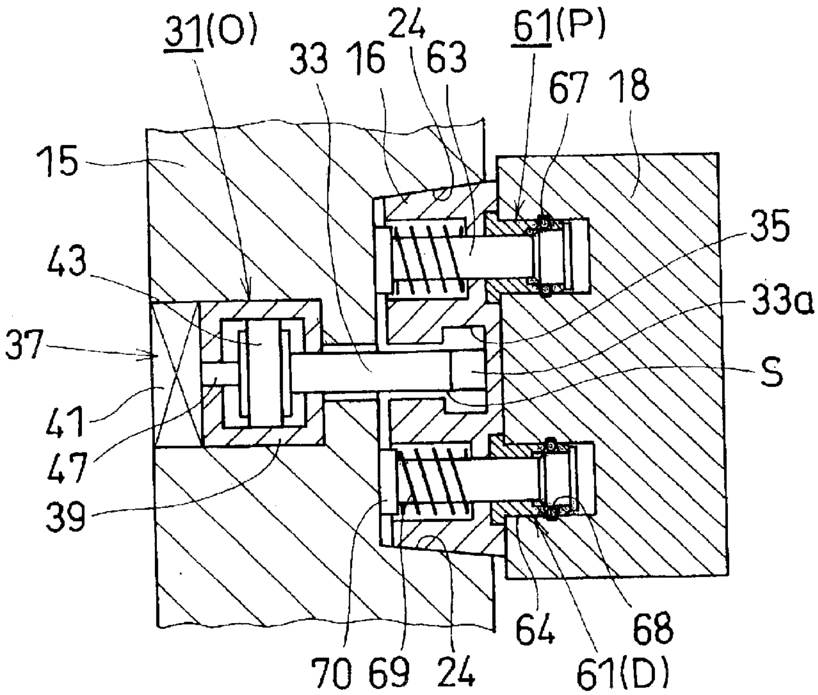
FIG. 6 is a cross sectional view which shows one embodiment of an attaching and detaching mechanism between a general portion and an exclusive portion and a connection mechanism between the exclusive portions, both of which are provided in the molding die.
Figure 7:
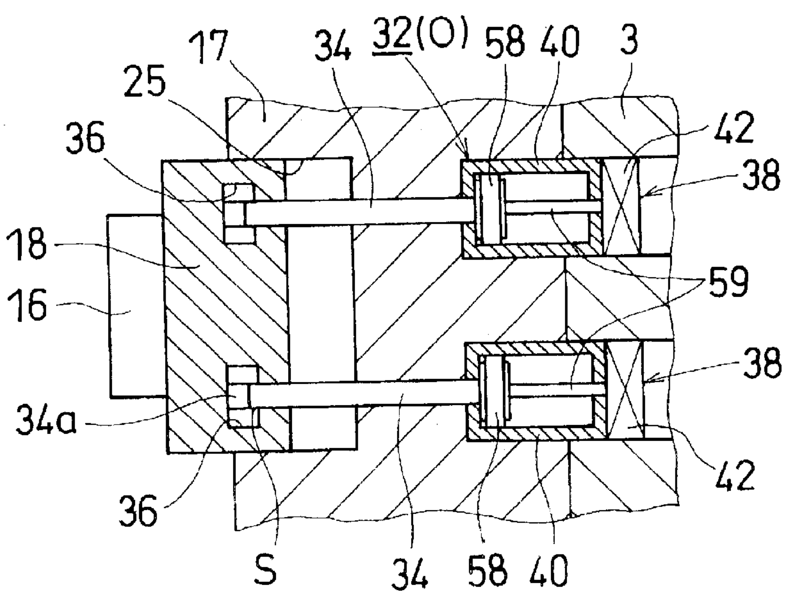
FIG. 7 is a cross sectional view which shows the attaching and detaching mechanism on a movable die side, which is provided in the molding die.

The attaching and detaching mechanisms (the insert attaching and detaching mechanisms) O for attaching and detaching the respective inserts 16 and 18 to and from the respective main dies 15 and 17 are constituted by clamp apparatuses 31 and 32 in this case. The clamp apparatuses 31 and 32 are structured, as shown in FIGS. 6 and 7, such that the inserts 16 and 18 are clamped within the recess portions 24 and 25 of the main dies 15 and 17 by engaging and inserting T-shaped clampers 33 and 34 extended from the respective main dies 15 and 17 into T-shaped slots 35 and 36 provided in back surface portions of the inserts 16 and 18. Actuators 37 and 38 for driving the T-shaped clamper 33 and 34 are constituted by cylinders (clamping cylinders) 39 and 40 for moving the T-shaped clampers 33 and 34 in an axial direction, and rotary mechanisms 41 and 42 for rotating the T-shaped clampers 33 and 34. The clamping cylinders 39 and 40 and the rotary mechanisms 41 and 42 are built in the corresponding main dies 15 and 17. The clamp apparatuses 31 and 32 including the T-shaped clampers 33 and 34, the cylinders 39 and 40 and the rotary mechanisms 41 and 42 are provided, in plurality, in the fixed die 11 and the movable die 12. However, particularly with respect to the clamp apparatus 32 of the movable die 12, four clamp apparatuses are provided in this case because a great drawing force is required as described below.

Basic structures of the clamping cylinders 39 and 40 and the rotary mechanisms 41 and 42 which constitute the actuators 37 and 38 are substantially the same between the fixed die 11 side and the movable die 12 side. To take the actuator 37 on the fixed die 11 side as an example, the structure is as shown in FIGS. 8 and 9.

Figure 8:
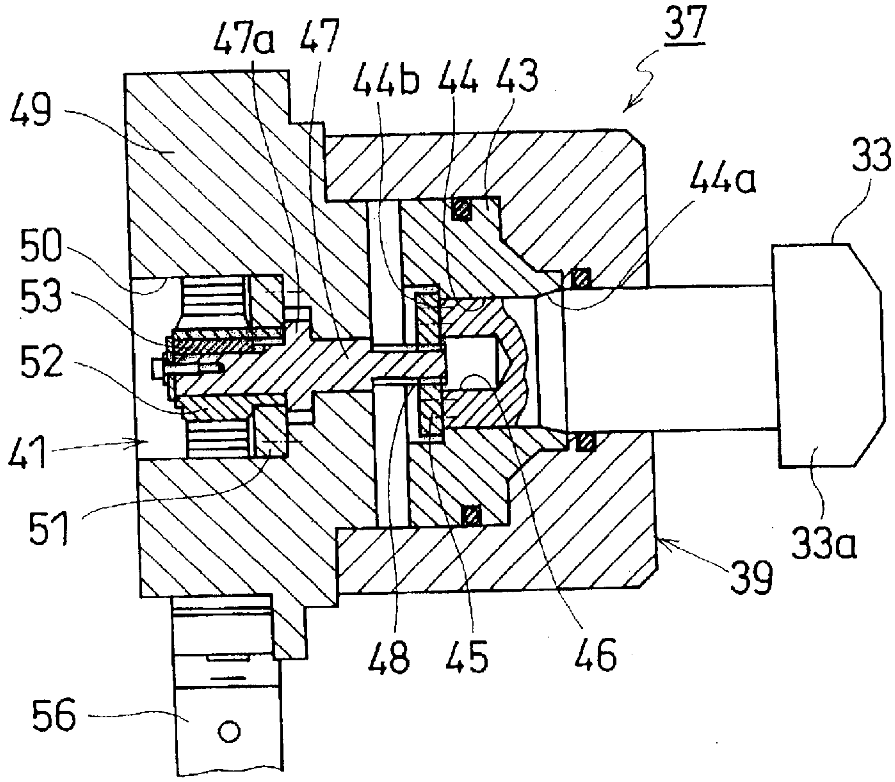
FIG. 8 is a cross sectional view which shows a structure of a clamp apparatus as the attaching and detaching mechanism.
Figure 9:
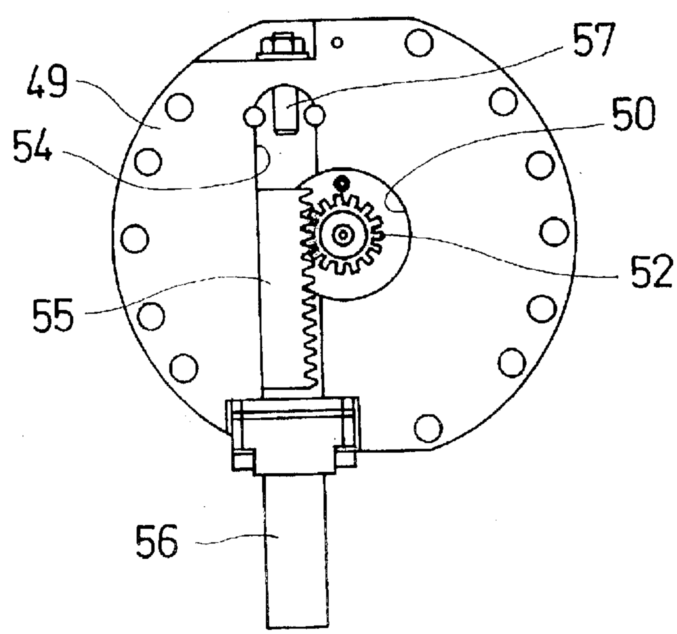
FIG. 9 is a front elevational view which shows the structure of the clamp apparatus as the attaching and detaching mechanism.

In FIGS. 8 and 9, reference numeral 43 denotes a piston slidably arranged within the clamping cylinder 39. A base end portion of the T-shaped clamper 33 is slidably fitted and inserted into an axial hole 44 formed in the piston 43. The T-shaped clamper 33 is restricted from moving toward left side in FIG. 8 (pressing direction) with respect to the piston 43 by fitting the base end portion of the clamper 33 to a taper portion 44*a* formed on one end of the axial hole 44. The T-shaped clamper 33 is also restricted from moving toward right side in FIG. 8 (drawing direction) with respect to the piston 43 by bringing an annular stopper plate 45 bolted to the base end into contact with a step portion 44*b* formed in the other end of the axial hole 44. That is, the T-shaped clamper 33 is connected to the piston 43 in a rotatable and non-relatively-movable manner.

Further, an axial hole 46 having a predetermined depth is formed in the base end portion of the T-shaped clamper 33, and an extended end portion of a rotary shaft 47 extended from the rotary mechanism 41 into the cylinder 39 is inserted within the axial hole 46. The extended end portion of the rotary shaft 47 that extends into the cylinder 39 is connected to the annular stopper plate 45 via a spline portion 48, whereby the T-shaped clamper 33 is connected to the rotary shaft 47 in a non-relatively-rotatable and relatively-movable manner.

Meanwhile, the rotary mechanism 41 constituting the actuator 37 is arranged within a thick end plate 49 capped with the clamping cylinder 39. The end plate 49 is provided with a recess portion 50 which accommodates the rotary shaft 47. A pressing plate 51 is bolted to a bottom portion of the recess portion 50 so as to restrict the rotary shaft 47 from coming off from the cylinder 39 by engaging a flange 47*a* provided in a middle portion in an axial direction of the rotary shaft 47. Further, within the recess portion 50, a pinion 52 is non-rotatably connected to the base end portion of the rotary shaft 47 by using a key 53, and a rack 55 slidably arranged in a radial groove 54 provided in the end plate 49 is engaged with the pinion 52. The rack 55 is structured so as to be linearly moved by a cylinder 56 which is mounted to an outer peripheral portion of the end plate 49 in a radially extended manner. By the linear movement of the rack 55, the rotary shaft 47, therefore the T-shaped clamper 33 rotates leftward or rightward via the pinion 52. In the rack 55, a position at which a leading end of the rack 55 is brought into contact with a stopper 57 protruded from a bottom portion of the radial groove 64 in the end plate 49 forms a advancement end, and a shortened end of the rod of the cylinder 66 forms a retraction end. The T-shaped clamper 33 is structured so as to reverse only by 90 degrees in correspondence to the advancement and retraction of the rack 55.

With respect to the actuator 38 on the movable die 12 side, a description of a detailed structure is omitted. However, in FIG. 7, reference numeral 58 denotes a piston within the clamping cylinder 40, and reference numeral 59 denotes a rotary shaft extended from the rotary mechanism 42 into the cylinder 40, respectively. In the present embodiment, the clamping cylinder 40 of the movable die 12 is made long so as to obtain a considerably greater piston stroke than that of the clamping cylinder 39 of the fixed die 11. Accordingly, the T-shaped clamper 34 which is connected to the piston 58 within the cylinder 40 in an operable manner and an axial hole (not shown) provided within the T-shaped clamper 34 are also made longer than the T-shaped clamper 33 and the axial hole 46 of the fixed die 11 (FIG. 8).

The aforementioned clamp apparatuses 31 and 32 position the T-shaped clampers 33 and 34 at extended ends as shown in FIGS. 6 and 7 at a time of die changing, and also position the T-shaped clampers 33 and 34 in a rotational direction so that the head portions 33*a* and 34*a* of the T-shaped clampers 33 and 34 can be inserted to the T-shaped slots 35 and 36 provided in the corresponding inserts 16 and 18. In this state, when the inserts 16 and 18 within the recess portions 24 and 25 of the respective main dies 15 and 17 are pressed in accordance with the die opening and closing motion of the die changing apparatuses 9 mentioned below or the machine 1, the head portions 33*a* and 34*a* of the T-shaped clampers 33 and 34 enter into the T-shaped slots 36 and 36.

Figure 10:
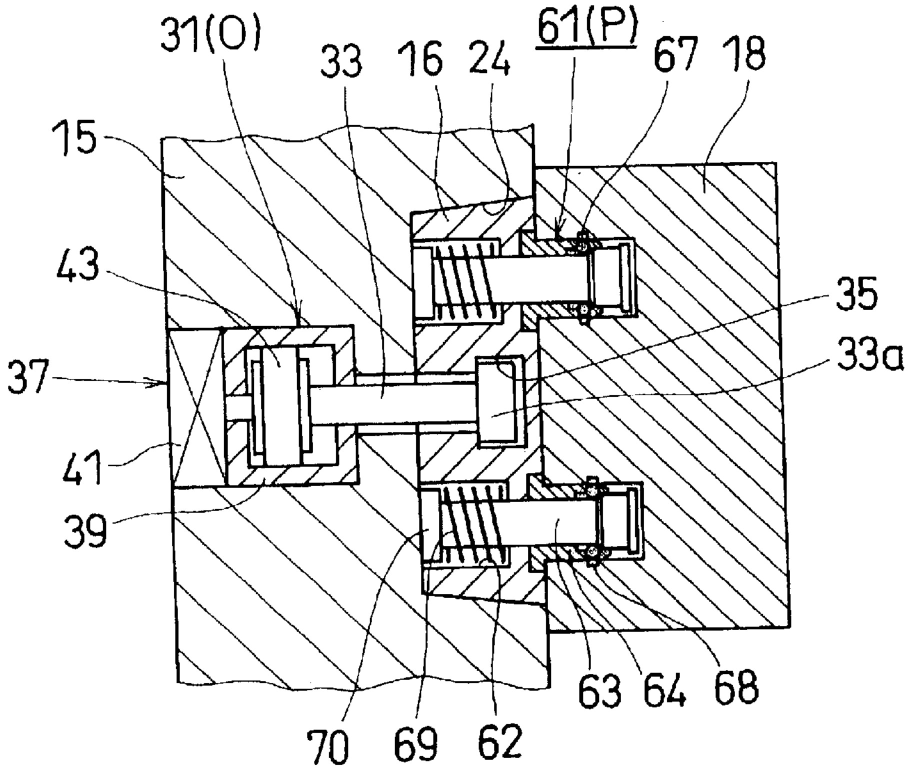
FIG. 10 is a cross sectional view which shows a working state of the attaching and detaching mechanism between the general portion and the exclusive portion and the connection mechanism between the exclusive portions, both of which are provided in the molding die.
Figure 11:
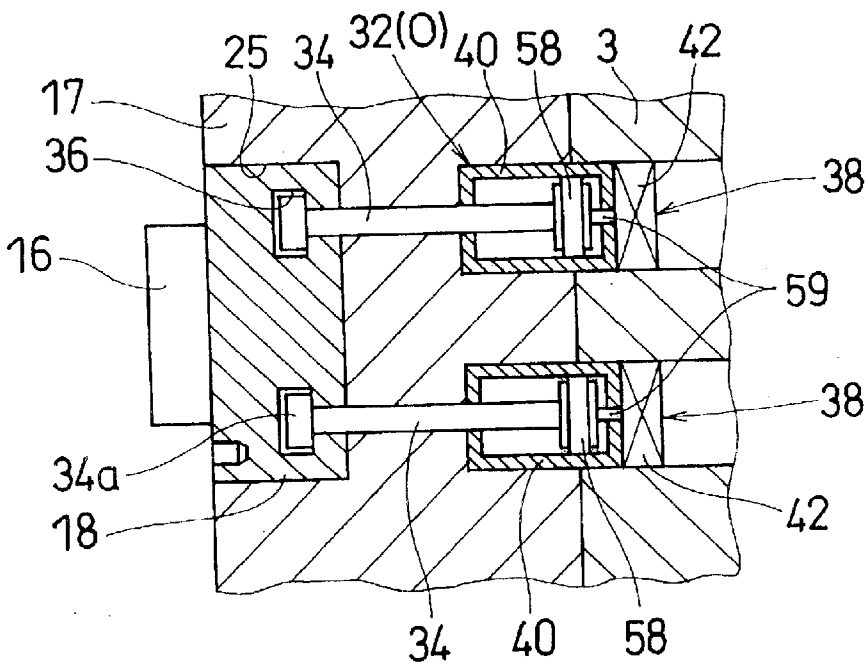
FIG. 11 is a cross sectional view which shows a working state of the attaching and detaching mechanism on the movable die side, which is provided in the molding die.

Subsequent motions are different between the clamp apparatus 31 on the fixed die 11 side and the clamp apparatus 32 on the movable die 12 side. In the case of the clamp apparatus 31 on the fixed die 11 side, in a stage in which the insert 16 is pressed within the recess portion 24 of the main die 15 in accordance with the die opening and closing motion and the back surface of the insert is brought into contact with an inner bottom surface of the recess portion 24, that is, in a stage shown in FIG. 10, the rotary mechanism 41 is operated following a fluid pressure release within the clamping cylinder 39, and the T-shaped clamper 33 rotates 90 degrees, thereby rotating the head portion 33*a* thereof to a position at which the head portion can not come off within the T-shaped slot 35 of the insert 16. Thereafter, the T-shaped clamper 33 receives the pressure to the shortened side on the basis of the supply of the pressure fluid into the cylinder 39, whereby the insert 16 is clamped to the main die 15. Meanwhile, in the clamp apparatus 32 on the movable die 12 side, the rotary mechanism 42 thereof is operated at the same time the head portion 34*a* of the T-shaped clamper 34 enters into the T-shaped slot 36, and the T-shaped clamper 34 is rotated 90 degrees, thereby rotating the head portion 34*a* thereof to a position at which the head portion 34*a* can not come off within the T-shaped slot 36 of the insert 18. Subsequently, the clamping cylinder 40 is operated and the T-shaped clamper 34 is shortened, whereby the insert 18 is drawn into the recess portion 25 of the main die 17 and is clamped to the main die 17 as shown in FIG. 11. At this time, a plurality of (four in this case) clamping cylinders 40 are synchronously operated so that the insert 18 is smoothly drawn into the recess portion 25 of the main die 17. In this case, at a time of clamping as described above, since predetermined gaps S (FIGS. 6 and 7) exist between the head portions 33*a* and 34*a* of the respective T-shaped clampers 33 and 34 and the inner surfaces of the T-shaped slots 35 and 36, the T-shaped clamper 33 and 34 rotate smoothly without being exposed to frictional resistance significantly.

In the case of separating the inserts 16 and 18 from the respective main dies 15 and 17, operation would be the reverse of that mentioned above. First, the respective T-shaped clampers 33 and 34 are extended in accordance with the operations of the clamping cylinders 39 and 40, and the fluid pressures in the respective cylinders 39 and 40 are released at the extended ends thereof. Then, the rotary mechanisms 41 and 42 operate to rotate the respective T-shaped clampers 33 and 34 by 90 degrees, whereby the inserts 16 and 18 can be separated from the corresponding main dies 15 and 17.

The connection mechanism P for connecting the insert 16 on the fixed die 11 side to the insert 18 on the movable die 12 side, in this case, is constituted by a ball lock mechanism 61. The ball lock mechanism 61 is, as shown in FIGS. 6, 10 and 12, provided with an operation rod 63 extended to a front side from a recess hole 62, provided in a back surface side of the insert 16 (hereinafter, referred to as a fixed insert) corresponding to the exclusive portion N of the fixed die 11, through the insert 16, a tubular guide 64 fixed to a front surface of the insert 16 so as to surround the operation rod 63, a recess hole 65 which is provided in the insert 18 (hereinafter, referred to as a movable insert) of the movable die 12 and in which the operation rod 63 and the tubular guide 64 can integrally be fitted, balls 67 held in a plurality of ball holding holes 66 provided at equal distance from each other in a leading end portion of the tubular guide 64 in a circumferential direction via the operation rod 63, and an engagement hole 68 which is provided on an inner surface of the recess hole 65 of the movable insert 18 and engages with the balls 67.

The operation rod 63 has, in a leading end side thereof, a large diameter portion 63*c* connected to a small diameter main body portion 63*a* via a bevel portion 63*b*. The balls 67 are selectively positioned in a state in which the balls ride on the small diameter main body portion 63*a* of the operation rod 63, that is, a state in which the balls do not protrude from an outer peripheral surface of the tubular guide 64, and in a state in which the balls ride on the large diameter portion 63*c* of the operation rod 63, that is, a state in which the balls partly protrude from the outer peripheral surface of the tubular guide 64, in correspondence to a relative movement between the operation rod 63 and the tubular guide 64. In this case, the ball holding holes 66 provided in the tubular guide 64 are formed as taper holes so as to prevent the balls 67 from falling. Furthermore, the operation rod 63 is energized in a drawing direction from the movable insert 18 by a compression spring 69 arranged within the recess hole 65 of the fixed insert 16. A flange 63*d* is provided in a leading end portion of the operation rod 63, and the operation rod 63 is normally positioned at a retraction end in which the flange 63*d* at the leading end thereof is brought into contact with an end surface of the tubular guide 64. Further, in the retraction end of the operation rod 63, the large diameter portion 63*c* is positioned below the ball holding holes 66 of the tubular guide 64, whereby the balls 67 normally maintain the state in which the balls partly protrude from the outer peripheral surface of the tubular guide 64.

The tubular guide 64 is structured such that the ball holding holes 66 align with the engagement holes 68 on the movable insert 18 side in the die close state in which the fixed insert 16 and the movable insert 18 are assembled. Accordingly, when the pressing of the operation rod 63 is released after the fixed insert 16 and the movable insert 18 are closed with the operation rod 63 pre-pressed in, the operation rod 63 moves to the retraction end due to the energizing force of the compression spring 69, whereby the balls 67 partly protrude from the ball holding holes 66 so as to engage with the engagement hole 68 of the movable insert 18. As a result, the fixed insert 16 and the movable insert 18 are automatically connected and integrated (locked) via the ball lock mechanism 61.

Figure 12:
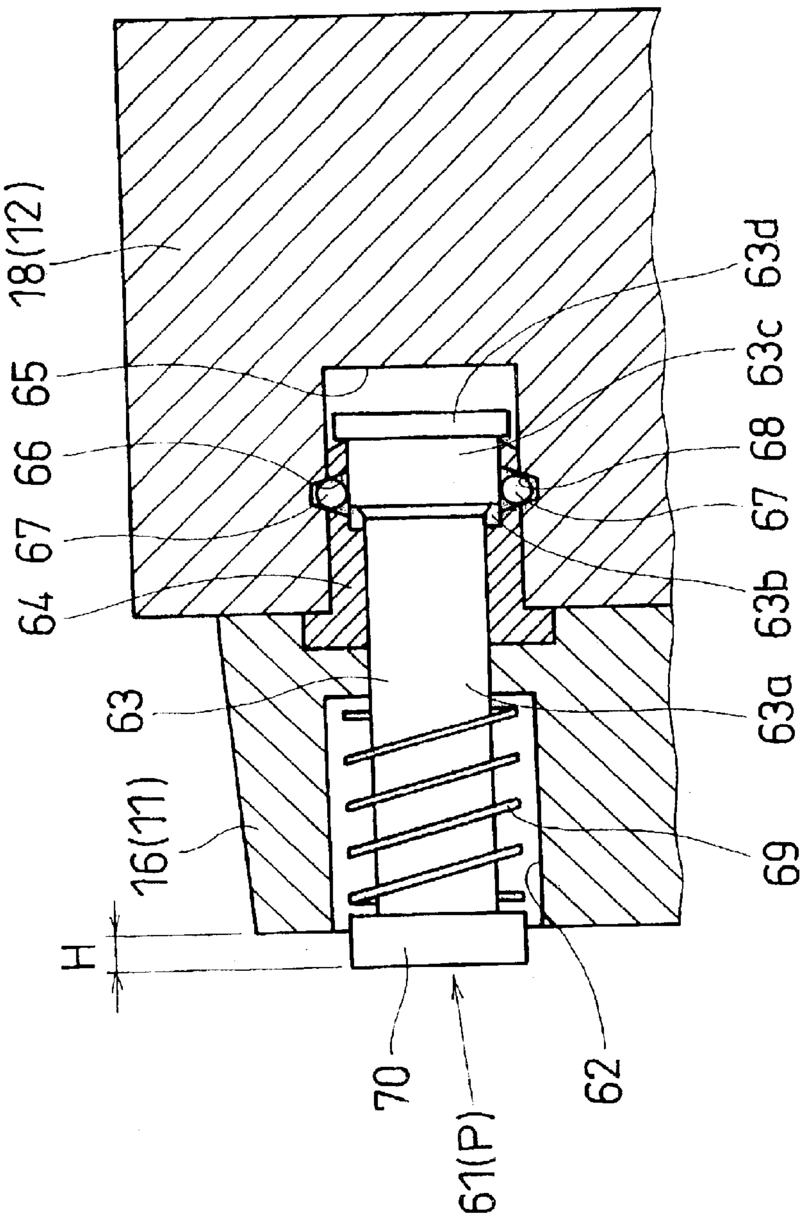
FIG. 12 is a cross sectional view which shows a structure of a ball lock mechanism for connecting and integrating the exclusive portions with each other.

Meanwhile, the operation rod 63 is structured such that a pressing plate 70 provided in the rear end thereof is normally protruded from the back surface of the fixed insert 16 only by a little height H (FIG. 12). Accordingly, when clamping the fixed insert 16 to the corresponding main die 15 as shown in FIG. 10 and bringing the back surface of the insert 16 into contact with the inner bottom surface of the recess portion 24 of the main die 15, the pressing plate 70 at the rear end of the operation rod 63 is also brought into contact with the inner bottom surface of the recess portion 24. Accordingly, the operation rod 63 is pressed in toward the movable insert 18 against the energizing force of the compression spring 69. Then, the balls 67 moves to the small diameter main body portion 63*a* of the operation rod 63 so as to be released from the engagement hole 68 of the movable insert 18. As a result, the connection and integration between the fixed insert 16 and the movable insert 18 is automatically cancelled (unlocked). In this case, it goes without saying that the same unlocking operation as mentioned above can be achieved by providing a projection having the same height H in the main die 15 and setting the rear end of the operation rod 63 flush with the back surface of the fixed insert 16, instead of protruding the rear end portion of the operation rod 63 from the back surface of the fixed insert 16 as mentioned above.

The pressing means 13 is structured, as suitably shown in FIG. 13, such that the pressing plate 21 corresponding to the exclusive portion N is arranged between the main die 17 (hereinafter, referred to as a movable main die) corresponding to the general portion M of the movable die 12 and the movable insert 18. The bottom portion of the recess portion 25 in the movable main die 17 is provided with a receiving hole 71 extending to the back surface side, so that the pressing plate 21 is accommodated within the receiving hole 71 in a state in which the movable insert 18 is attached to the movable main die 17. Further, a plurality of screw type guide rods 72 are fixed to the back surface side of the movable insert 18 as shown in FIG. 14, so that the pressing plate 21 slides along the guide rods 72. A stopper portion 73 is integrally provided in leading end of the respective guide rods 72, and the pressing plate 21 is prevented from coming off with respect to the movable insert 18 by the stopper portions 73. That is, the guide rods 72 and the stopper portions 73 thereof constitute the connection mechanism P which detachably connects and integrates the exclusive portions with each other.

Meanwhile, the pressing rod 19 corresponding to the general portion N of the pressing means 13 is extended to inside the receiving hole 71 from the movable plate 75 arranged within the recess portion 74 of the back surface portion in the movable main die 17 through the movable main die 17, and the pressing rod 19 and the pressing plate 21 are detachably connected within the receiving hole 71 by a ball lock mechanism 81, mentioned below, which is one of the connection mechanism P. The movable plate 75 is structured so as to move within the recess portion 74 in accordance with expansion and contraction of the piston rod 76 of the pressing cylinder mounted to the movable platen 3. In accordance with this movement, the pressing plate 21 advances and retracts in the die opening and closing direction.

In this case, the movable insert 18 is not in total contact with the bottom surface of the recess portion 25 in the movable main die 17 due to existence of the receiving hole 71 formed in the movable main die 17, and thus is in a partly contact state (state in which a contact area is small). In this case, when a great casting pressure is applied, the movable insert 18 is deformed, creating possibility of a trouble such as a burr generation, a deterioration in product size accuracy, and an insert crack. Therefore, in accordance with the present embodiment, as shown in FIG. 13, a backup block 77 is arranged within the movable main die 17, and a through hole 78 through which the block 77 can be passed through is provided in the pressing plate 21, such that a leading end of the block 77 is brought into contact with the back surface of the movable insert 18 attached to the movable main die 17. By providing the block 77 as mentioned above, deformation of the movable insert 18 is suppressed, thereby preventing the aforementioned trouble such as the burr generation and the like from occurring. In this case, the movable main die 17 employs a divided structure in which a front block 17A and a rear block 17B are integrated via a plate 17C, and the position of the backup block 77 is fixed by the plate 17C in a state in which the rear end of the backup block 77 is brought into contact with the rear block 17B.

Figure 15:
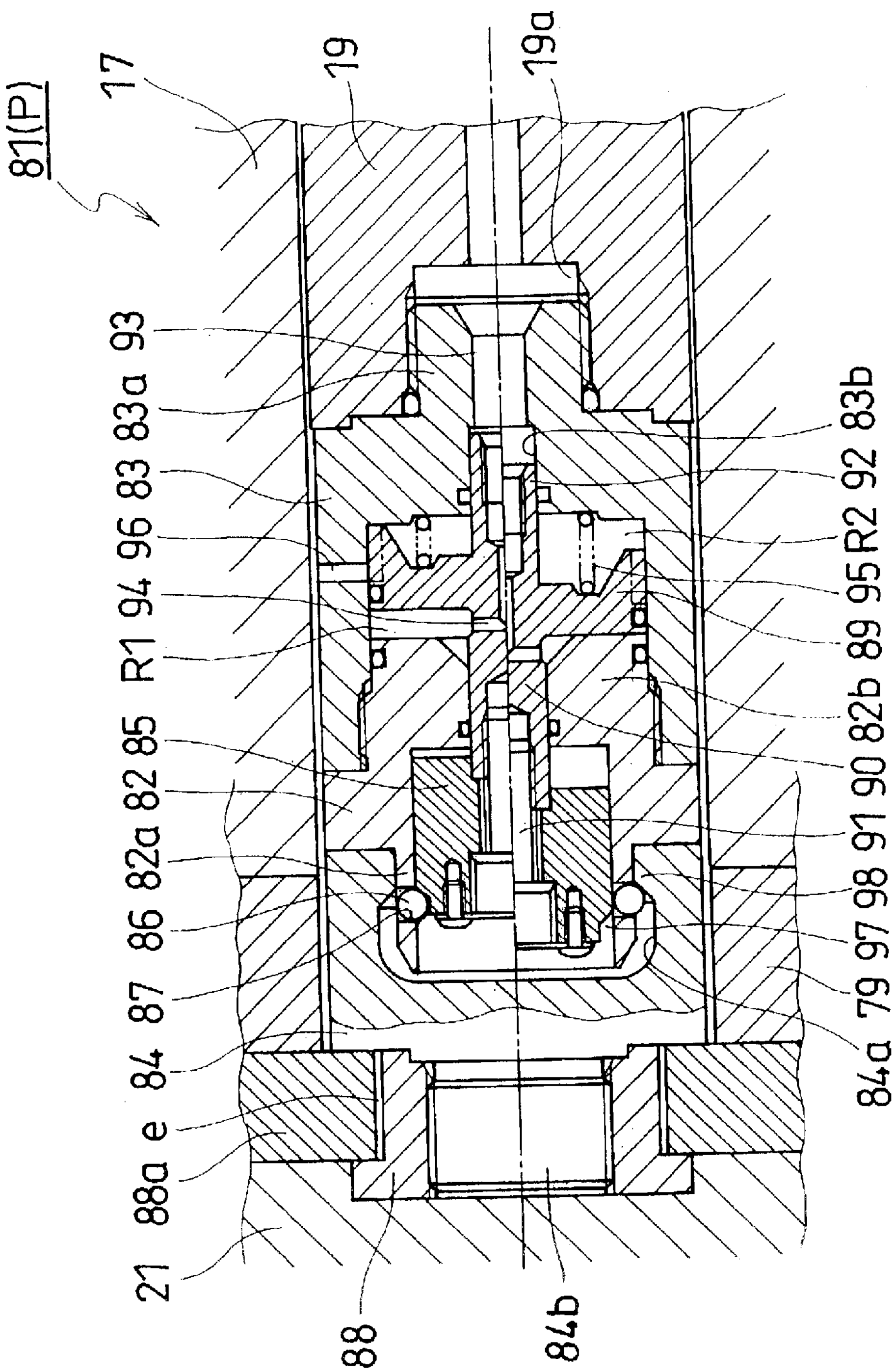
FIG. 15 is a cross sectional view which shows a structure of a ball lock mechanism for connecting a pressing rod with the pressing plate.

In this case, the ball lock mechanism 81 (the attaching and detaching mechanism O) for detachably connecting the pressing rod 19 to the pressing plate 21 is structured as shown in FIG. 15. In FIG. 15, reference numeral 82 denotes a male-type member mounted to the leading end of the pressing rod 19 via a cylinder 83, reference numeral 84 denotes a female-type member which is mounted to the back surface of the pressing plate 21 and has a recess hole 84*a* capable of receiving the male-type member 82, reference numeral 85 denotes a sliding body which is slidably arranged within a tubular portion 82*a* of the male-type member 82 and slides in correspondence to an operation of the cylinder 83, and reference numeral 86 denotes balls held, via the sliding body 85, in a plurality of ball holding holes 87 provided at equal distance from each other in the tubular portion 82*a* of the male-type member 82 in a circumferential direction. The cylinder 83 is formed in a closed-end tubular shape, and is integrated with the pressing rod 19 by screwing a boss portion 83*a* provided in a bottom portion of the cylinder into the recess portion 19*a* provided in the leading end portion of the pressing rod 19. Further, the male-type member 82 is commonly used as an end plate for sealing an open end portion of the cylinder 83, and is integrated with the cylinder 83 by screwing a boss portion 82*b* provided in a base end side thereof into an open end portion of the cylinder 83. Meanwhile, the female-type member 84 is integrated with the pressing plate 21 by screwing a boss portion 84*b* provided in the back surface side thereof into a nut member 88 mounted to the back surface of the pressing plate 21 by using a pressing plate 88*a*. In this case, a predetermined gap e is formed between the nut member 88 and the pressing plate 88*a*, and the female-type member 84 can slightly float in an axial-radial direction due to the existence of this gap e.

A piston 89 is slidably provided inside the cylinder 83, and a first rod 90 extended from the piston 89 slidably passes through the male-type member 82 and is connected to the sliding body 85 within the tubular portion 82*a* by using bolts 91. Further, a second rod 92 is extended to a bottom portion side of the cylinder 83 from the piston 89, and is slidably inserted to the axial hole 83*b* formed in the bottom portion of the cylinder 83. A chamber R1 on the first rod 90 side within the cylinder 83 sectioned by the piston 89 is constructed as a fluid chamber (an air chamber or an oil chamber), and a chamber R2 on the second rod 92 side is constructed as a spring chamber. Further, the pressure fluid is supplied to and discharged from the fluid chamber R1 through a flow passage 93 commonly formed in axes center of the pressing rod 19 and the cylinder 83 and a port 94 formed in the first rod 90, while a compression spring 95 that normally energizes the piston 89 toward the male-type member 82 is arranged in the spring chamber R2. In this case, an inner portion of the spring chamber R2 is communicated with outside via a port 96 provided in the wall of the cylinder 83.

The piston 89 retracts toward the bottom portion of the cylinder 83 against the energizing force of the compression spring 95 due to the pressure fluid being supplied into the fluid chamber R1 through the flow passage 93, and in correspondence to this retraction movement, the sliding body 85 retracts within the tubular portion 82*a* of the male-type member 82. On the contrary, when the pressure fluid within the fluid chamber R1 is discharged, the piston 89 advances by the compression spring 95, and the sliding body 85 also advances in correspondence to the advancement movement.

An upper half from a center line in FIG. 15 shows a retracted state of the sliding body 85, and a lower half in FIG. 15 shows a advanced state of the sliding body 85, respectively. A taper surface 97 is formed in an outer peripheral edge portion in a front end side of the sliding body 85, and the balls 86 within the ball holding holes 87 ride on the taper surface 97 as the sliding body 85 retracts, and maintain the state in which the balls are embedded in the ball holding holes 87. Further, the balls 86 ride on the general surface in the outer periphery of the sliding body 85 as the sliding body 85 advances, and maintain the state in which the ball partly protrude outside from the ball holding hole 87. Accordingly, the opening end portion of the recess hole 84*a* in the female-type member 84 forms a narrow portion 98 which is narrowed down in a radial inner direction, and thus in a state in which the balls 86 are on the general surface of the sliding body 85, the balls 86 interfere with the narrow portion 98. Accordingly, separation of the male-type member 82 from the female-type member 84 is restricted.

Figure 13:
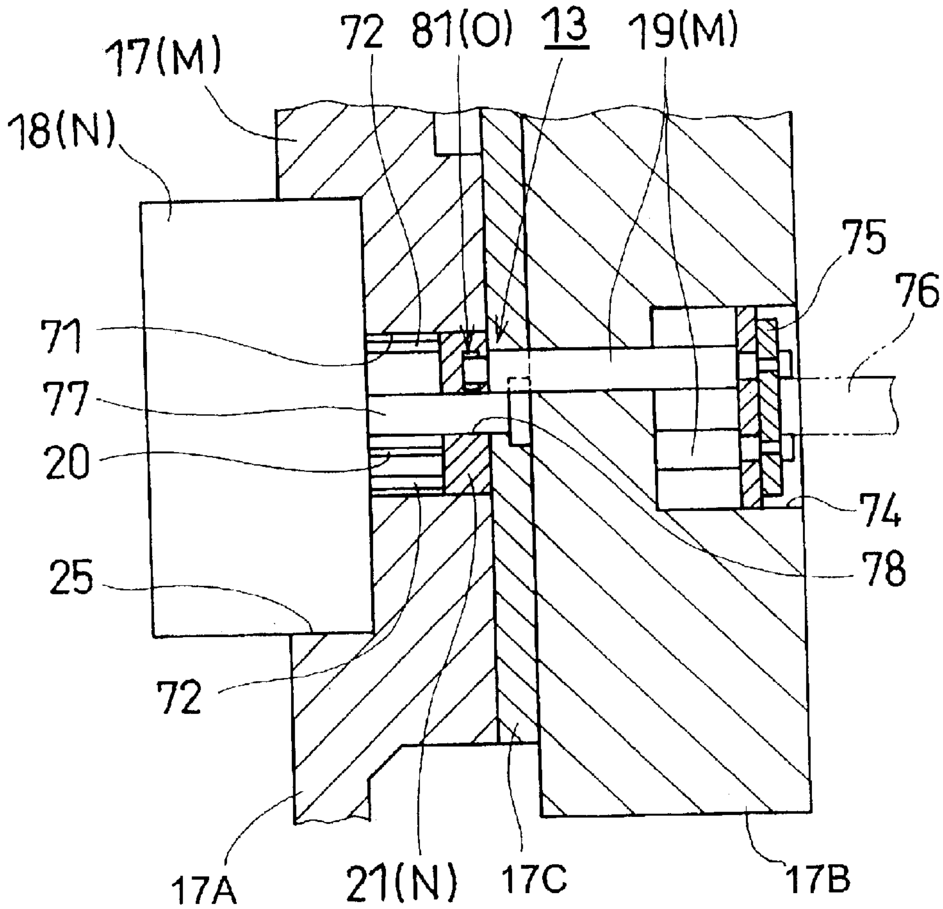
FIG. 13 is a cross sectional view which shows a structure of pressing means and the structure of the attaching and detaching mechanism for attaching and detaching the general portion to and from the exclusive portion.
Figure 14:
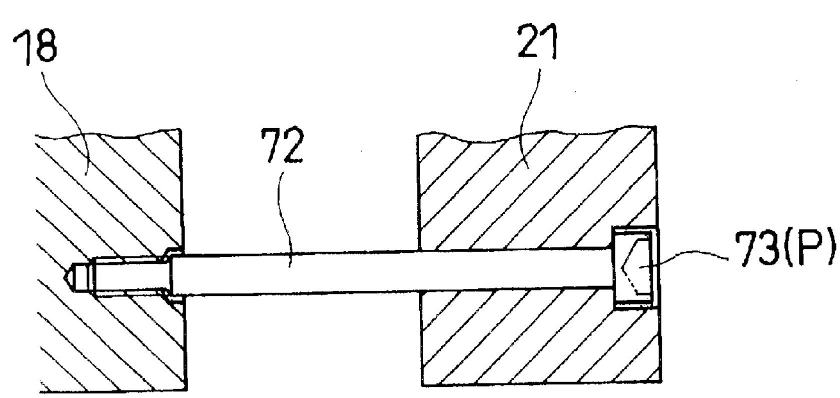
FIG. 14 is a cross sectional view which shows a structure of a connection mechanism for connecting a pressing plate to a movable insert.

In the ball lock mechanism 81 mentioned above, in a state in which the movable insert 18 is attached to the movable main die 17 as shown in FIG. 13, the pressure fluid supply to the fluid chamber R1 within the cylinder 83 is stopped. Because of this, the piston 89 within the cylinder 83 moves to the advancement end by the compression spring 95, allowing the balls 86 to ride on the general surface of the sliding body 85, and the male-type member 82 and the female-type member 84 maintains the connection state. That is, the pressing plate 21 corresponding to the exclusive portion N maintains the state in which the pressing plate is connected (locked) to the pressing rod 19 corresponding to the general portion M. On the contrary, at a time of die changing, the pressure fluid is supplied to the fluid chamber R1 within the cylinder 83, whereby the piston 89 within the cylinder 83 moves to the retraction end against the energizing force of the compression spring 95, and the balls 86 move to the taper surface 97 from the general surface of the sliding body 85, allowing the male-type member 82 and the female-type member 84 to be separated. That is, the pressing plate 21 corresponding to the exclusive portion N is disconnected (unlocked) from the pressing rod 19 corresponding to the general portion M. At this time, the pressing plate 21 is prevented from coming off with respect to the movable insert 18 by the stopper portion 73 in the leading end of the guide rod 72 as mentioned above, and thereby the pressing plate 21 corresponding to the exclusive portion is separated from the movable main die 17 together with the movable insert 18 as shown in FIG. 3.

Figure 16:
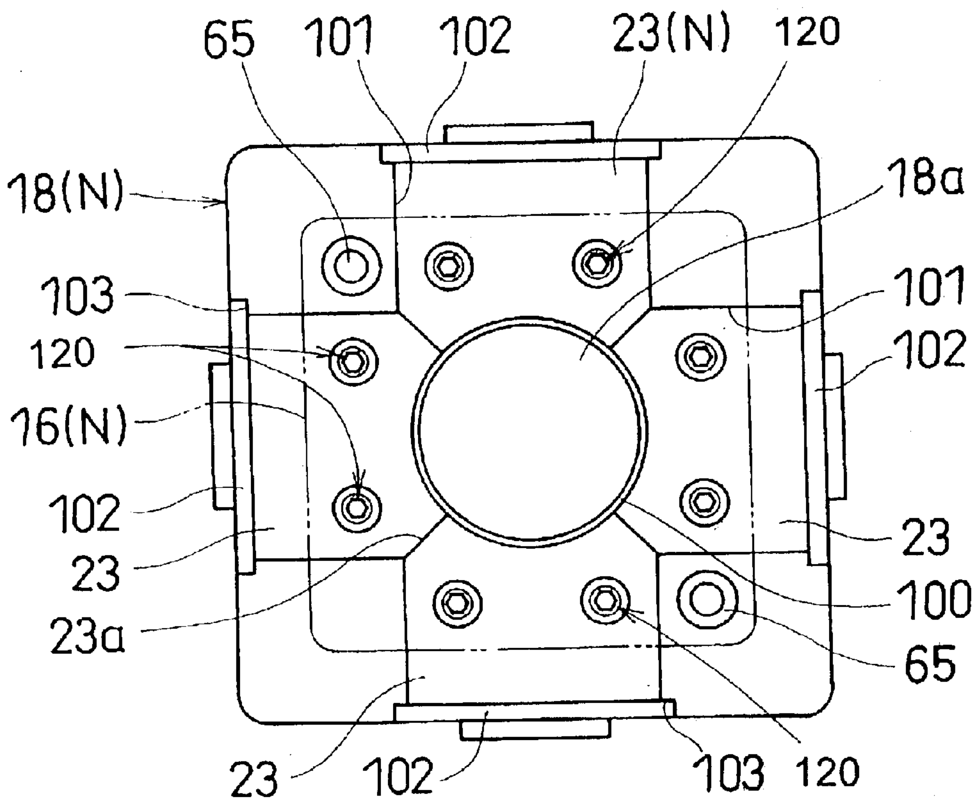
FIG. 16 is a front elevational view which shows a connection state of a slide core with respect to the movable insert.
Figure 17:
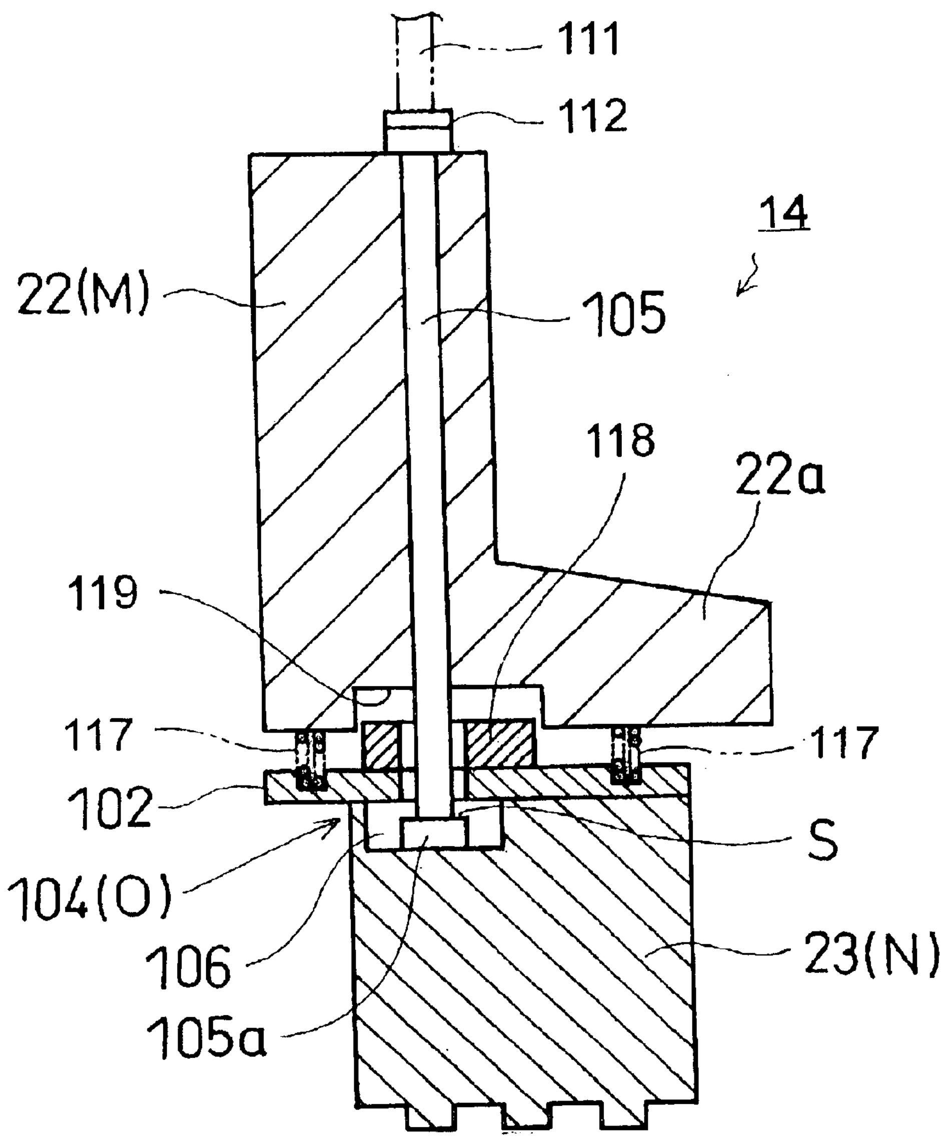
FIG. 17 is a cross sectional view which shows a structure of an attaching and detaching mechanism for attaching and detaching a slide holder to and from a slide core.

In the present embodiment, four slides 14 mentioned above are arranged around the movable die 12. The slide core 23 corresponding to the exclusive portion N of the slide 14 is inserted into a wide receiving groove 101 radially formed in the movable insert 18, as shown in FIG. 16. A back plate 102 is fixed to the back surface of each of the slide core 23 as shown in FIG. 17. In the slide core 23, a position at which the back plate 102 sit on a step portion 103 provided in a side edge in an inlet side of the receiving groove 101 of the movable insert 18 constitutes an insert end with respect to the movable insert 18. Further, in the insert end of the slide core 23 with respect to the movable insert 18, taper surfaces 23*a* in the leading end portions of the respective slide cores 23 are substantially in close contact with each other, thereby creating an annular cavity 100 in the periphery of a convex forming portion 18*a* of the movable insert 18.

Figure 18:
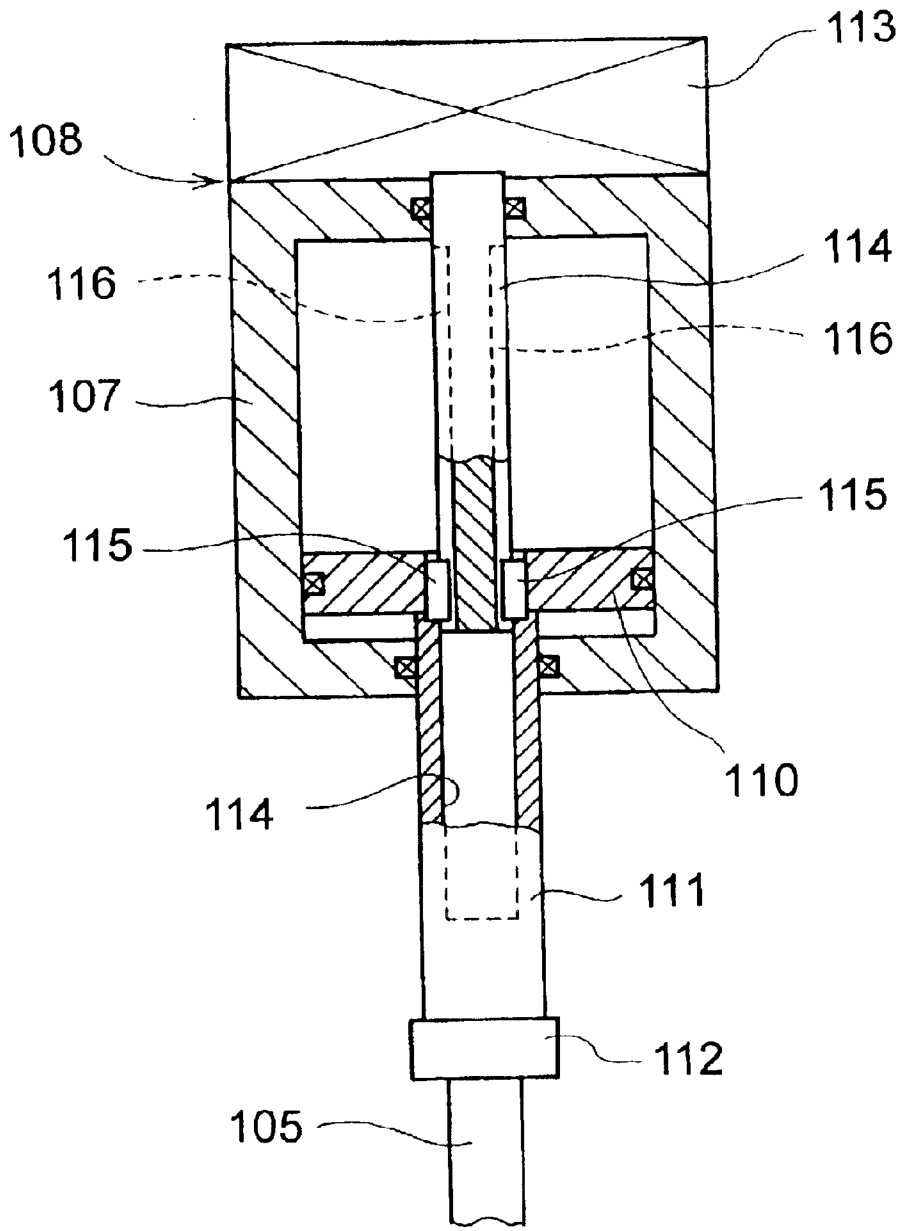
FIG. 18 is a cross sectional view which shows a structure of an actuator for driving a slide and a slide attaching and detaching mechanism.

The slide holder 22 corresponding to the general portion of the slide 14 is arranged in a front surface of the movable main die 17 by using a slide key (not shown) in such a manner as to freely move in a direction intersecting the die clamping direction. The attaching and detaching mechanism (the slide attaching and detaching mechanism) O for attaching and detaching the slide holder 22 and the slide core 23 is constituted, as shown in FIGS. 17 and 18, by a clamp apparatus 104 which engages and inserts a T-shaped clamper 105 inserted into each of the slide holders 22 into a T-shaped slot 106 provided in the back surface portion (including the back plate 102) of the slide core 23. The clamp apparatus 104 is, in this case, provided with an actuator 108 which commonly uses an existing slide driving cylinder 107 as driving means for the T-shaped clamper 105 (FIG. 18). The cylinder 107 is fixed to the movable main die 17 via a bracket 109 (refer to FIGS. 1 to 4), and the T-shaped clamper 105 is coaxially connected to a rod 111 extended from the piston 110 within the cylinder 107 via a joint 112. The T-shaped clamper 105 is restricted from coming off from the slide holder 22 by a stopper comprising a head portion 105*a* of the clamper and the joint 11. A gap between the head portion 105*a* of the T-shaped clamper 105 and the joint 111, that is, a length of the T-shaped clamp 105 is set longer than a height of the slide holder 22, thereby making the slide holder 22 floatably supported to the rod 109 of the cylinder 107.

The actuator 108 mentioned above connects a rotary mechanism 113 to a rear end of the slide driving cylinder 107, as is suitably shown in FIG. 18. The rotary mechanism 113 has a built-in rack and pinion mechanism (not shown) having the same basic structure as that of the rotary mechanisms 41 and 42 (FIGS. 6 to 9) provided in the fixed main die 15 and the movable main die 17. A leading end portion of a rotary shaft 114 extended within the cylinder 107 from the rotary mechanism 113 is inserted into an axial hole 114 provided in tie rod 111 through the piston 110. The rotary shaft 114 is provided with vertical grooves 116 engaged with a plurality of keys 115 provided in the piston 110. Accordingly, the rotary shaft 114 and the piston 110 including the rod 111 are connected in a non-relatively-rotatable but relatively-movable.

The T-shaped clamper 105 constituting the clamp apparatus 104 mentioned above advances toward the movable insert 18 integrally with the slide holder 22 in correspondence to the extension of the rod 111 of the slide driving cylinder 107, and thus the head portion 105*a* is inserted to the T-shaped slot 106. After the head portion 105*a* of the T-shaped clamper 105 is inserted to the T-shaped slot 106, the clamp apparatus 104 rotates the T-shaped clamper 105 by 90 degrees on the basis of the rotation of the rotary shaft 116 in the rotary mechanism 113 constituting the actuator 108. At this time, since a predetermined gap S (FIG. 18) exists between the head portion 105*a* of each T-shaped clamper 105 and the back surface in the opening side of the T-shaped slot 106, the T-shaped clamper 105 smoothly rotates without being exposed to the frictional resistance. The clamp apparatus 104 thereafter shortens the rod 111 by the operation of the cylinder 107, completing connection between the slide holder 22 and the slide core 23.

Figure 2:
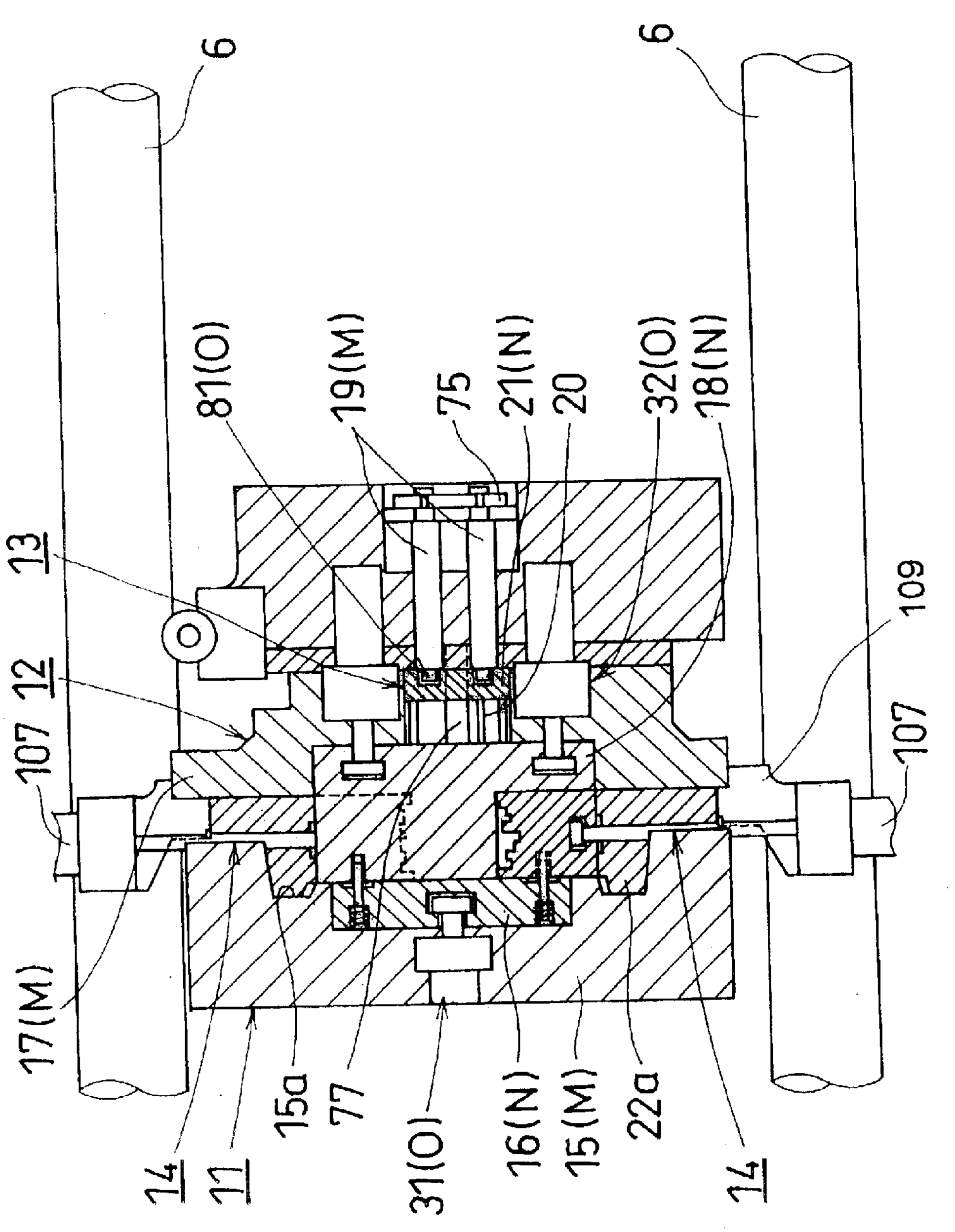
FIG. 2 is a cross sectional view which shows the overall structure of the molding die in accordance with the present invention in a die close state.

In the present embodiment, the compression spring 117 is interposed between the slide holder 22 and the slide core 23. Even if a play (looseness) exists between the T-shaped clamper 105 and the T-shaped slot 106 as mentioned above, the slide core 23 is held in a fixed attitude with respect to the slide holder 22 by the compression spring 117. Further, a block 118 is provided in the back plate 102 of the slide core 23 in a protruding manner, and a recess portion 119 receiving the block 118 is formed in the slide holder 22. The block 118 and the recess portion 119 are provided for positioning the slide core 23 with respect to the slide holder 22. Such positioning and an attitude control by the compression spring 117 makes it possible to smoothly insert the slide core 23 into the movable insert 18. In this case, the slide holder 22 makes a taper shoulder portion 22*a* fit to an annular groove 16*a* in a front surface of the fixed main die 15 in correspondence to the die clamping between the fixed die 11 and the movable die 12, as shown in FIG. 2. Accordingly, the slide holder 22 and the slide core 23 are closely attached with each other and fixed so as to withstand the casting pressure.

Figure 19:
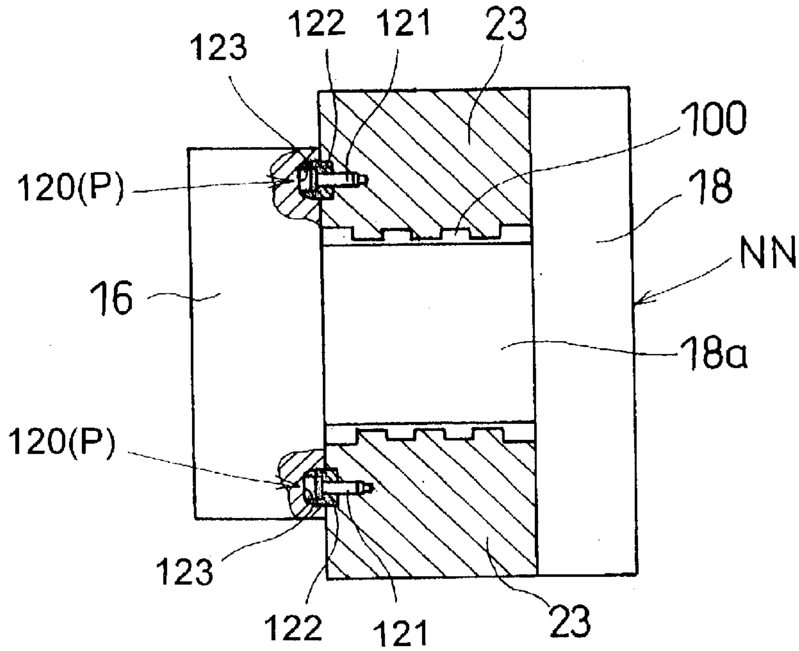
FIG. 19 is a cross sectional view which shows a structure of a connection mechanism for connecting a fixed insert with the slide core.

Meanwhile, concavo-convex fitting means 120 corresponding to the connection mechanism P for detachably connecting the exclusive portions N with each other is provided in a joint portion between each of the slide cores 23 and the fixed insert 16 mentioned above, as shown in FIG. 19. The concavo-convex fitting means 120 is constituted by a convex member 122 fixed to the side surface of the slide core 23 by using a bolt 121, and a fitting hole 123 formed on the end surface of the fixed insert 16. The convex member 122 and the fitting hole 123 are mutually formed in taper shapes so as to be fitted in a tapered manner, and are automatically and smoothly fitted to each other in correspondence to the die closing between the fixed die 11 and the movable die 12. Although, the concavo-convex means 120 are provided at two locations in a width direction with respect to each slide core 23, as shown in FIG. 16, it may of course be provided at more locations. Further, it goes without saying that the convex member 122 and the fitting hole 123 constituting the concavo-convex fitting means 120 may be structured in a mutually reversed arrangement, that is, the fitting hole is provided in the slide holder 22 and the convex member is provided in the fixed insert 16. In this case, FIG. 16 also shows a recess hole 65 (FIG. 15) to which a ball lock mechanism 61 (P) connecting the fixed insert 16 to the movable insert 18 is fitted.

The fixed insert 16 and the movable insert 18 are connected and integrated in the die close state by the ball lock mechanism 61 corresponding to the connection mechanism P as mentioned above. Accordingly, the slide core 23 is holed between the connected and integrated fixed insert 16 and movable insert 18 so as to be prevented from coming off by the concavo-convex fitting means 120. In this case, the pressing plate 21 corresponding to the exclusive portion N of the pressing means 13 is prevented from coming off with respect to the movable insert 18 by the stopper portion 73 (FIG. 14) in the leading end of the guide rod 72 corresponding to the connection mechanism P as mentioned above. Therefore, all of the fixed insert 16, the movable insert 18, the slide core 23 and the pressing plate 21 constructed as the exclusive portion N are connected and integrated in the die close state with each other as shown in FIGS. 3 and 4. Hereinafter, the structure in which the exclusive portions N are integrated with each other is called an exclusive portion assembly NN.

Figure 20:
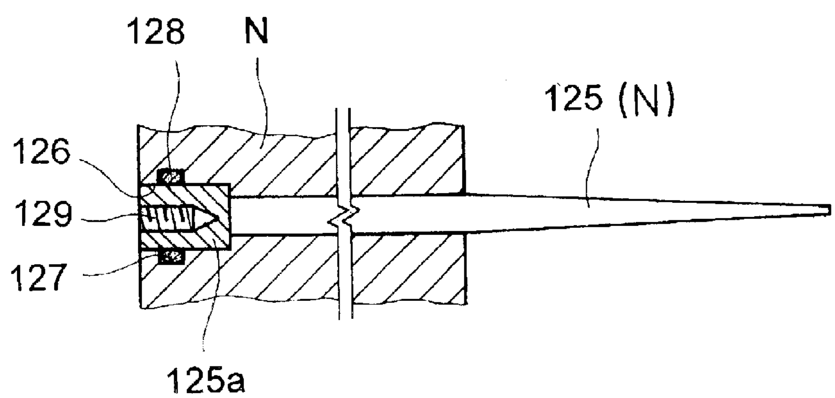
FIG. 20 is a cross sectional view which shows a holding structure of a cast pin with respect to the exclusive portion.

Meanwhile, as the casting die, some require a core pin such as a cast pin or the like. In this case, the core pin corresponds to the exclusive portion N, and at a time of die changing of the exclusive portion N, the core pin must also be replaced. Therefore, in the present embodiment, as shown in FIG. 20, a large diameter hole portion 126 for receiving a base end large diameter portion 125*a* of a core pin 125 is provided in the exclusive portion N, and an annular groove 127 is provided in the large diameter hole portion 126. Furthermore, an elastic member 128 such as an O-ring is attached to the annular groove 127, whereby a frictional resistance of the elastic member 128 restricts the core pin 125 from coming off with respect to the exclusive portion N. By restricting coming-off of the core pin 125 due to the frictional resistance of the elastic member 128, the cast pin 125 can also be removed from the general portion M integrally with the exclusive portion assembly NN. In this case, it is desirable that a screw hole 129 for connecting a maintenance jig is provided in the base end large diameter portion 125*a* of the core pin 125, whereby it is possible to easily replace the jig. In this case, with respect to the core pin 125, a length of the base end large diameter portion 125*a* is set so that an end surface of the base end large diameter portion 125*a* is brought into contact with the general portion M at a time of die closing.

Figure 21:
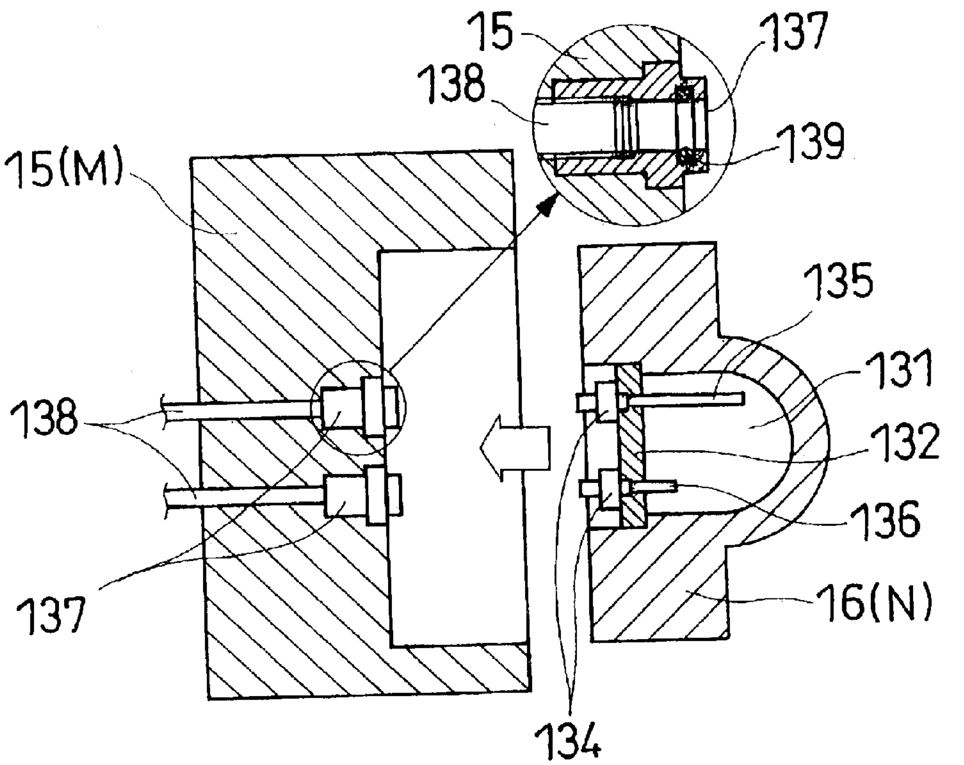
FIG. 21 is a cross sectional view which shows a structure of a cooling system provided between the general portion and the exclusive portion.
Figure 22:
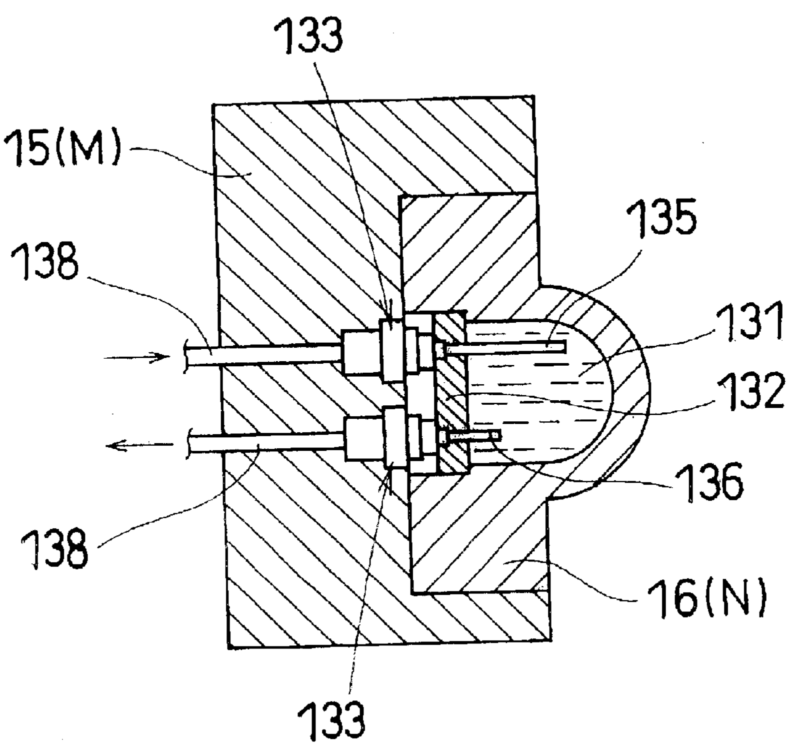
FIG. 22 is a cross sectional view which shows a connection state of the cooling system shown in FIG. 21.

Further, in the case of a large size casting die, an internal die cooling is generally performed. FIGS. 21 and 22 show one embodiment of a cooling system 130 in the case that the internal die cooling is required. In this case, the cooling system is constituted as a so-called pool cooling type in which the cooling is performed by pooling the cooling water in a cooling chamber (a cooling passage) 131 formed within the exclusive portion N. In both drawings, reference numeral 132 denotes a lid plate which seals the cooling chamber 131 formed in the fixed insert 16 corresponding to the exclusive portion N. A pair of male-type members 134 corresponding to one separation element of a pipe joint 133 are mounted to the lid plate 132. One end portions of nozzles 135 and 136 having different lengths are connected to the respective male-type members 134, and the other end portions of the respective nozzles 135 and 136 are inserted into the cooling chamber 131 at a predetermined depth. On the other hand, a pair of female-type members 137 corresponding to the other separation element of the pipe joint 133 are embedded in the bottom portion of the recess portion 24 in the fixed main die 15 corresponding to the general portion M in such a manner as to oppose to the male-type members 134. One end portion of a cooling pipe (a cooling passage) 138 passing through the fixed main die 15 is connected to each female-type member 137, and the other end portion of each cooling pipe 138 is extended out to a rear side of the fixed main die 15. The male-type members 134 constituting the pipe joint 133 are fitted into the female-type members 137 as the fixed insert 16 is clamped to the fixed main die 15 by the insert attaching and detaching mechanism 31 (FIGS. 1 to 4), and thereby both elements are integrated. Accordingly, an annular seal member 139 (FIG. 21) is fitted to an inner surface in an opening portion side of the female-type member 137, and the seal member 139 is closely attached to the outer peripheral surface of the male-type member 134 as the male-type member 134 is fitted to the female-type member 137, whereby both members 134 and 137 are sealed in a liquid tight manner. Further, the seal member 139 elastically deforms as the male-type member 134 is fitted to the female-type member 137, thereby absorbing displacement between both members 134 and 137.

The cooling system 130 mentioned above is structured such that a side having a long nozzle 135 is used as a water supply system, and a side having a short nozzle 136 is used as a water discharge system. The cooling water is supplied into the cooling chamber 131 from the water supply system to be temporarily stored within the cooling chamber 131, and thereafter the cooling water is discharged through the water discharge system. At a time of die changing of the exclusive portion N, the male-type member 134 is automatically separated from the female-type member 137 by disconnecting the fixed insert 16 from the fixed main die 15 by the operation of the attaching and detaching mechanism 31 (FIG. 6) and thereafter drawing the fixed insert 16 outside. Accordingly, the troublesome work of attaching and detaching the cooling pipe 138 of the fixed main die 15 is eliminated.

In this case, the male-type member 134 and the female-type member 137 constituting the pipe joint 133 mentioned above may be arranged in a reverse manner, that is, the male-type member 134 may be arranged in the general portion M (the fixed main die 15), and the female-type member 137 may be arranged in the exclusive portion N (the fixed insert 16). Further, the type of the pipe joint 133 is not specified, and any type may be employed as long as the pipe joint can automatically be attached and detached in correspondence to the attachment and detachment of the exclusive portion N with respect to the general portion M. Further, the seal member 139 which seals between the male-type member 134 and the female-type member 137 may be arranged in the end surface joint portion between both members 134 and 137. In this case, a greater displacement between both members 134 and 137 can be absorbed. Further, instead of the pool cooling type, the cooling system may be constructed as a manifold type which distributes the cooling water to each of the cooling water passages from the manifold.

Figure 23:
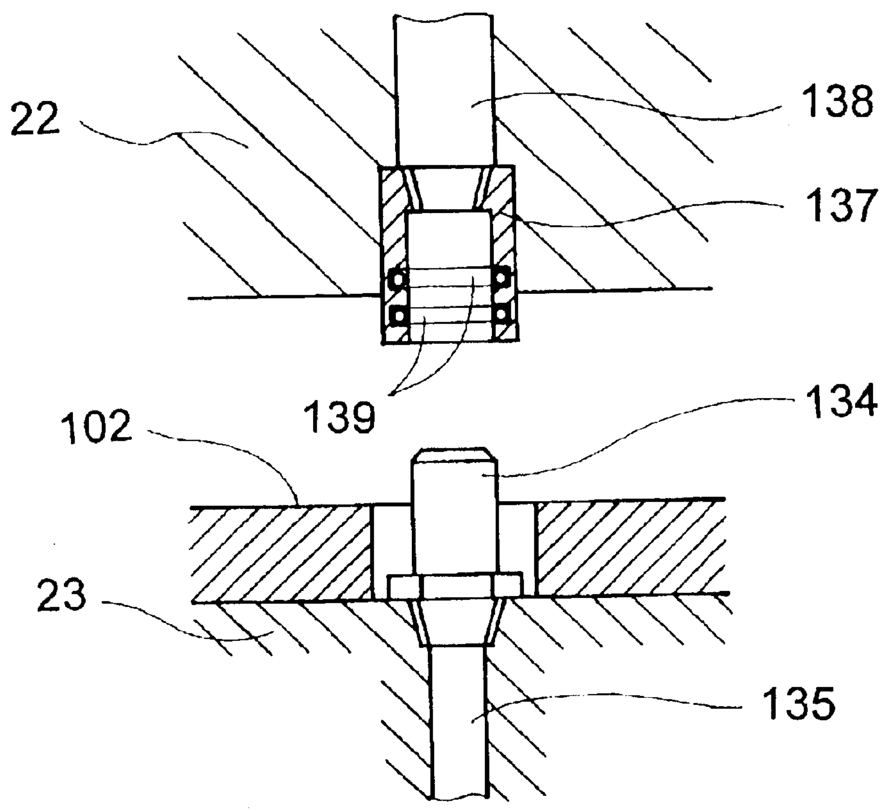
FIG. 23 is a cross sectional view which shows a structure of the cooling system applied to the slide.

In the embodiment mentioned above, although descriptions were given of the cooling system that was applied to the fixed die 11, the cooling system 130 may of course be applied to the movable die 12 and the slide 14. However, in the case of applying the present cooling system 130 to the slide 14, since the slide core 23 is floatably connected to the slide holder 22 as mentioned above (FIG. 17), it is necessary to make the pipe joint 133 accompany the floating of the slide core 23. FIG. 23 shows an embodiment in which the cooling system 130 is applied to the slide 14. Here, a fitting length between the male-type member 134 provided in the slide holder 22 corresponding to the general portion M and the female-type member 137 provided in the slide core 23 corresponding to the exclusive portion N is set longer, and the number of the seal members 139 which seal between both elements is also increased.

The aforementioned die changing apparatus 9 is generally constituted by cross-feed means 141 and transferring means 142 having the cross-feed means 141 mounted thereon, as schematically shown in FIG. 5 mentioned above. The cross-feed means 141 has a function of drawing the aforementioned exclusive portion assembly NN to a predetermined position apart from the fixed main die 15 and the movable main die 17 and pressing the aforementioned exclusive portion assembly NN located at the predetermined position to a predetermined position within the movable main die 17, within the machine 1 in the die open state. Meanwhile, the transferring means 142 has a function of moving (vertically feeding) the cross-feed means 141 mounted with the exclusive portion assembly NN in a direction orthogonal to the die opening and closing direction between inside and outside of the machine 1. The transferring means 142 is provided with a transfer roller 143 to be described in detail below and a base plate 144 mounted on the transfer roller 143, and a plurality of (two, in this case) cross-feed means 141 mentioned above are mounted on the base plate 144.

Figure 24:
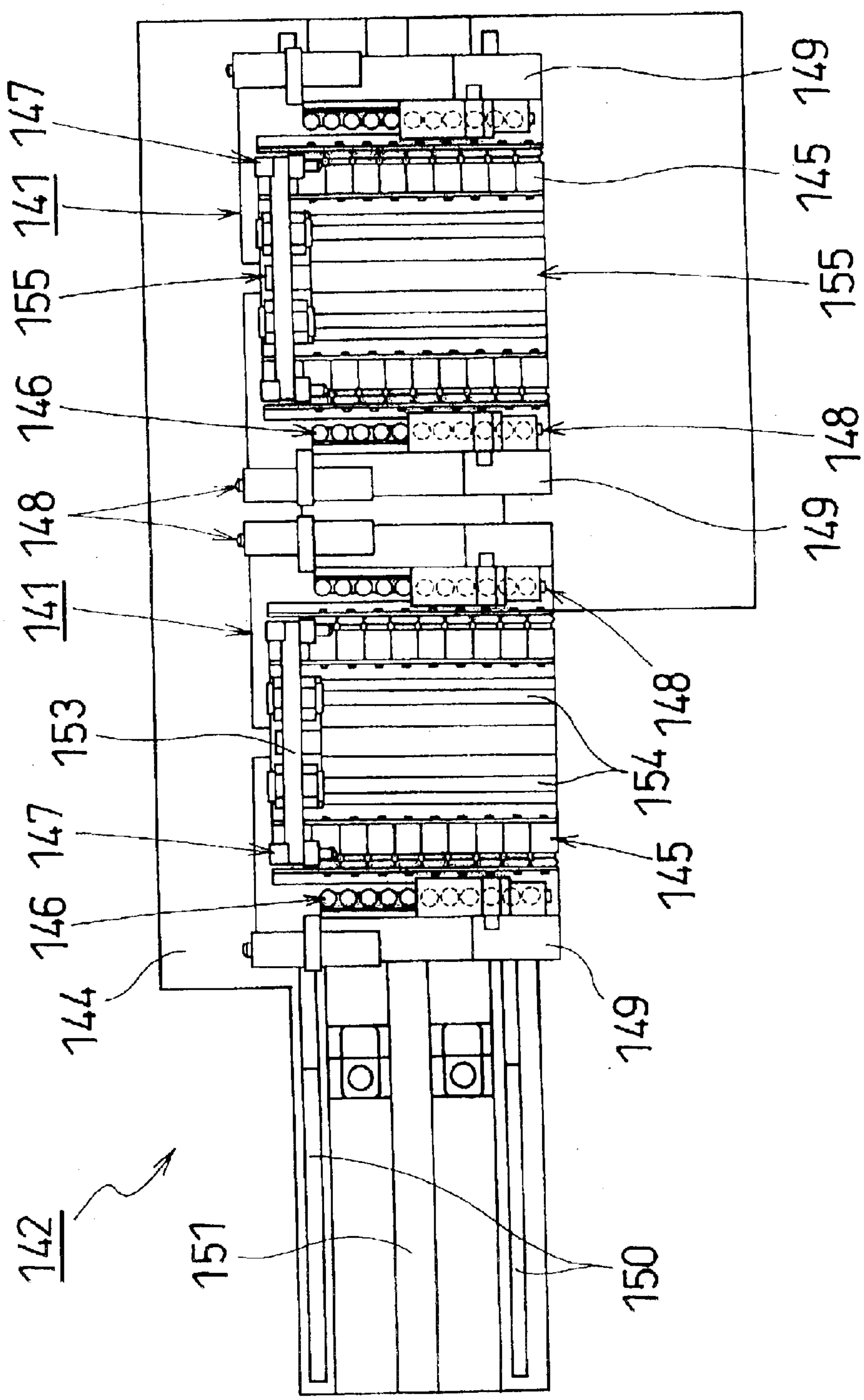
FIG. 24 is a plan view which shows a main structure of a die changing apparatus used in the embodiment in accordance with the present invention.
Figure 25:
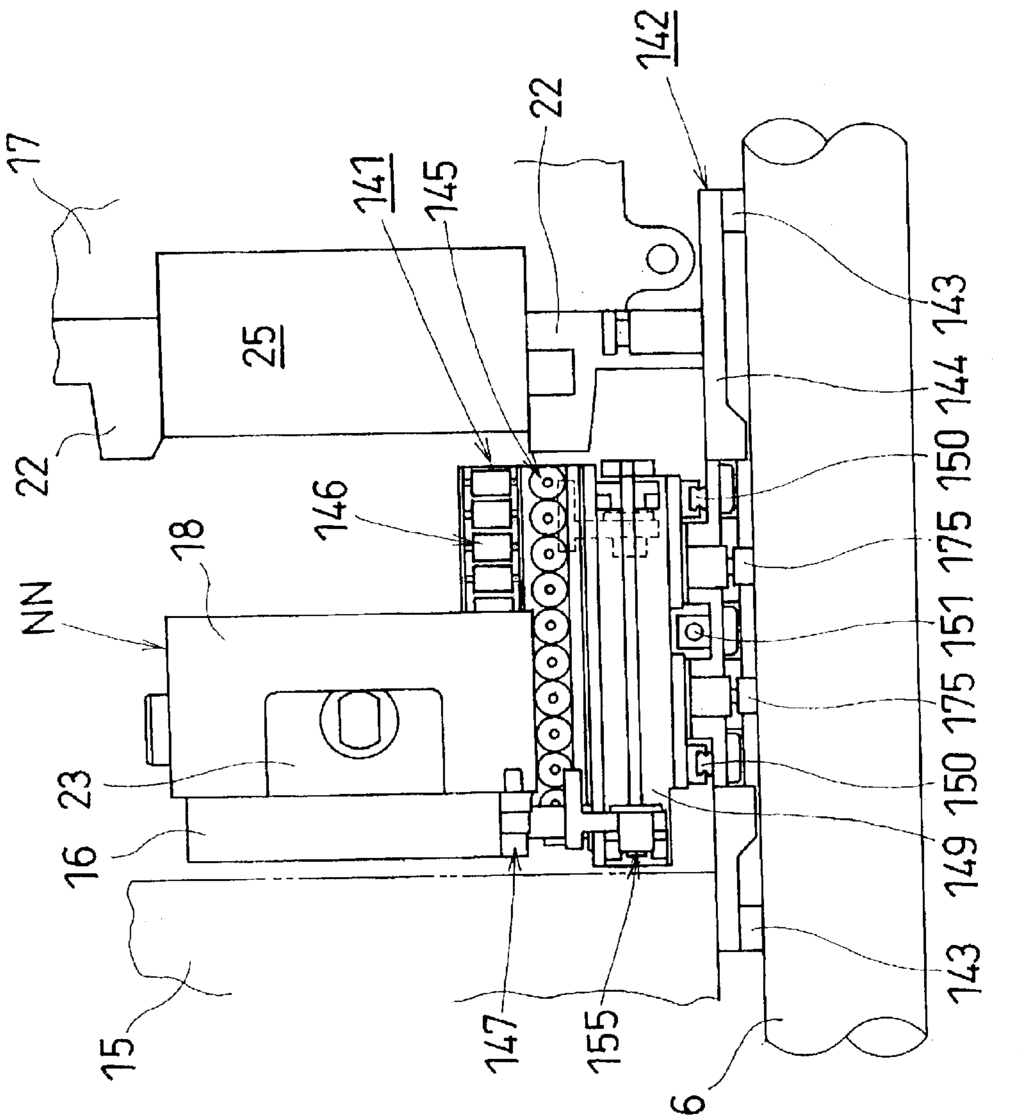
FIG. 25 is a front elevational view of the die changing apparatus shown in FIG. 24.
Figure 26:
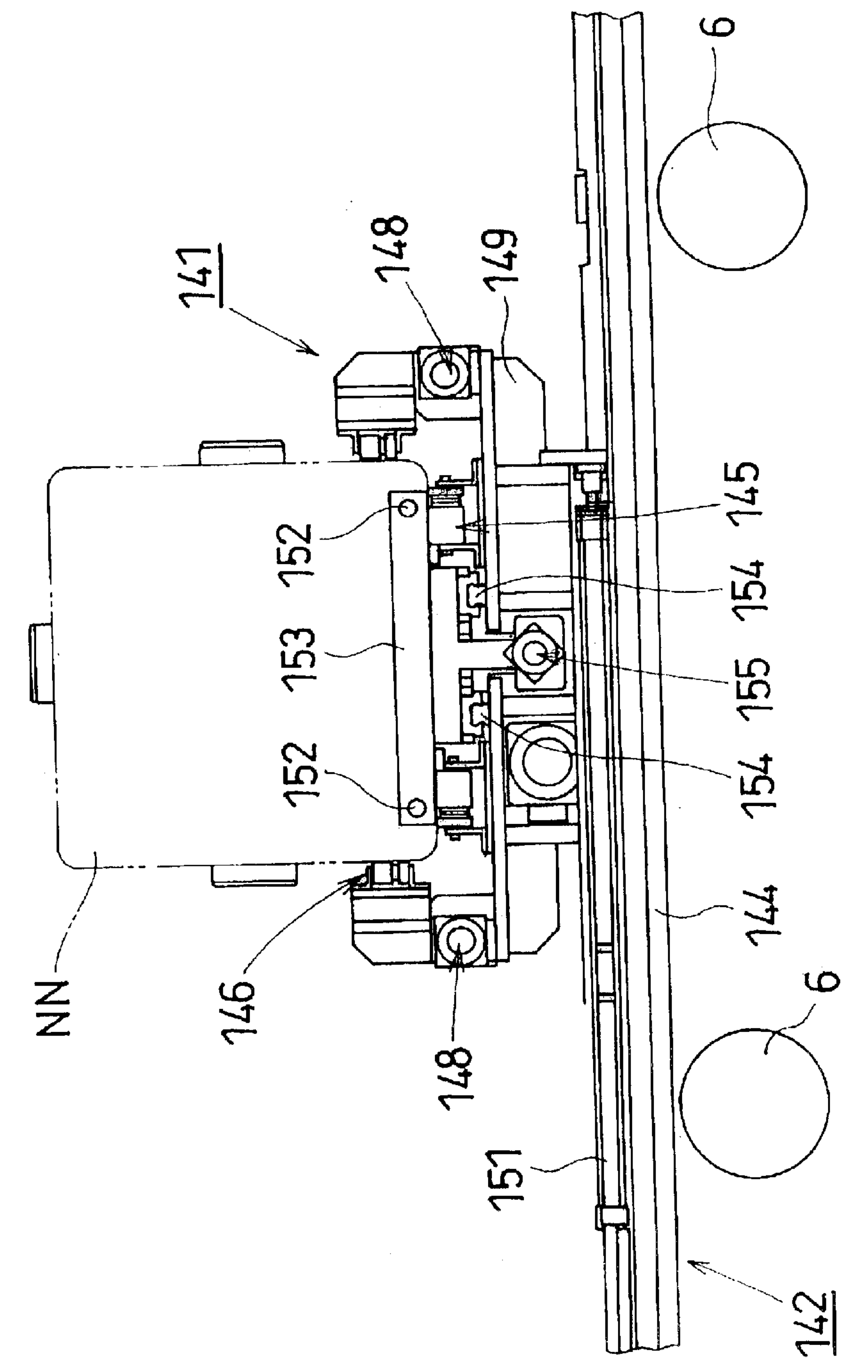
FIG. 26 is a side elevational view of the die changing apparatus shown in FIG. 22.

The cross-feed means 141 is, as suitably shown in FIGS. 24 to 26, provided with a pair of support roller trains 145 which supports the aforementioned exclusive portion assembly NN, a pair of guide roller trains 146 which guides the side surfaces of the exclusive portion assembly NN, die transferring means 147 which is engaged with and disengaged from the exclusive portion assembly NN so as to horizontally move the exclusive portion assembly NN along the guide roller trains 146, and positioning means 148 for positioning the cross-feed means 141 with respect to the fixed die 11 and the movable die 12 in the die open state, and these elements are arranged together on a table 149. In this case, the support roller trains 145 and the guide roller trains 146 are constituted by free rollers.

The tables 149 of the respective cross-feed means 141 are, in this case, mounted in series on the aforementioned base plate 144 in a state of being mutually connected to a pair of left and right guide rails 150 placed so as to extend in a direction orthogonal to the die opening and closing direction. A cylinder 151 for moving the tables 149 along the guide rails 150 is also arranged on the base plate 144. The cylinder 151 constructs shift means for selectively positioning two cross-feed means 141 between the fixed die 11 and the movable die 12 in the die open state. Accordingly, the cylinder 151 is provided as a shifting cylinder, and the table 149 is provided as a shifting table, respectively.

Figure 27:
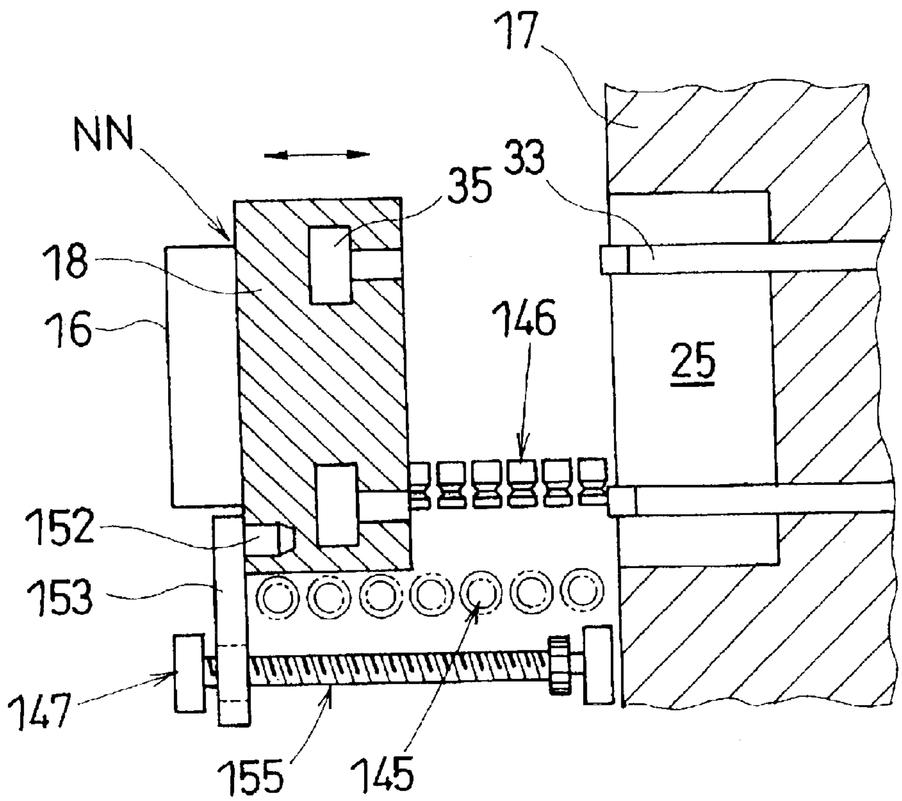
FIG. 27 is a cross sectional view which shows a working state of cross-feed means within the die changing apparatus.
Figure 28:
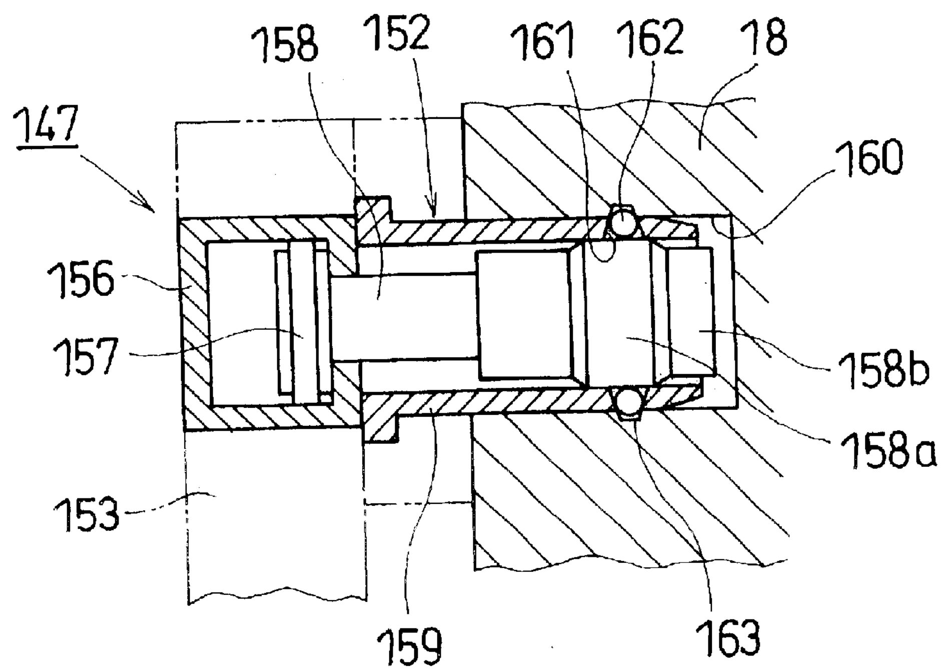
FIG. 28 is a cross sectional view which shows a structure of a ball lock mechanism with which the cross-feed means within the die changing apparatus is equipped.

The aforementioned die transferring means 147 is provided with a pair of ball lock mechanisms 152 which can be automatically attached to and detached from the movable insert 18, as is also shown in FIGS. 27 and 28, and this pair of ball lock mechanisms 152 is arranged in both end portions of a horizontally extended movable arm 153. The movable arm 153 is slidably mounted on a pair of guide rails 154 placed on the shift table 149, and is structured so as to be driven in the die opening and closing direction by a ball screw mechanism 155.

The ball lock mechanism 152 is, as suitably shown in FIG. 28, provided with a cylinder (an air or hydraulic cylinder) 156 provided in the movable arm 153, an operation rod 158 extended from a piston 157 within the cylinder 156 toward the movable die 12, a tubular guide 159 fixed to a front surface of the movable arm 153 so as to surround the operation rod 168, a recess hole 160 which is provided in the movable insert 18 and into which the operation rod 158 and the tubular guide 159 can integrally be fitted, balls 162 held, via the operation rod 158, in a plurality of ball holding holes 161 circumferentially arranged at equal distance from each other in a leading-end portion of the tubular guide 159, and an engagement hole 163 provided on an inner surface of the recess hole 160 of the movable insert 18 and engaging with the aforementioned balls 162. The operation rod 158 has a large diameter portion **158*a* and a small diameter portion 158*b* at the leading end thereof. In correspondence to the movement of the operation rod 158, that is, the operation of the cylinder 156, the balls 162 move between a position at which a ball engages with the engagement hole 163 on the movable insert 18 side and a position at which a ball separates from the engagement hole 163**.

That is, the die transferring means 147 is attached to and detached, as necessary, from the movable insert 18 corresponding to the exclusive portion N or the exclusive portion assembly NN including the movable insert 18 by operating the ball screw mechanism 155 and the ball lock mechanism 152, thereby allowing them to be drawn from or pressed into the recess portion 25 in the movable main die 17. Further, the cylinder 156 constituting the ball lock mechanism 152 is attached to the movable arm 153 in such a manner as to float slightly in the axial radial direction.

Figure 29:
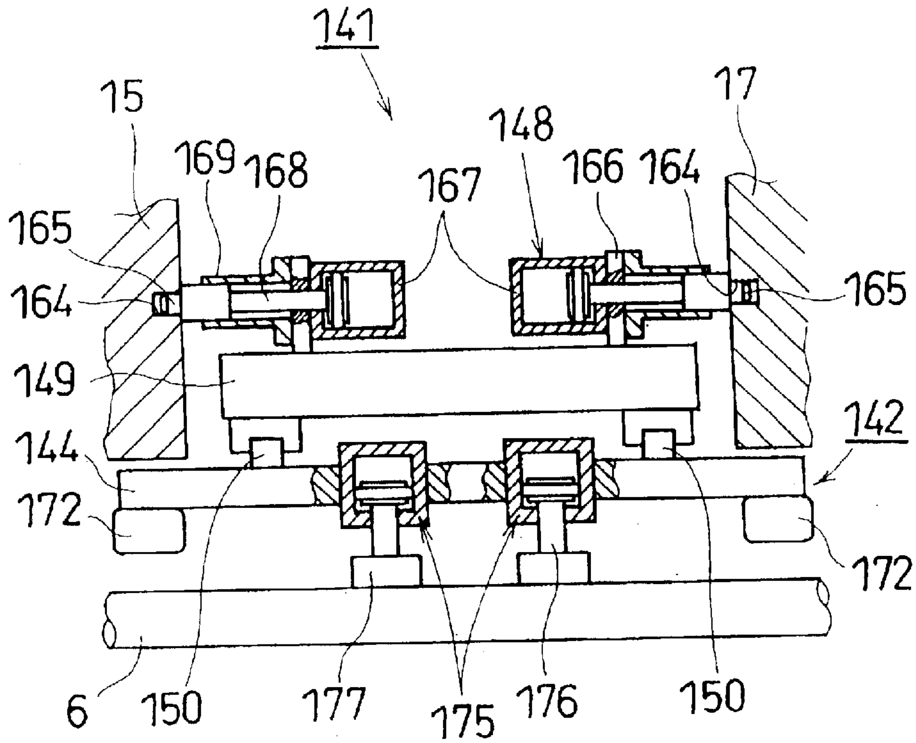
FIG. 29 is a schematic view which shows a positioning means with which the cross-feed means within the die changing apparatus is equipped, and a jack with which a base plate is equipped.
Figure 30:
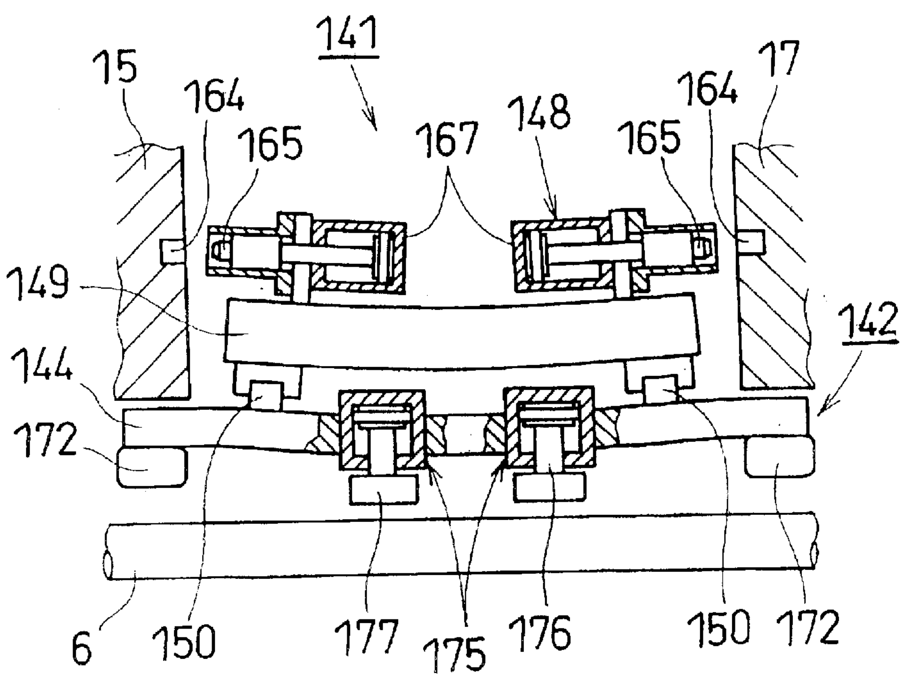
FIG. 30 is a schematic view which shows a state prior to operation of the positioning means and the jack shown in FIG. 29.

Further, the positioning means 148 for positioning the cross-feed means 141 with respect to the fixed die 11 and the movable die 12 has a pin 165 which can be fitted to a positioning hole 164 formed in the fixed main die 15 and the movable main die 17, as shown in FIGS. 29 and 30. This pin 165 is connected to a piston rod 168 extended from a cylinder (a hydraulic cylinder) 167 fixed onto the aforementioned table (the shifting table) 149 via a bracket 166. The pin 165 is also structured so as to be slidably guided by a tubular guide 169 fixed to the aforementioned bracket 166, and moves in and out with respect to the tubular guide 169 in correspondence to the expansion and contraction of the piston rod 168 in the cylinder 167. A pair of cylinders 167 constituting the positioning means 148 is arranged in each side portion of the shift table 149, and, also, a pair of positioning holes 164 to which the pins 165 are fitted are provided in each of the fixed main die 15 and the movable main die 17. The positioning means 148 accurately positions the shift table 149 with respect to the fixed main die 15 and the movable main die 17, that is, the cross-feed means 141 by fitting the pins 165 to the positioning holes 164 by the operation of the cylinder 167.

The transferring roller 143 constituting the aforementioned transferring means 142 commonly uses the existing die-changing transfer roller in this case, and is constituted by an external roller portion 171 arranged in the outer side of the machine 1 and an internal roller portion 172 arranged within the machine 1 as shown in FIG. 5. In this case, the external roller portion 171 is separated into two movable portions provided on a shifting truck 173 capable of moving in the die opening and closing direction, and a fixed portion provided on a relay table 174 disposed between the truck 173 and the machine 1. The external roller portion 171 and the internal roller portion 172 are constituted by driving rollers arranged side to side in two rows, and particularly with respect to the internal roller portion 172, a lateral gap between two rows can be adjusted. The base plate 144 constructing the transferring means 142 moves from the external roller portion 171 to go over the tie bar 6 in the front side by the driving of the transferring roller 143, so as to place the leading end portion thereof on the internal roller portion 172, and further positions the leading end portion above the tie bar 6 on the far side (refer to FIG. 24).

In this case, in order to avoid an interference between the base plate 144 and the general portion M left within the machine 1, that is, the fixed main die 15, the movable main die 17, the slide holder 22, the slide cylinder 107 and the like, the leading end portion of the base plate 144 is formed in an irregular shape (FIG. 24).

In this case, since the base plate 144 is mounted with the cross-feed means 148 and the general portion assembly NN, there is a risk of deflection on the base plate 144 as shown in FIG. 30. If the deflection is left untouched, deflection is also caused in the slide table 149 on the base plate 144, making it difficult to accurately position the cross-feed means 141 with respect to the fixed main die 15 and the movable main die 17. Then, in the present embodiment, as well as FIG. 30, as also shown in FIGS. 25 and 29, a plurality of jacks 175 are provided in the base plate 144. Each of the jacks 175 extends a piston rod 176 thereof at the time when the base plate 144 is completely transferred within the machine 1, so as to press a pressing plate 177 in the leading end of the rod onto the tie bar 6. Then, a reaction force caused thereby lifts up (jacks up) the base plate 144 so as to correct the deflection, whereby a positioning error of the cross-feed means 141 with respect to the fixed main die 15 and the movable main die 17 mentioned above can be eliminated. In this case, in FIGS. 29 and 30, for convenience of explanation, the gap between the base plate 144, the external roller portion 171 and the internal roller portion 172, and the tie bar 6 is set large.

A description will be given below of a die changing method of the exclusive portion N which is applied to the casting die structured as described above by using the aforementioned die changing apparatus 9.

As a precondition for die changing of the movable insert 16, the fixed insert 18, the pressing plate 21 and the slide core 23 which correspond to the exclusive portion N, of the two cross-feed means 141 mounted on the base plate 144, one on the front side in the transferring direction into the machine 1 is made empty so that the exclusive portion assembly NN taken out from the machine 1 can be mounted. On the other hand, the other cross-feed means 141 on the rear side in the transferring direction is pre-mounted with the exclusive portion assembly NN which is newly mounted to the machine.

At the time of die changing, firstly, the fixed die 11 and the movable die 12 are closed in accordance with the movement of the movable platen 3, and, in this die close state, the fluid pressure of the clamping cylinder 39 of the clamp apparatus 31 corresponding to the attaching and detaching mechanism O in the fixed die 11 side is released. Then, the T-shaped clamper 33 is reversed 90 degrees by the operation of the rotary mechanism 41. Further, at the same time, on the slide 14 side, the fluid pressure of the slide cylinder 107 is released, and the T-shaped clamper is reversed 90 degrees by operating the rotary mechanism. Next, the T-shaped clamper 33 is extended by applying the fluid pressure to the clamping cylinder 39, and, at the same timing, the movable die 12 is integrally opened with the movable platen 3 with respect to the fixed die 11. At this time, the T-shaped clamper 33 is extended at a higher speed than the die opening speed, and on the basis of this speed difference, the fixed insert 16 slightly floats up from the bottom surface of the recess portion 24 of the fixed main die 15 while maintaining the state in which the fixed insert 16 is closely attached to the movable insert 18 as shown in FIG. 6. As a result, the operation rod 63 of the ball lock mechanism 61 corresponding to the connection mechanism P retracts by the energizing force of the spring 69, and the ball 67 engages with the engagement recess portion 68 on the movable insert 18 side, whereby the fixed insert 16 and the movable insert 18 come to be in the connection state (the locked state). Further, at this time, the cooling system 130 of the fixed die 11 is automatically separated into the fixed main die 15 side and the fixed insert 16 side, by the male-type member 134 being automatically separated from the female-type member 137 constituting the pipe joint 133 (FIG. 21). Further, in the case that the core pin 125 exists in the fixed insert 16 (FIG. 20), the core pin 125 remains within the fixed insert 16 due to the resistance of the elastic member 128.

Figure 1:
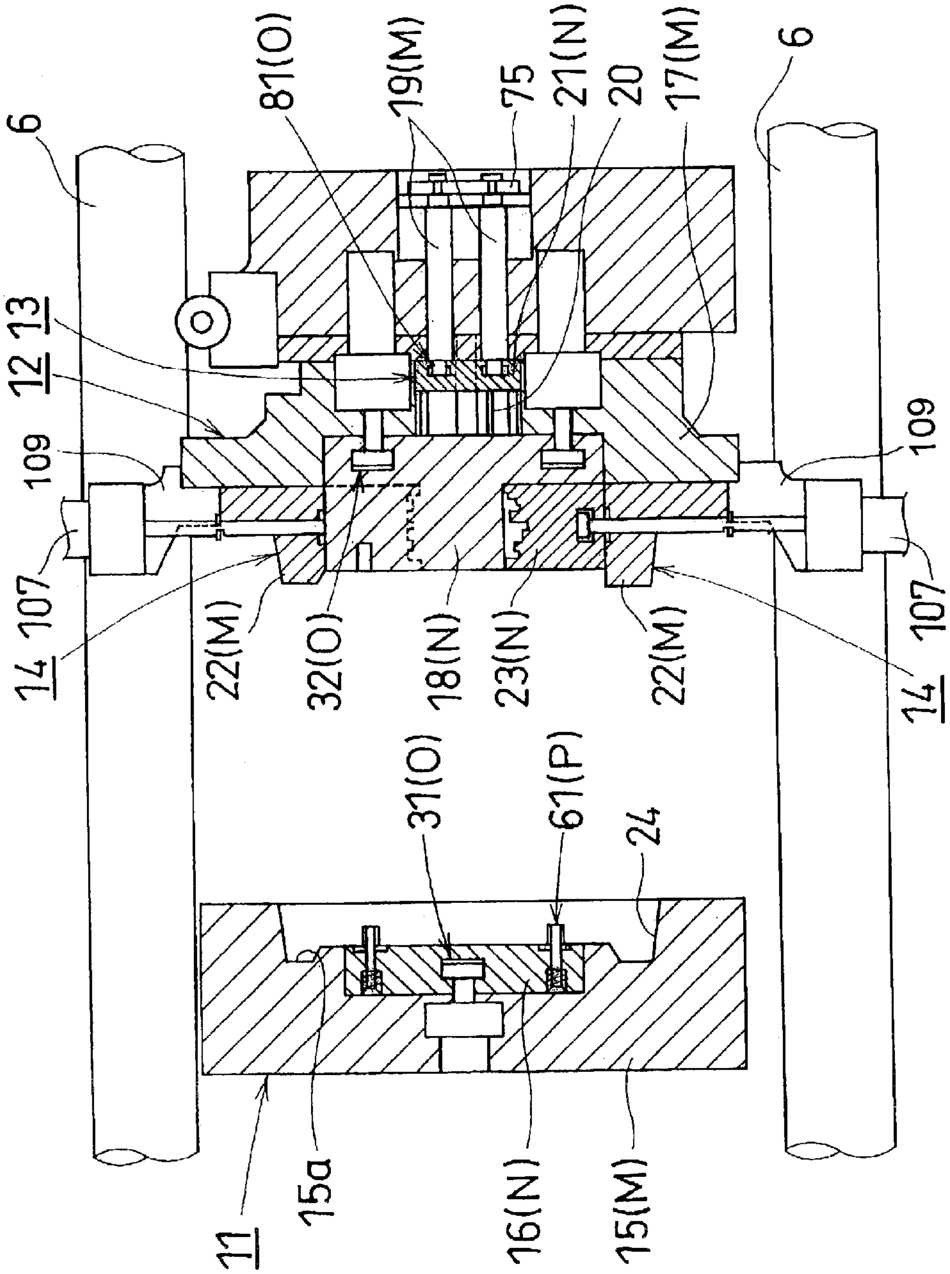
FIG. 1 is a cross sectional view which shows an overall structure of a molding die in accordance with the present invention in a die open state.

The movable main die 17 thereafter continues the die opening motion, however, since the T-shaped clamper 33 is aligned with the opening of the T-shaped slot 35, the T-shaped clamper 33 smoothly comes off from the T-shaped slot 35, whereby the fixed insert 16, the movable insert 18 and the slide 14 including the slide core 23, the slide holder 22 and the cylinder 107 are integrally retracted to the original die opening position (FIG. 1).

Next, the pressure fluid is supplied to the cylinder 83 within the ball lock mechanism 81 (FIG. 16) of the pressing means 13, moving the ball 86 of the ball lock mechanism 81 to a non-interference position with respect to the female-type member 84 on the pressing plate 21 side, and thus the pressing plate 21 and the pressing rod 19 come to be in an unlocked state. Further, about that time, the rotary mechanism 113 constituting the slide actuator 108 is operated, allowing the T-shaped clamper 105 to be separable from the T-shaped slot 106 (FIG. 17) of the slide core 23. Subsequently, as the rod 111 in the cylinder 107 contracts, the slide holder 22 separates from the slide core 23, and retracts to the standby position. At this time, since the slide core 23 is prevented from coming off from the fixed main die 16 by the aforementioned concavo-convex fitting means 120 (FIG. 19), the fixed insert 16, the movable insert 18, the pressing plate 21 and the slide core 23 which correspond to the exclusive portion N remain in the movable main die 17 integrally, that is, in the form of the exclusive portion assembly NN.

Thereafter, the base plate 144 moves into the machine 1 by the driving of the transferring roller 142, and, based on the transferring completion signal, the jack 175 provided in the base plate 144 is operated, jacking up the base plate 144 as shown in FIG. 29 to correct the deflection of the base plate 144. At this time, the empty cross-feed means 141 in the leading end side on the base plate 144 is positioned between the fixed die 11 and the movable die 12 in the die open state. Upon completion of the jack-up, the cylinder 167 within the positioning means 148 provided in the cross-feed means 141 is operated, and the pins 165 are fitted to the positioning holes 164 in the fixed main die 15 and the movable main die 17 as shown in FIG. 29, whereby the empty cross-feed means 141 is accurately positioned with respect to both of the main dies 15 and 17.

Figure 31:
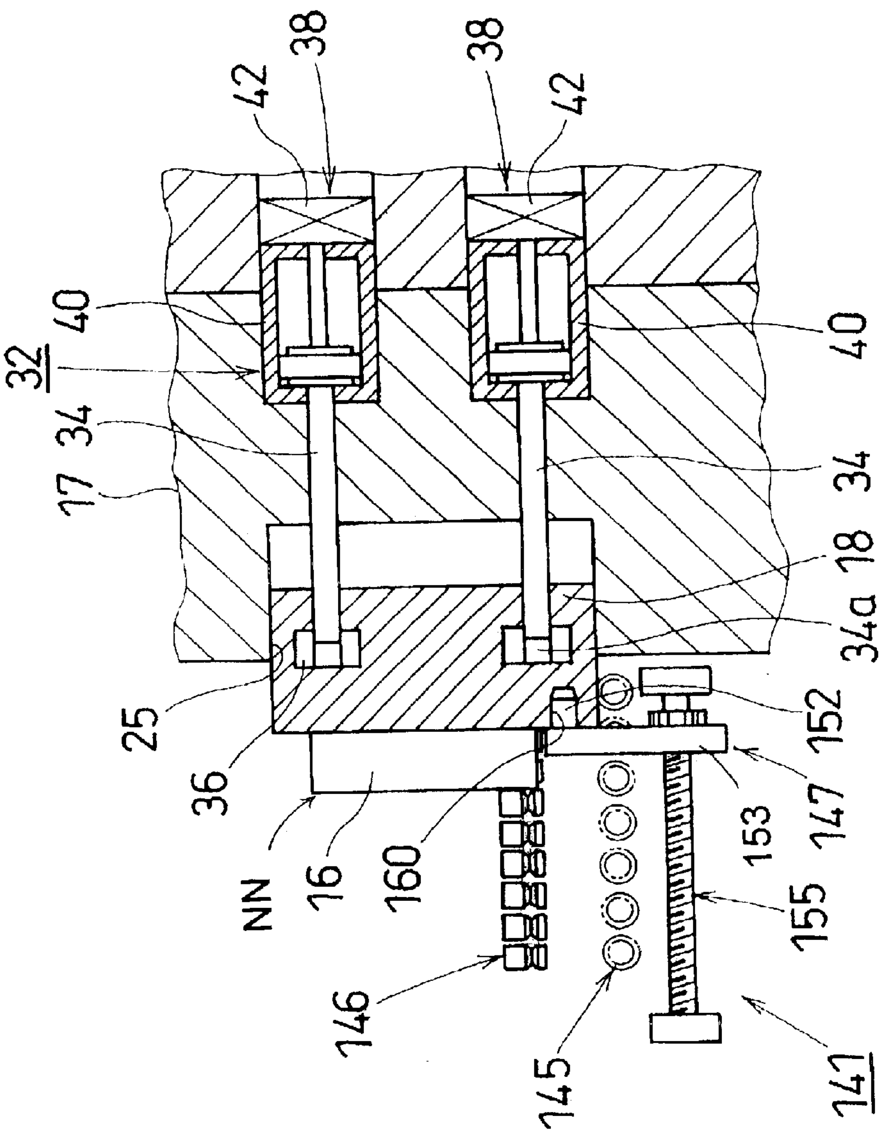
FIG. 31 is a cross sectional view which shows a state in which die changing is being performed by the die changing apparatus.

Further, based on the positioning completion signal mentioned above, the fluid pressure of the cylinder 40 within the clamp apparatus 32 on the aforementioned movable die 12 side is released, and then the T-shaped clamper 34 is reversed 90 degrees by the operation of the rotary mechanism 42. Thereafter, the T-shaped clamper 34 extends by the operation of the cylinder 40. Then, as shown in FIG. 31, the exclusive portion assembly NN is pressed out at a predetermined distance from the recess portion 25 of the movable main die 17, and a part thereof (a part of the movable insert 18) rides over the support roller trains 145 within the aforementioned cross-feed means 141. Meanwhile, about the same time of pressing the exclusive portion assembly NN, the ball screw mechanism 155 within the die transferring means 147 is operated, and the movable arm 153 advances toward the movable main die 17 as shown in FIG. 31. Accordingly, the ball lock mechanisms 162 (FIG. 28) provided in both end portions of the movable arm 153 are fitted into the recess holes 160 provided in the movable insert 18. Further, the balls 162 are engaged with the engagement holes 163 on the movable insert 18 side by the operation of the cylinder 156 within the ball lock mechanism 152, and thus the overall exclusive portion assembly NN is connected to the movable arm 153 of the die transferring means 147 via the movable insert 18. Thereafter, the movable arm 153 retracts in accordance with the re-operation of the ball screw mechanism 155, and the exclusive portion assembly NN is completely separated from the movable main die 17 as shown in FIG. 26 so as to be mounted at a predetermined position on the empty cross-feed means 141. Accordingly, the removal of the exclusive portion assembly NN as the old part from the general portion M is completed, and the positioning means 148 on the cross-feed means 141 retracts. In this case, at this time, the cooling system for the movable die 12 and the slide 14 is separated between the general portion M and the exclusive portion N in the same manner as that on the fixed die 11 side, and the cast pin 121 remains in the exclusive portion N.

Next, the shift table 149 on which the new exclusive portion assembly NN is mounted, that is, the loaded cross-feed means 141 moves between the fixed main die 15 and the movable main die 17 in the die open state by the operation of the shifting cylinder 151 on the base plate 144. At the same time the movement is stopped, the cylinder 167 within the positioning means 148 provided in the cross-feed means 141 is operated, and the loaded cross-feed means 141 is accurately positioned with respect to both of the main dies 15 and 17 in the same manner as mentioned above.

Then, based on the positioning completion signal mentioned above, the ball screw mechanism 155 within the die transferring means 147 is operated, and the movable arm 153 advances toward the movable main die 17 so as to move the exclusive portion assembly NN from the position shown in FIG. 27 to the position shown in FIG. 31, and press the exclusive portion assembly NN halfway into the recess portion 25 of the movable main die 17. At this time, the exclusive portion assembly NN is accurately guided by the support roller trains 145 and the guide roller trains 146 within the cross-feed means 141, and is smoothly pressed into the recess portion 25 of the movable main die 17. Meanwhile, the T-shaped clamper 34 of the clamp apparatus 32 on the movable die 12 side is kept on standby within the recess portion 25 in the extended state and in the 90 degrees reversed state (in the unclamped state), and the head portion 34*a* of each T-shaped clamper 34 enters into the T-shaped slot 36 of the movable insert 18. The clamp apparatus 32 thereafter reverses the T-shaped clamper 34 by 90 degrees by the operation of the rotary mechanism 42, and subsequently contracts (clamps) the T-shaped clamper 34 by the operation of the clamping cylinder 40. Then, as shown in FIG. 11, the exclusive portion assembly NN is drawn toward the bottom portion of the recess portion 25 in the movable main die 17, and the exclusive portion assembly NN including the movable insert 16 is fixed to the movable main die 17.

In this case, when the exclusive portion assembly NN is drawn toward the bottom portion of the recess portion 25 in the movable main die 17, the female-type member 84 on the side of the pressing plate 21 of the pressing means 13 and the male-type member 82 on the side of the pressing rod 19 are automatically brought into the fitted state, and the pressure fluid is immediately discharged from the cylinder 83 within the ball lock mechanism 81 (FIG. 17) based on the signal indicating that the fixing of the exclusive portion assembly NN with respect to the movable main die 17 is completed. Then, the piston 89 advances by the compression spring 95, making the balls 86 of the ball lock mechanism 81 interfere with the female-type member 84 of the pressing plate 21 side, and the pressing plate 21 and the pressing rod 19 are brought into the unlocked state. Further, about the same time of the unlocking operation of the ball lock mechanism 81, the T-shaped clamper 105 advances integrally with the slide holder 22 in accordance with the operation of the slide cylinder 107, and the head portion 105*a* of the T-shaped clamper 105 enters into the T-shaped slot 106 of the slide core 23.

Next, the cylinder 167 within the positioning means 148 provided in the cross-feed means 141 is operated as shown in FIG. 30, and the pin 165 is separated from the positioning holes 164 in the fixed main die 15 and the movable main die 17. Subsequently, the jack 175 provided in the base plate 144 is operated, and the piston rod 176 thereof is contracted. Accordingly, the base plate 144 is disconnected from the dies (the fixed die 11, the movable die 12 and the like) and the machine 1, and moves to outside the machine 1 from inside the machine 1 in correspondence to the driving of the transferring roller 142. Therefore, the exclusive portion assembly NN as the old part on the base plate 144 is transferred out of the machine 1.

At this time, since most part of the exclusive portion assembly NN is accommodated within the recess portion 25 of the movable main die 17 which is set relatively deep, the transferring passage of the base plate 144 is opened wide enough, and thus the exclusive portion assembly NN as the old part mounted on the base plate 144 can be smoothly transferred out of the machine 1 without interfering with the exclusive portion assembly NN as the new part. In other words, at a time of die changing, it is not necessary to open the die more than standard, and therefore, design of the machine 1 need not be changed.

Thereafter, the exclusive portion assembly NN fixed to the movable main die 17 moves toward the fixed main die 15 in accordance with the movement of the movable platen 3, that is, the die closing operation. At this time, as shown in FIG. 4, in a stage that the taper shoulder portion 22*a* of the slide holder 22 slightly fits to the opening edge portion of the recess portion 24 in the fixed main die 15, the die closing operation is temporarily stopped. Simultaneously, the clamp force of the clamp apparatus 32 on the movable die 12 side is reduced, and the fluid pressure of the slide cylinder 107 is released. Then, the lower slide holder 22 slightly drops due to the fluid pressure release of the cylinder 107 within the slide actuator 108. However, since the leading end portion is supported to the opening edge portion connected to the recess portion 24 of the fixed main die 15, the slide holder does not drop significantly.

Next, when the die closing motion is restarted, the fixed insert 16 in the exclusive portion assembly NN is gradually pressed within the recess portion 24 of the fixed main die 15. However, since the fixed insert 16 is loosely fixed to the movable main die 17 due to the reduction of the clamp force mentioned above, the slide holder 22 and the exclusive portion assembly NN are smoothly pressed in along the inner surface of the fixed main die 15. At this time, the clamp apparatus 31 on the fixed die 11 side positions the T-shaped clamper 33 as shown in FIGS. 4 and 6 at the advanced end so as to release the fluid pressure within the clamping cylinder 39, and positions the head portion 33*a* of the T-shaped clamper 33 such that the head portion 33*a* can be inserted into the T-shaped slot 35 provided in the fixed insert 16. Therefore, the head portion 33*a* of the T-shaped clamper 33 enters into the T-shaped slot 35 in correspondence to the aforementioned pressing-in. Further, on the basis of the completion of the die closing, the rotary mechanism 41 of the clamp apparatus 31 on the fixed die 11 side is operated and the T-shaped clamper 33 is reversed 90 degrees, whereby the fixed insert 16 is firmly clamped to the fixed main die 15. Further, at the same time, the rotary mechanism on the slide 14 side is operated and the T-shaped clamper 105 is reversed 90 degrees, so that the slide core 23 is prevented from coming off with respect to the slide holder 22, and the clamp apparatus 32 on the movable die 12 side is operated to firmly clamp the movable insert 18 to the movable main die 17.

Further, on the basis of the completion of attachment of the fixed insert 16 to the fixed main die 16, the ball lock mechanism 61 connecting the fixed insert 16 to the movable insert 18 is automatically unlocked. Thereafter, the movable die 12 is opened with respect to the fixed die 11 in correspondence to the movement of the movable platen 3, whereby the die changing of the exclusive portion N with respect to the general portion M is completed.

As mentioned above, in accordance with the present embodiment, the exclusive portion N as the old part can collectively be taken out from the general portion M and the new exclusive portion N can collectively be mounted to the general portion M with the general portion M left in the machine 1 and without attaching and detaching the tie bar 6, by attaching and detaching the general portion M and the exclusive portion N by means of the attaching and detaching mechanism O on the die side, connecting and disconnecting the exclusive portions N with each other by means of the connection mechanism P on the die side, opening and closing the dies on the machine 1 side, pressing in and drawing out the exclusive portion assembly NN with respect to the general portion M (the movable main die 17) by means of the cross-feed means 141 on the die changing apparatus 9 side, shifting two shifting tables 149 (the cross-feed means 141) by means of the shifting cylinder 151 on the die changing apparatus 9 side, transferring the base plate 144 inside and outside the machine by means of the transferring roller 142 on the die changing apparatus 9 side, and the like. That is, die changing of the exclusive portion N can be performed extremely efficiently, making it possible to swiftly correspond to a large item small scale production, an early wastage of the die or the like.

In this case, in the present invention, it is a matter of course that the fixed insert 15, the movable insert 17 and the slide core 23 which respectively correspond to the exclusive portion N may be changed individually, instead of integrating the exclusive portions N in the die close state as mentioned above, that is, without performing the die changing collectively in the form of the exclusive portion assembly NN.

Figure 32:
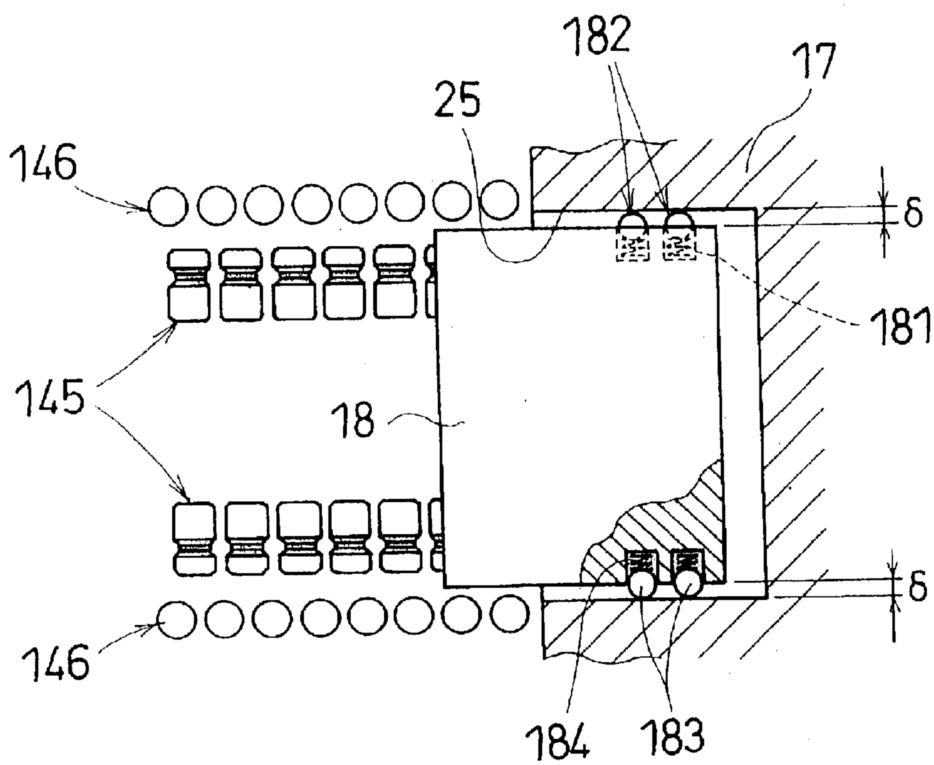
FIG. 32 is a cross sectional view which shows, in a plan view, another embodiment in accordance with the present invention applied to the movable insert.
Figure 33:
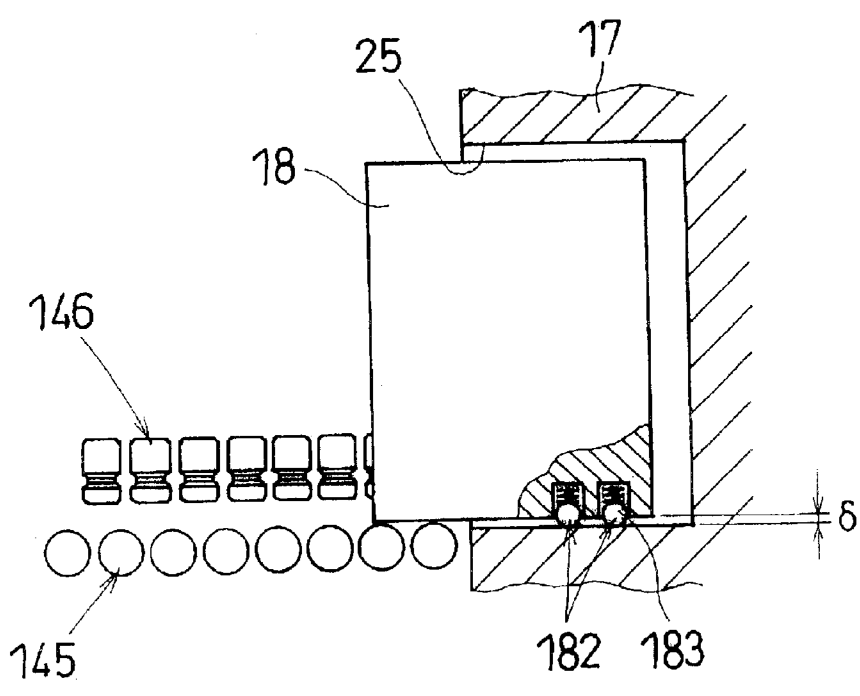
FIG. 33 is a cross sectional view which shows the same portion as that shown in FIG. 32 in a side view.

Meanwhile, in the embodiment mentioned above, since the movable insert 18 is positioned and fixed with respect to the movable main die 17 while maintaining the die close state after the fixed insert 16 is positioned and fixed with respect to the fixed main die 15 with reference to a molten metal injection port 190 (refer to FIG. 34), a fitting accuracy between the recess portion 25 of the movable main die 17 and the movable insert 18 need not be set too high. Therefore, the clearance between the recess portion 25 of the movable main die 17 and the movable insert 18 can be set relatively large. This state is shown in FIGS. 32 and 33, in which a clearance 6 between the recess portion 25 of the movable main die 17 and the movable insert 18 is set to about 1 mm. By the way, in the case of taking out the whole of the die and performing die changing outside the machine as in the conventional structure, it is necessary to set the clearance δ to about 5/100 mm, and thus skill is required for die changing of the exclusive portion N.

However, in the case of setting a large clearance between the recess portion 25 of the movable main die 17 and the movable insert 18 as mentioned above, a play between both elements is caused at the time of pressing the movable insert 18 into the recess portion 25 by the cross-feed means 141, creating a risk of mutilation on any of the elements. Accordingly, in another embodiment in accordance with the present invention, rolling bearings (pressing guide means) 182 are provided in recess holes 181 arranged in left and right side surfaces and bottom surface of the movable insert 18 as shown in FIGS. 32 and 33. The rolling bearing 182 is constituted by a rolling body 183 and a spring 184 energizing the rolling body 183 in a protruding direction from the recess hole 181. When the movable insert 18 (the exclusive portion assembly NN) is pressed into the recess portion 25 of the movable main die 17, the rolling body 183 rolls on a wall surface (FIG. 32) or a bottom surface (FIG. 33) of the recess portion 25. Accordingly, the movable insert 18 is smoothly pressed into the recess portion 25 of the movable main die 17. In this case, since the rolling bearing 182 also serves as a positioning guide with respect to the guide roller trains 146 of the cross-feed means 141, the interval of the guide roller trains 146 can be set slightly larger than the width of the movable insert 18, thereby allowing easy loading of the exclusive portion assembly NN onto the cross-feed means 141.

Furthermore, the movable main die 17 and the movable insert 18 may be structured such as to be fitted with each other at the taper portions, and in this case, the rolling bearing 182 is not required.

Figure 34:
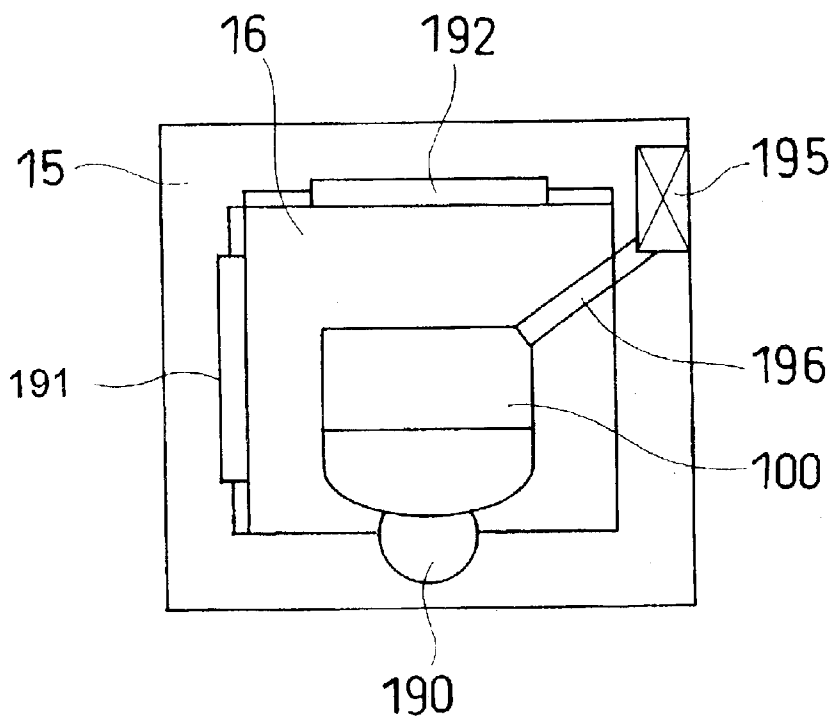
FIG. 34 is a front elevational view which shows another embodiment in accordance with the present invention applied between a fixed main die and a fixed insert.
Figure 35:
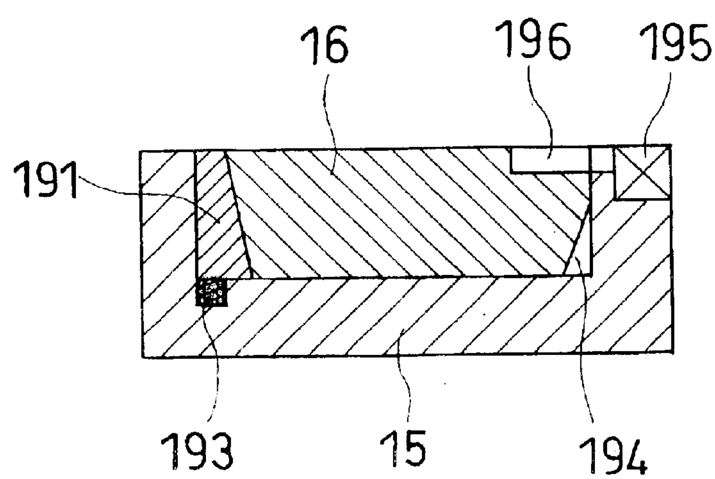
FIG. 35 is a cross sectional view which shows the same portion as that in FIG. 34.

Further, by employing a procedure of initially positioning and fixing the fixed insert 16 with respect to the fixed main die 15 with reference to the molten metal injection port 190, it is necessary to fit the fixed insert 16 to the recess portion 24 of the fixed main die 15 at a high accuracy. In order to smoothly achieve this operation, in yet another embodiment in accordance with the present invention, as shown in FIGS. 34 and 35, wedge members 191 and 192 are arranged along two adjacent surfaces, of the recess portion 24, that are apart from the molten metal injection port 190, and energizing means 193 for normally energizing each of the wedge members 191 and 192 to an opening side is provided in the bottom of the recess portion 24. By providing the wedge members 191 and 192 as mentioned above, when the fixed insert 16 (the exclusive portion assembly NN) is pressed into the recess portion 24 of the fixed main die 15 by utilizing the die opening and closing motion of the machine 1 as mentioned above, the fixed insert 16 is brought in close contact with the other two surfaces (reference surfaces) provided with the molten metal injection port 190 while pressing the wedge members 191 and 192, and thus the fixed insert 16 is positioned and fixed with respect to the fixed main die 15 at a high accuracy. In this case, a tapered relief surface 194 may be provided on one side surface of the fixed insert 16, due to which the positioning accuracy is further improved. Furthermore, in some dies, a pressure reduction valve 195 for gas drainage is set. However, since the fixed insert 16 is securely in close contact with the fixed main die 15 as mentioned above, a pressure reduction runner 196 connected to the pressure reduction valve 195 is not split in the middle, and sticking of the fixed insert 16 due to burr generation caused by the molten metal intrusion can be prevented.

In this case, it is desirable to pre-arrange a high hardness member on a mating face, that mates with the fixed insert 16, of the inner wall of the recess portion 24 in the fixed main die 15 by means of a separated piece connection, a build-up welding or the like, and, accordingly, galling which is easily caused on the mating face can be prevented.

Next, a description will be given of another embodiment of the slide attaching and detaching mechanism O in accordance with the present invention with reference to FIGS. 36 to 39. In this embodiment, the same reference numerals are used to the same parts or corresponding parts to those of the embodiment mentioned above, thereby omitting descriptions thereof.

A clamp apparatus 200 corresponding to the slide attaching and detaching mechanism O in accordance with the present invention is generally provided with an engaged member 202 having an inclined portion 201 provided on a back surface side of the slide core 23, a ball 203 corresponding to an engagement member which is engaged with or disengaged from the inclined portion 201 of the engaged member 202 by moving in a direction intersecting the die opening and closing direction of the slide core 23, and an actuator 204 for moving the ball 203 in a direction intersecting the die opening and closing direction of the slide core 23. Further, the clamp apparatus 200 in this embodiment is structured so as to be interlocked with an integration mechanism P for integrating with the other exclusive portion N (the fixed insert 16 and the movable insert 18) at the time of die changing.

A step portion 205 connected to the receiving groove 101 to which the slide core 23 is slidably fitted and held is formed in the movable insert 18 in this embodiment. A receiving member 206 is fitted and firmly attached to a side surface of the step portion 205, and an engagement recess portion 207 is formed on an inner surface of the receiving member 206. The slide core 23 is positioned and fixed by engaging the engaged member 202 in the back surface side with the receiving member 206 in a state in which the slide core 23 is received in the receiving groove 101, and seating the engaged member 202 on the step portion 205. An opening portion 208 is formed in a center portion of the engaged member 202 on the slide holder 22 side, and the inclined portion 201 is formed in an inner periphery of the opening portion 208 in such a manner that a diameter thereof is gradually reduced from the slide core 23 side toward the slide holder 22 side. In the case of this embodiment, the engaged member 202 employs a separated structure in which an outer portion fitted and inserted to the receiving member 206 and an inner portion having the opening portion 208 and the inclined portion 201 connected thereto are combined, however, these parts may be integrally formed.

The periphery of the opening portion 208 of the engaged member 202 is provided with a through hole 209 extending in a thickness direction (a direction from the slide core 23 side toward the slide holder 22 side). A pin 210 and a spring 211 are arranged within the through hole 209. The pin 210 is formed so as to have a small diameter on the slide holder 22 side and a large diameter on the slide core 13 side. A plug 212 on which one end of the spring 211 sits is fitted and attached to an opening end portion of the through hole 209 on the slide core 23 side, and the pin 210 is normally energized toward the slide holder 22 by the spring 211. Further, a closed end hole 213 is formed on an outer peripheral surface of the engaged member 202. In the closed-end hole 213, a ball 214 corresponding to the engagement member capable of engaging with the engagement recess portion 207 of the receiving member 206, and a spring 215 energizing the ball 214 toward a radially outer side are arranged. Further, an opening of the closed-end hole 213 is provided with a holding member 216 which is formed to hold the ball 214 so as to prevent the ball 214 from jumping out by the energizing of the spring 215, and to protrude the ball 214 so as to engage it with the engagement recess portion 207 of the receiving member 206. Additionally, a holding hole 217 communicated with the through hole 209 is formed in a bottom portion of the closed-end hole 213, and a stopper pin 218 having substantially the same length as that connecting the ball 214 and the large diameter portion of the pin 210 within the aforementioned through hole 209 is arranged in the holding hole 217.

A connection member 219 fitted into the opening portion 208 of the engaged member 202 is provided in the slide holder 22, and a plurality of balls 203 corresponding to the aforementioned engaged member are held in the leading end portion of the connection member 219 so as to freely move outward and inward. Further, a taper member 220 which moves back and forth by the aforementioned actuator 204 to move ball 203 outward and inward is arranged in an inner portion of the connection member 219. In this embodiment, the taper member 220 is formed so that a diameter thereof is gradually reduced toward the slide core 23 side. Accordingly, when the taper member 220 is advanced by the driving of the actuator 204, the balls 203 are pressed outward. On the other hand, when the taper member 220 is retracted, the balls 203 can be retracted inward. Further, a pressing pin 221 is provided in the periphery of the connection member 219 in correspondence to the through hole 209 formed in the engaged member 202. In this embodiment, the base end portion of the slide holder 22 is connected to the aforementioned slide driving cylinder 107 (FIG. 18).

Figure 38:
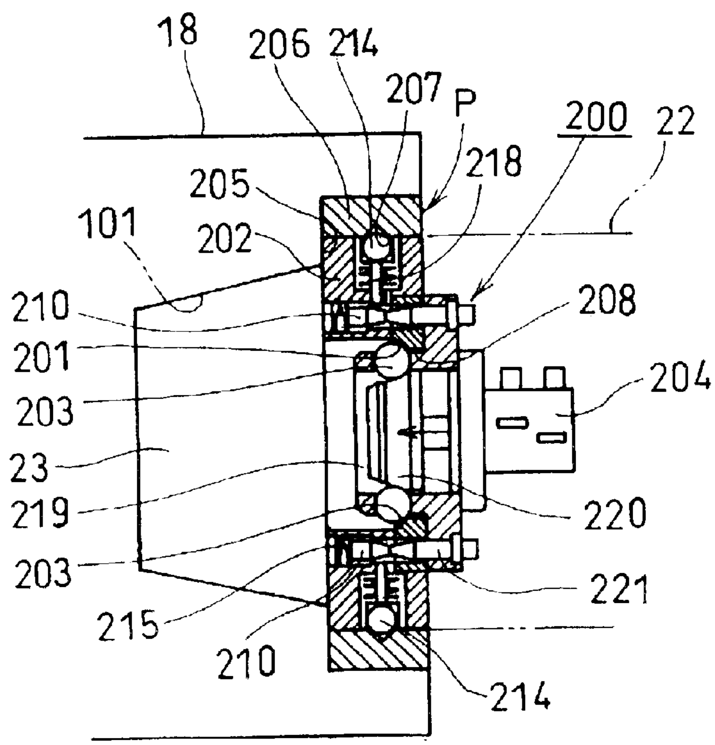
FIG. 38 is a cross sectional view which shows a connection state of the attaching and detaching mechanism shown in FIG. 36.

In the clamp apparatus 200 corresponding to the slide attaching and detaching mechanism O structured as above, when performing normal die casting, the engaged member 202 is brought into contact with the step portion 205 of the movable insert 18 as shown in FIG. 38, functioning as a stopper for regulating the fitting and inserting position of the slide core 23 with respect to the receiving groove 101. Further, the connection member 219 holding the balls 203 of the slide holder 22 is fitted and inserted to the opening portion 208 of the engaged member 202, and the actuator 204 is maintained in an extended state, whereby the balls 203 are pressed outward by the taper member 220.

Accordingly, the engaged member 202 of the slide core 23 is operated so as to constantly be attracted to the slide holder 22, and the slide core 23 is rigidly connected to the slide holder 22 with no play. At this time, the pressing pin 221 provided in the slide holder 22 is inserted into the through hole 209 formed in the engaged member 202, thereby making the pin 210 move backward against the energizing force of the spring 215. Accordingly, the end portion of the stopper pin 218 can be aligned with the small diameter portion of the pin 210 to move inward, that is, the balls 214 can be disengaged from the engagement recess portion 207 against the energizing force of the spring 218. However, since the slide holder 22 which is advanced by the aforementioned slide driving cylinder 107 holds or presses the slide core 23 to the receiving groove 101 of the movable insert 18, the slide core 23 does not come apart from the movable insert 18.

Figure 39:
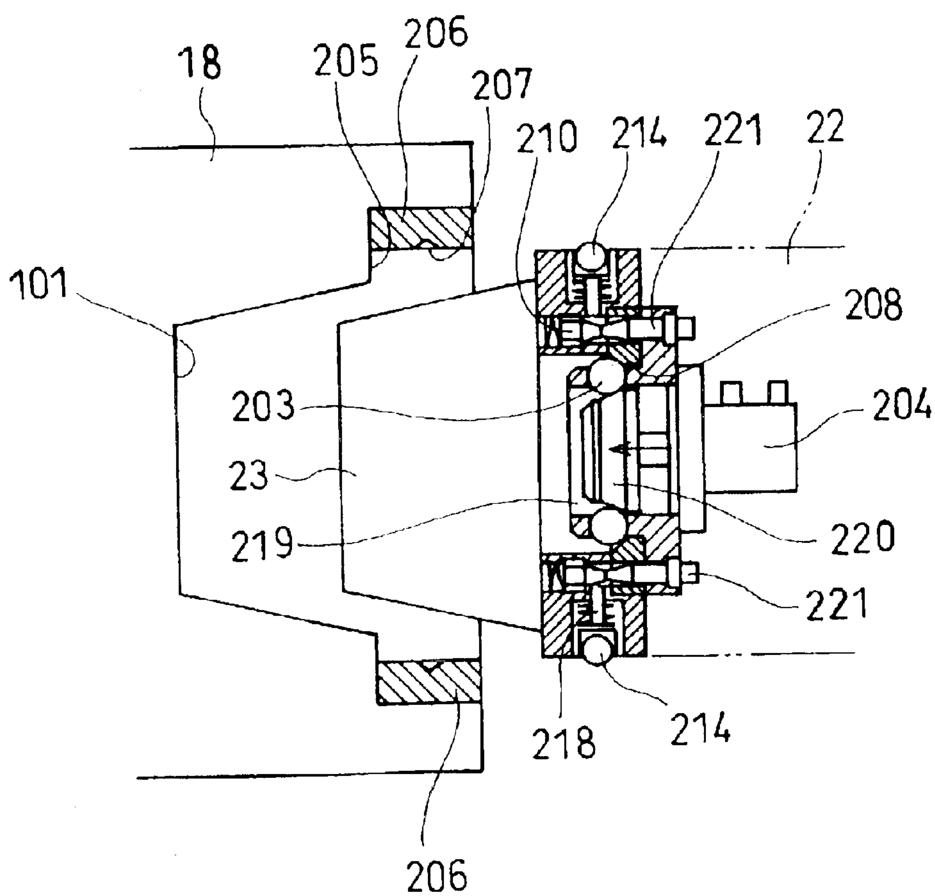
FIG. 39 is a cross sectional view which shows a working state of the attaching and detaching mechanism shown in FIG. 36 in the die open state.

Meanwhile, in the case of performing the normal die casting, at the time of die opening, since the balls 214 can be disengaged from the engagement recess portion 207 of the receiving member 206 as mentioned above by driving the slide holder 22 backward by the aforementioned slide driving cylinder 107 as shown in FIG. 21, the slide core 23 that is rigidly connected to the slide holder 22 comes off from the receiving groove 101 of the movable insert 18 as shown in FIG. 39. In this case, since the slide holder 22 is slidably guided by the slide key (not shown) as mentioned above, the slide holder 22 moves in a fixed attitude. Accordingly, the slide core 23 that is rigidly connected to the slide holder 22 also comes off smoothly from the receiving groove 101 of the movable insert 18 without being inclined longitudinally or laterally, thereby causing no galling between the slide core 23 and the movable insert 18.

Figure 36:
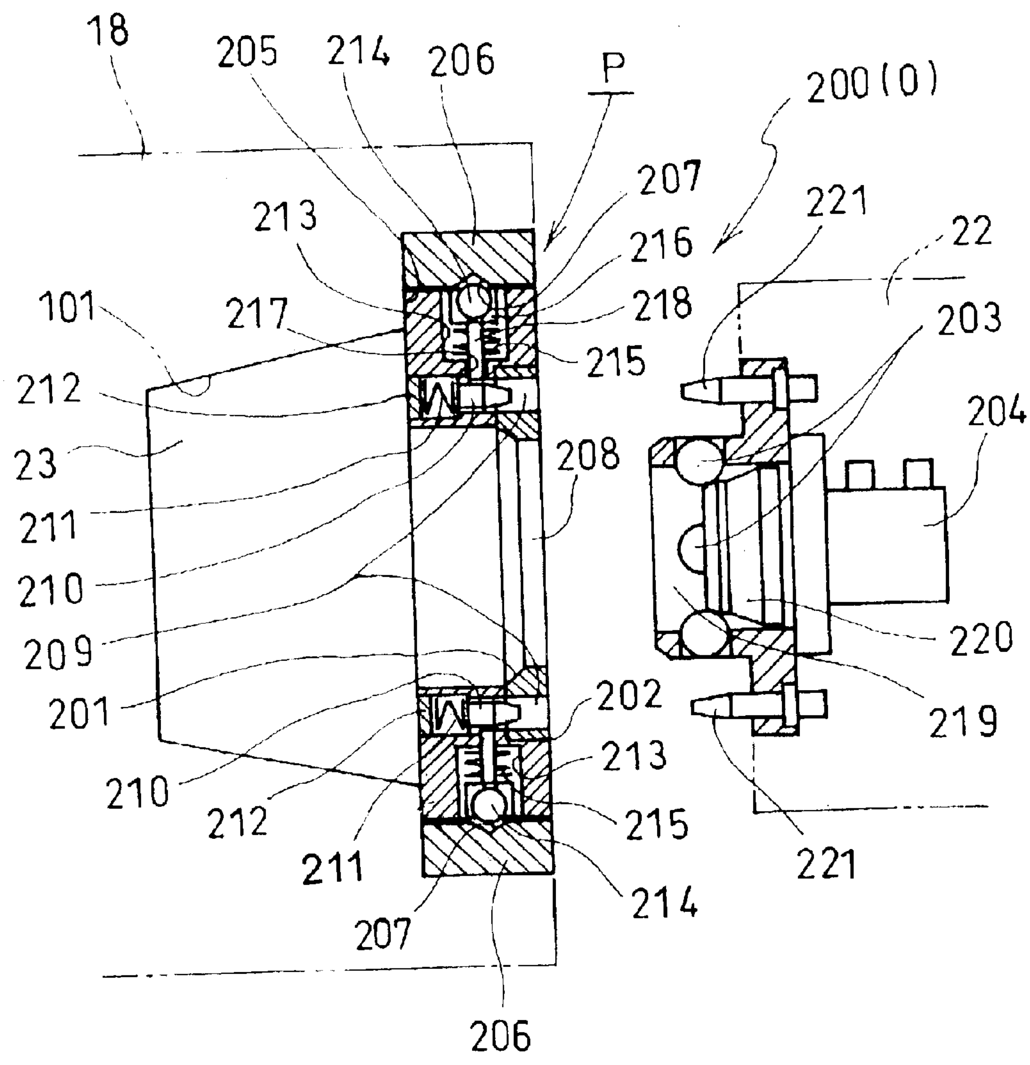
FIG. 36 is a cross sectional view which shows another embodiment of the slide attaching and detaching mechanism.
Figure 37:
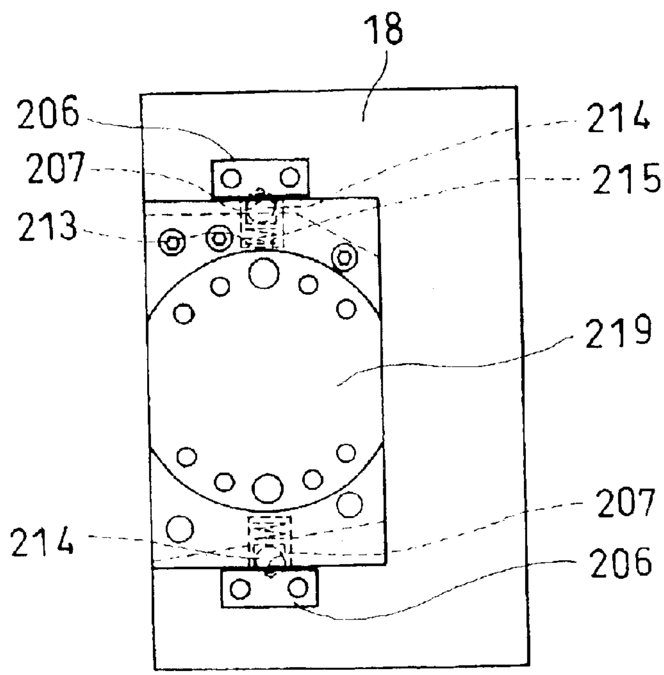
FIG. 37 is a plan view of the attaching and detaching mechanism shown in FIG. 36.

Further, at the time of die changing of the exclusive portion A (the fixed insert 16 and the movable insert 18) including the slide core 23, when separating the slide core 23 from the slide holder 22, the taper member 220 is retracted by the actuator 204 with the engaged member 202 brought into contact with the step portion 214 of the movable insert 18 and the balls 214 being engaged with the engagement recess portion 207 as shown in FIG. 36. Accordingly, the balls 203 held by the connection member 219 integrally formed with the slide holder 22 can move inward. Therefore, the connection member 219 of the slide holder 22 is taken out from the opening portion 208 of the engaged member 202 by retracting the slide holder 22 by the slide driving cylinder 107, thus separating the slide core 23 and the slide holder 22. At this time, since the pressing pin 221 on the slide holder 22 side is removed from the through hole 209 of the engaged member 202, the pin 210 is returned and advanced by the energizing force of the spring 215, and the large diameter portion aligns with the end portion of the stopper pin 218, thereby providing a backup to prevent the balls 214 from moving inward. Therefore, the slide core 23 is taken out of the molding machine integrally with the movable insert 18.

As is understood from the description mentioned above, in order to achieve a smooth insert of the slide core 23 with respect to the movable insert 18, it is desirable to floatably connect the slide core 23 to the slide holder 22 by the aforementioned clamp apparatus 104 (FIG. 17). On the other hand, in order to achieve a smooth separation (retraction) of the slide core 23 from the movable insert 18, it is desirable to rigidly connect the slide core 23 to the slide holder 22 by the aforementioned clamp apparatus 200 (FIG. 36).

Figure 40:
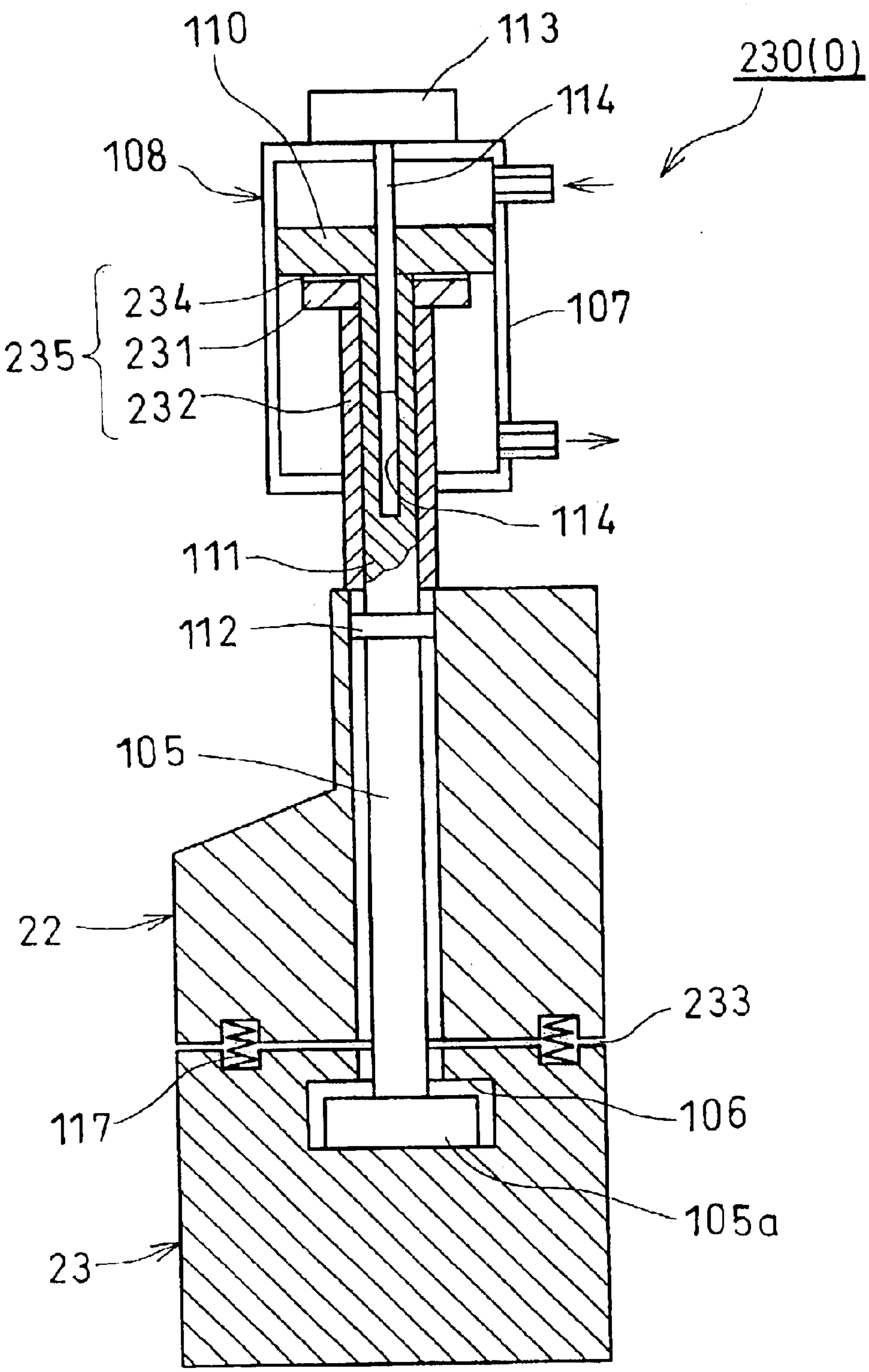
FIG. 40 is a cross sectional view which shows yet another embodiment of the slide attaching and detaching mechanism.
Figure 41:
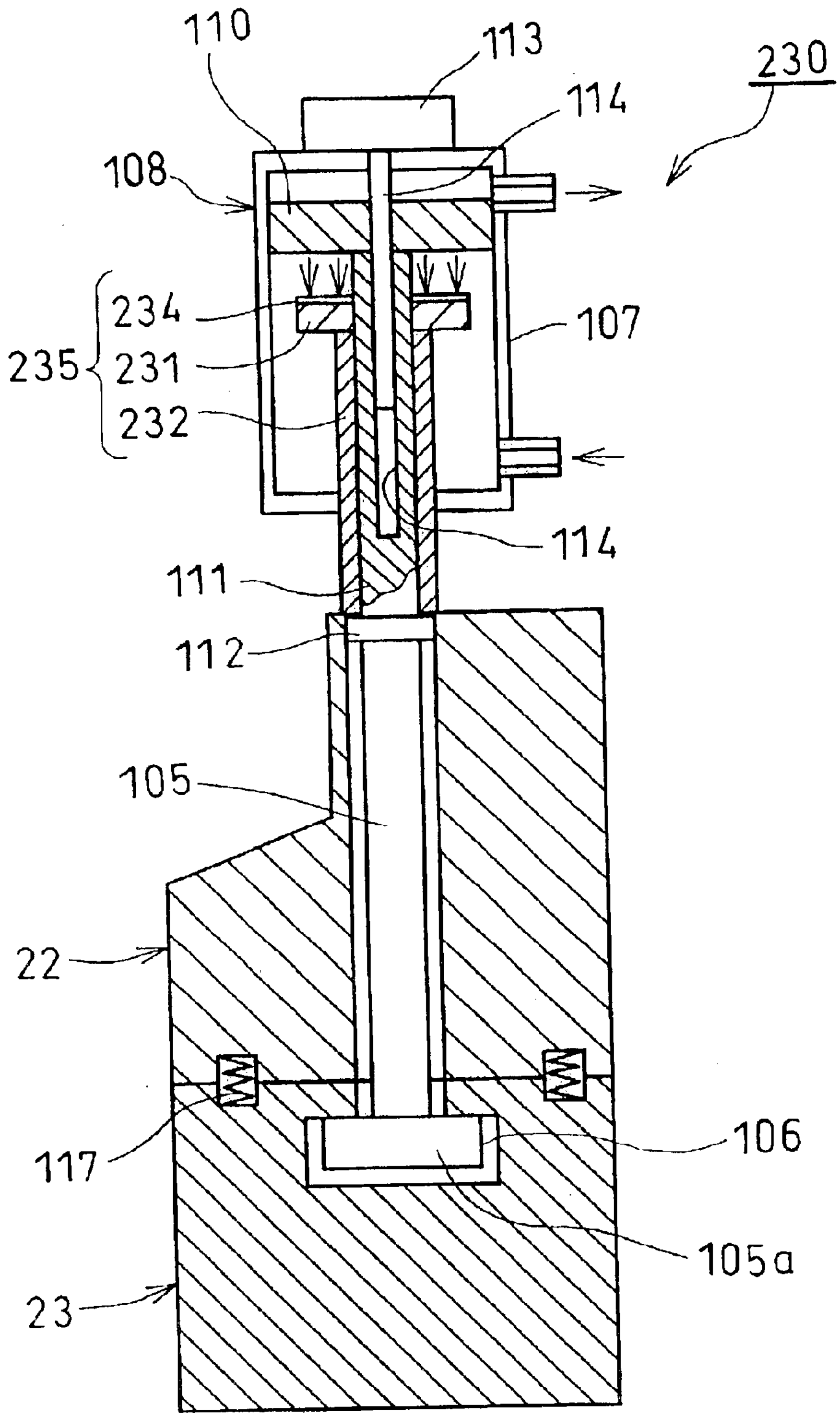
FIG. 41 is a cross sectional view which shows a working state of the slide attaching and detaching mechanism shown in FIG. 40.

FIGS. 40 and 41 show a clamp apparatus (the slide attaching and detaching mechanism O) 230 that satisfies two conditions mentioned above. In this case, since the basic structure of the clamp apparatus 230 is the same as the aforementioned clamp apparatus 104 of the floating type, the same reference numerals are used to the same constituting elements. In this clamp apparatus 230, a sub piston 231 which has a smaller diameter than the piston 110 and a sub rod 232 are arranged within the cylinder 107 constituting the actuator 108 so as to be slidably fitted to the rod 111, and the sub rod 232 is slidably protruded toward the slide holder 22 from the cylinder 107. Further, a length of the sub rod 232 is set so that a small clearance 233 is formed between the slide core 23 and the slide holder 22 in a state in which the piston 110 and the sub piston 231 integrally move while in a mutual contact with each other. Accordingly, a slit 234 is formed on a back surface of the sub piston 231 that contacts with the piston 110, so that the pressure fluid is also circulated to the back surface side of the sub piston 231 through the slit 234 as shown in FIG. 41 when the slide core 23 is retracted. In this case, a point that the rotary shaft 114 extended from the rotary mechanism 113 is inserted into the axial hole 114 provided in the rear end portion of the rod 161 in a relatively-movable and non-relatively-rotatable manner is the same as in the case of the clamp apparatus 104 (FIG. 18).

In the clamp apparatus 230 structured as above, at the time of the die closing in which the slide core 23 is inserted into the receiving groove 101 (FIG. 16) of the movable insert 18, the piston 111 and the sub piston 231 integrally move as shown in FIG. 40, during which the small clearance 233 is formed between the slide core 23 and the slide holder 22. Accordingly, the slide core 23 is floatably connected to the slide holder 22, whereby the slide core 23 is smoothly inserted into the receiving groove 101 of the movable insert 18.

On the other hand, at the time of the die opening after casting, since the pressure fluid is circulated to the back surface side of the sub piston 231 via the slit 234 as shown in FIG. 41, the sub piston 231 moves relatively with the piston 11 due to a difference of pressure receiving area, whereby the slide core 23 bends the elastic member 117 so as to be pressed against the slide holder 2. That is, the slide core 23 is in a state in which it is rigidly connected to the slide holder 22, whereby the slide core 23 is smoothly separated from the receiving groove 101 of the movable insert 18 without being inclined longitudinally or laterally, thereby causing no galling between the slide core 23 and the movable insert 18. Accordingly, the sub piston 231, the sub rod 232 and the slit 234 constitute a sub clamp apparatus 236 which enables and disables a rigid connection between the slide core 23 and the slide holder 22. In accordance with this sub clamp apparatus 235, since a fluid pressure circuit of the cylinder 107 constituting the actuator 108 is utilized, not only is it unnecessary to provide a specific fluid pressure circuit, but also the fluid pressure control is not required. In this case, the pressing force of the slide core 23 against the slide holder 22 can be changed optionally by changing the diameter of the sub piston 231.

Figure 42:
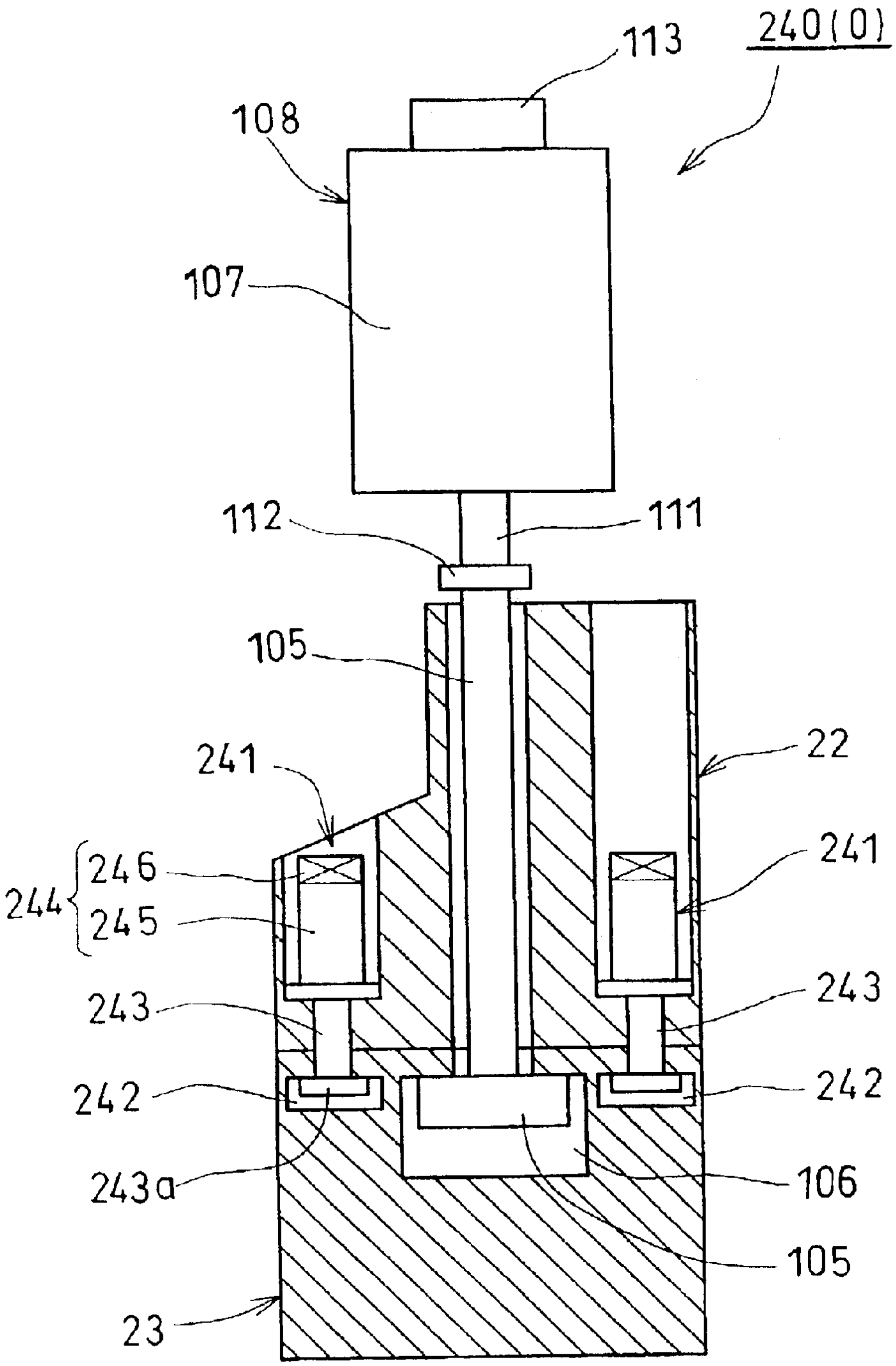
FIG. 42 is a cross sectional view which shows yet another embodiment of the slide attaching and detaching mechanism.

FIG. 42 shows another clamp apparatus (the slide attaching and detaching mechanism O) 240 that satisfies two conditions mentioned above. This clamp apparatus 240 is characterized in that a plurality of sub clamp apparatuses 241 independent from the aforementioned actuator 108 are arranged between the slide holder 22 and the slide core 23.

The sub clamp apparatus 241 is substantially the same as the fixed side clamp apparatus 31 (FIG. 6) mentioned above, and is provided with a T-shaped slot 242 provided in the slide core 23, a T-shaped clamper 243 having a head portion 243*a* engageable with the T-shaped slot 242, and an actuator 244 which is provided in the slide holder 23 and drives the T-shaped clamper 243. The actuator 244 is constituted by a cylinder 245 for extending and contracting the T-shaped clamper 243 and a rotary mechanism 246 for rotating the T-shaped clamper 243.

In the sub clamp apparatus 240 mentioned above, at the time of the die closing in which the slide core 23 is inserted into the receiving groove 101 (FIG. 12) of the movable insert 18, the T-shaped clamper 243 is extended by operating the cylinder 244, thus forming a small clearance between the slide core 23 and the slide holder 22, and therefore the slide core 23 is smoothly inserted into the receiving groove 101 of the movable insert 18 while being floated. On the other hand, at the time of the die opening after casting, the T-shaped clamper 243 is contracted by operating the cylinder 245, thereby attracting the slide core 23 toward the slide holder 22 for rigid connection. Accordingly, the slide core 23 is smoothly separated from the receiving groove 101 of the movable insert 18 without being inclined longitudinally or laterally, thereby causing no galling between the slide core 23 and the movable insert 18. In accordance with this sub clamp apparatus 244, it is possible to attract the slide core 23 to the slide holder 22 by a large force by the independently operated cylinder 246, thus making connection between both elements rigid enough. As a result, the galling can be prevented more securely.

Figure 43:
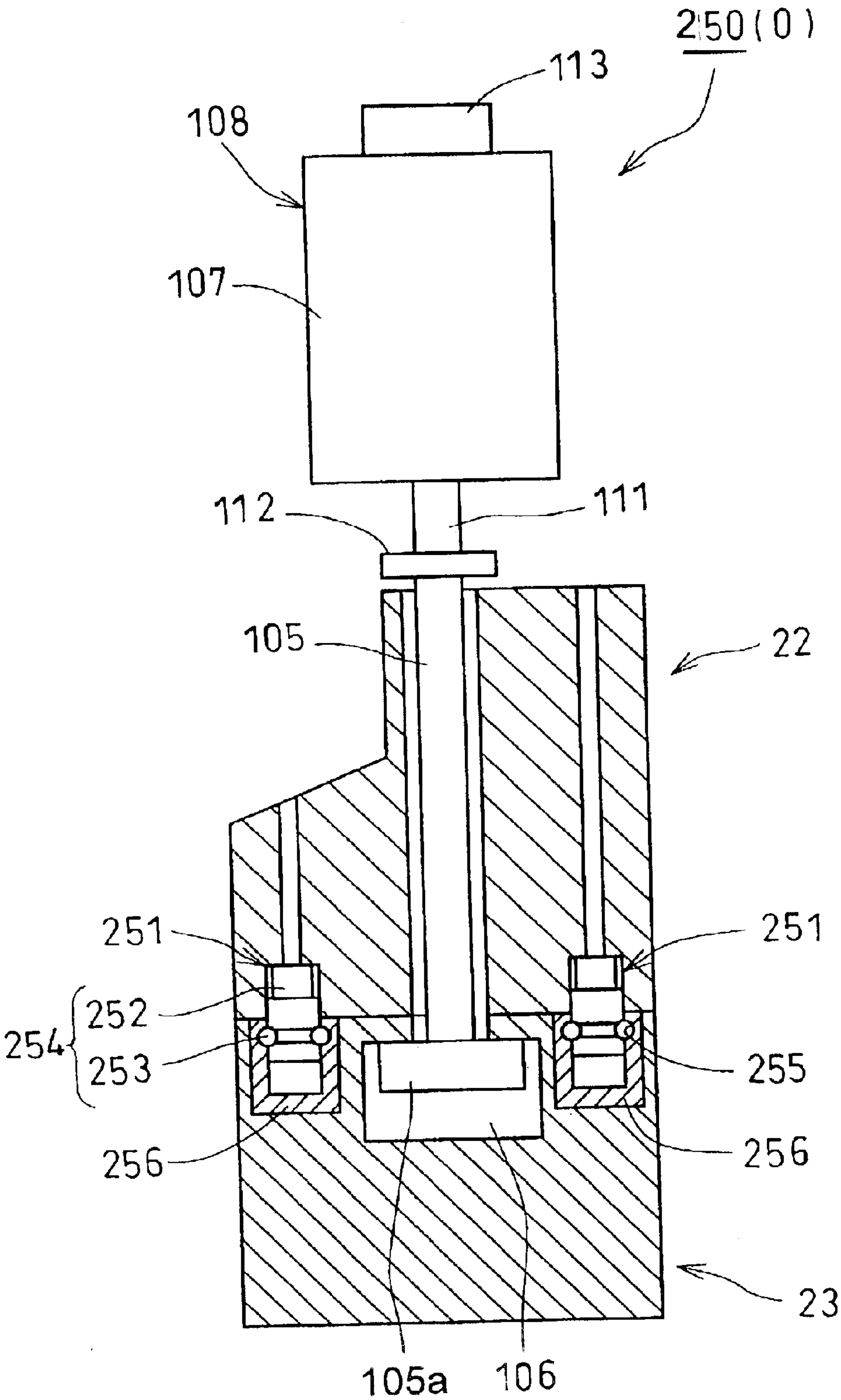
FIG. 43 is a cross sectional view which shows yet another embodiment of the slide attaching and detaching mechanism.

FIG. 43 shows yet another clamp apparatus (the slide attaching and detaching mechanism O) 250 that satisfies two conditions mentioned above. The clamp apparatus 250 is characterized in that a sub clamp apparatus 251 of ball joint type is employed in place of the sub clamp apparatus 241 of cylinder clamper type in the clamp apparatus 240 mentioned above (FIG. 42).

The sub clamp apparatus 251 of ball joint type mentioned above is constituted by a ball driving portion 254 which advances and retracts a plurality of balls 253 in a radial direction by using a cylinder 252 as a drive source, and a female-type member 256 whose inner surface is provided with an engagement recess portion 256 with which the balls 263 are engaged. The ball driving portion 254 is provided in the slide holder 22 and the female-type member 256 is provided in the slide core 22, respectively. A leading end portion of the ball driving portion 254 is inserted into the female-type member 256 in correspondence to the close attachment of the slide holder 22 to the slide core 23. When the cylinder 252 is operated in this state, the balls 253 engage with the engagement recess portion 256 of the female-type member 256, whereby the slide core 23 and the slide holder 22 are rigidly connected.

In the clamp apparatus 250 provided with the sub clamp apparatus 251 as mentioned above, at the time of the die closing, the balls 253 in the ball driving portion 254 are retracted, to form a small clearance between the slide core 23 and the slide holder 22, and thus the slide core 22 is smoothly inserted into the receiving groove 101 (FIG. 12) of the movable insert 18 while being floated. On the contrary, at the time of the die opening after casting, the slide holder 22 is temporarily closely attached to the slide core 22 by operating the cylinder 107 in the actuator 108, and the cylinder 252 in the ball driving portion 254 is operated in this state so as to move the balls 253 outward. Then, the balls 253 engage with the engagement recess portion 255 of the female-type member 256, whereby the slide core 23 and the slide holder 22 are rigidly connected. As a result, the slide core 23 is smoothly separated from the receiving groove 101 of the movable insert 18 without being inclined longitudinally or laterally, thereby causing no galling between the slide core 23 and the movable insert 18. In accordance with this clamp apparatus 250, the slide core 23 can easily be brought into a close contact with the slide holder 22.

In this case, as means for preventing the slide core 1 from inclining at the time of die opening, without depending on the sub clamp apparatuses 235, 241 and 251 or the like mentioned above, a slide key for sliding and guiding the slide core 23 may be provided on the inner surface of the receiving groove 101 (FIG. 12) of the movable insert 18.

Meanwhile, in the case of die casting a large die-cast product with a complex structure such as a cylinder block, a temperature distribution within the cavity is uneven. Accordingly, a blow hole tends to be generated in a high temperature portion due to an air inclusion and the like. Therefore, in the case of obtaining such large die-cast product with a complex structure, in order to prevent generation of the blow hole mentioned above, a pressurizing pin and a driving cylinder thereof are assembled in the die, and the pressurizing pin is pressed into the molten metal at a suitable timing after the molten metal is charged within the cavity. However, in the die structure that is separated into the general portion M and the exclusive portion N as in the present invention, the arrangement of the pressurizing pin and its driving cylinder corresponding to the exclusive portion N becomes a critical issue.

FIGS. 26 and 27 show an embodiment in the case that a pressurizing pin 260 and a driving cylinder (pressurizing cylinder) 261 thereof mentioned above are required. In this case, an arrangement with respect to the slide 14 is shown, however, the same structure is applied in the case of the arrangement with respect to the fixed die 11 and the movable die 12. In the present embodiment, the slide core 23 is separated into two sections comprising a core main body 23A and a spacer block 23B. The pressurizing pin 260 is provided in the core main body 23A and the pressurizing cylinder 261 is provided in the spacer block 23B, respectively. Meanwhile, the slide core 23 and the slide holder 22 are structured so as to be rigidly connected by the clamp apparatus 262 corresponding to the slide attaching and detaching mechanism. In this case, the core main body 23A and the pressurizing pin 260 are connected and integrated by a bolt 263.

More specifically, a pin sliding hole 264 and a guide hole 266 having a larger diameter than the pin sliding hole 264 are coaxially formed in the core main body 23A, and a leading end portion of the pressurizing pin 260 is slidably fitted and inserted into the sliding hole 264 in a state in which a rear end portion of the pressurizing pin 260 is positioned within the guide hole 265. On the other hand, a recess hole 266 is formed in the spacer block 23B, and the pressurizing cylinder 261 is accommodated within the recess hole 266. A rear end of the pressurizing pin 260 is connected to a rod 268 extended from a piston 267 within the pressurizing cylinder 261 by a joint 269. The pressurizing pin 260 forms a retraction end at a position (shown by a two-dot chain line) at which a leading end beveled portion 260*a* is slightly protruded from the pin sliding hole 264, and advances to a position shown by a solid line in FIG. 44 in correspondence to the pressure fluid supply into the pressurizing cylinder 261.

In this case, the aforementioned clamp apparatus 262 is substantially the same as the fixed die side clamp apparatus 31 (FIG. 6) mentioned above, and is provided with a T-shaped slot 270 arranged in the slide core 23, a T-shaped clamper 271 having a head portion 271*a* engageable with the T-shaped slot 270, and an actuator 272 which is disposed in the slide holder 23 and drives the aforementioned T-shaped clamper 271, and the actuator 272 is constituted by a cylinder 273 for extending and contracting the T-shaped clamper 271, and a rotary mechanism 274 for rotating the T-shaped clamper 271.

In the present embodiment, the pressurizing pin 260 and the pressurizing cylinder 261 which are constructed as the exclusive portion N are changed integrally with the slide core 23. Therefore, in the present embodiment, a pipe joint 275 which is attached and detached in correspondence to the attachment and detachment between the slide core 23 (the spacer block 23B) and the slide holder 22 is arranged in a mating portion between a casing 261*a* of the pressurizing cylinder 261 and the slide holder 23. As with the cooling water pipe joint shown in FIGS. 21, 22 or 23, the pipe joint 275 is provided with a male-type member 276 and a female-type member 277 that can be engaged with each other. Here, the male-type member 276 is arranged in the slide core 23, and the female-type member 277 is arranged in the slide holder 22, respectively. In this case, the pressurizing cylinder 261 needs to move the pressurizing pin 260 back and forth. Accordingly, two ports 278 for supplying and discharging the pressure fluid within the pressurizing cylinder 261 are connected to the male-type member 276, and two circuits 279 extended from a fluid pressure source 280 are connected to the female-type member 277, respectively.

Further, in the case that the pressurizing pin 260 is provided, there is a case that the molten metal penetrates into a gap between the pin sliding hole 264 and the pressurizing pin 260, causing malfunction of the pressurizing pin 260, and the pressurizing cylinder 261 may also become defective. As a countermeasure for such problem, in the present embodiment, a vertical groove 281 is formed around the guide hole 265, and a supporting bar 282 extended in an axial radial direction from the rod 268 of the pressurizing cylinder 261 is positioned within the vertical groove 281. Furthermore, a base end of a detection bar 283 extended within the casing 261*a* of the pressurizing cylinder 261 is supported to the supporting bar 282. On the other hand, the slide holder 22 is provided with a proximity switch (sensor) 284 for detecting a leading end of the aforementioned detection bar 283.

Figure 44:
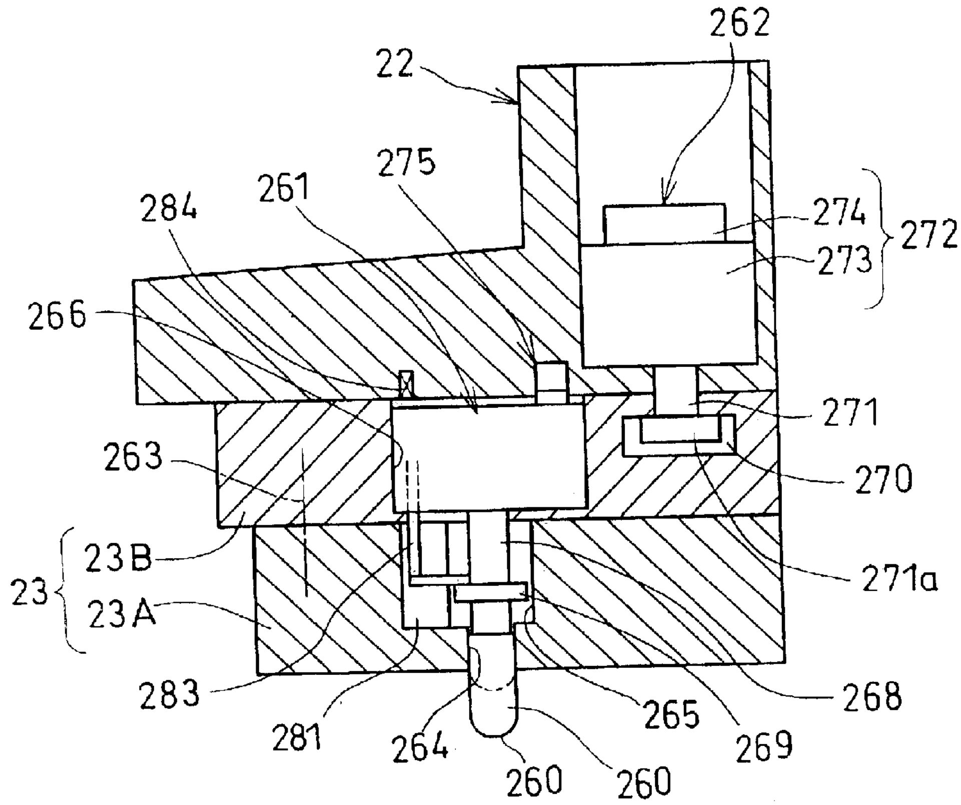
FIG. 44 is a cross sectional view which shows an embodiment in a case that a pressure pin is required.
Figure 45:
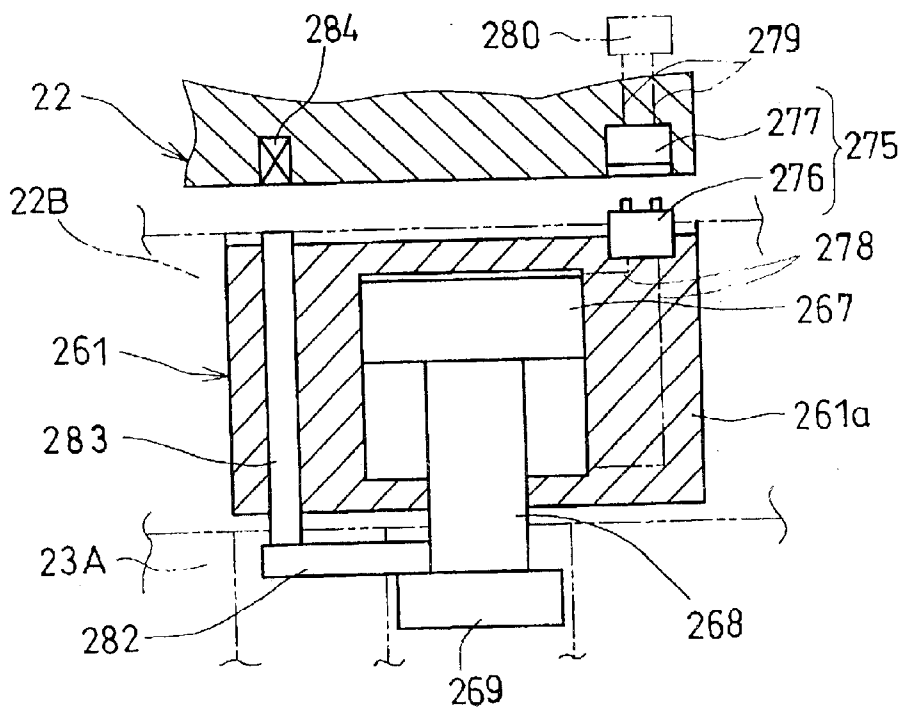
FIG. 45 is a cross sectional view which shows an installation structure of a pressure cylinder for driving the pressure pin and an accessory structure on the periphery thereof.

In the injection molding die structured as above, when performing normal die casting, as shown in FIGS. 44 and 45, the slide core 23 is rigidly connected to the slide holder 22 by the clamp apparatus 262, and the pressure fluid can be supplied to and discharged from the pressurizing cylinder 261 from the slide holder 22 side via the pipe joint 275. Then, the molten metal is charged within the cavity in the die clamping state mentioned above and when solidification has proceeded a little, the pressure fluid is supplied to the pressurizing cylinder 261, thus extending the rod 268. Accordingly, the pressurizing pin 260 advances from the retraction end, and the molten metal is locally pressurized. Thereafter, when the solidification has proceeded adequately, the pressure fluid is supplied in reverse to the pressurizing cylinder 261, thus contracting the rod 268. Accordingly, the pressurizing pin 260 comes off from the molded product. At this time, the detection rod 283 moves in the returning direction in accordance with the contraction motion of the rod 268, and when the pressurizing pin 260 is returned to the normal state, the leading end of the detection rod 283 is detected by the proximity switch 284 (in this case, the switch is turned off). On the other hand, in the case that the returning of the pressurizing pin 260 is incomplete due to the molten metal penetration, the pressurizing cylinder 261 defect and the like, the proximity switch 284 is turned on, indicating that the malfunction has occurred.

Meanwhile, at the time of die changing, the T-shaped clamper 271 becomes separable from the T-shaped slot 270 of the slide core 23 (the spacer block 23B) by the operation of the actuator 272 in the clamp apparatus 262. Further, the slide holder 22 comes apart from the slide core 23 by the subsequent operation of the cylinder 107 (FIG. 18) and retracts to a standby position. At the same time, the male-type member 276 and the female-type member 277 which constitute the pipe joint 272 are also separated. The fixed insert 16, the movable insert 18, the pressing plate 21 of the pressing means 13 and the like which correspond to the exclusive portion N is separated from the general portion M in the manner mentioned above. The exclusive portion N including the slide core 23 is changed integrally, that is, in the form of the exclusive portion assembly NN. Accordingly, at this time, the pressurizing pin 260 and the pressurizing cylinder 261 are changed integrally.

What is claimed is:

1. A molding die comprising:

a commonly formed general portion mounted in a molding machine; and an exclusive portion forming a cavity supported on an attaching and detaching mechanism, said attaching and detaching mechanism being capable of automatically attaching and detaching said exclusive portion and said general portion on said molding machine wherein each of a fixed die and a movable die fits an insert corresponding to the exclusive portion to a recess portion provided in a main die corresponding to the general portion, and the attaching and detaching mechanism is arranged between a bottom portion of the recess portion in the main die and a back surface portion of the insert, and wherein the attaching and detaching mechanism comprises a clamp apparatus which engages and inserts a generally T-shaped clamper extended from each main die into a generally T-shaped slot provided in a back surface portion of the corresponding insert within the recess portion of the main die.

2. A molding die as claimed in claim 1, wherein at least the recess portion of the main die and a portion of the insert part that is fitted to the recess portion are formed in a rectangular shape, a wedge member is floatably arranged along two adjacent wall surfaces within the recess portion of the main die in a fitting direction, a taper surface formed on a side surface of the insert is wedged to the wedge member, and remaining two surfaces of the insert are closely contacted with remaining two wall surfaces within the recess portion.

3. A molding die as claimed in claim 1, wherein at least the insert on the movable die side is provided with pressing guide means which elastically contacts a wall surface of the recess portion in the corresponding main die.

4. A molding die as claimed in claim 1, wherein a high hardness material is arranged on a portion, where galling is easily generated, of an inner wall surface of the recess portion in the main die.

5. A molding die as claimed in claim 1, wherein in case of including a pressing means for knocking out a molded product, the pressing means comprises a pressing rod corresponding to the general portion, and a pressing plate, on which a pressing pin stands erect, corresponding to the exclusive portion, the pressing rod is arranged so as to penetrate the main die on the movable die side, and the pressing plate is arranged between the insert and the main die on the movable die side.

6. A molding die as claimed in claim 5, wherein a pressing means attaching and detaching mechanism is constituted by a ball lock mechanism, and the ball lock mechanism has a built-in actuator.

7. A molding die as claimed in claim 1, wherein in case that a cooling water passage is provided in the exclusive portion, a pipe joint, which communicates the cooling water passage with a water passage within the general portion or shuts off the communication in correspondence to the attachment and detachment of the exclusive portion with respect to the general portion, is arranged between the general portion and the exclusive portion.

8. A molding die as claimed in claim 1, wherein in case that the exclusive portion includes a core pin, an elastic ring which is frictionally in contact with the core pin so as to restrict the core pin from coming off is attached to an inner surface of an insertion hole of the core pin provided in the exclusive portion.

9. A molding die as claimed in claim 1, wherein in case that the exclusive portion includes a pressurizing pin, a cylinder for driving the pressurizing pin is embedded in the exclusive portion, and a pipe joint, which communicates the cylinder with a fluid pressure source or shuts off the communication in correspondence to the attachment and detachment of the exclusive portion with respect to the general portion, is arranged between the exclusive portion and the general portion.

10. A molding die as claimed in claim 9, wherein the general portion is provided with a sensor which detects a detection rod interlocking with a piston within a fluid pressure cylinder so as to detect a retraction end of the pressurizing pin.

11. A molding die as claimed in claim 1, further comprising a connection mechanism closing the die and attaching the exclusive portion to the general portion.

12. A molding die comprising:

a commonly formed general portion mounted in a molding machine; and an exclusive portion forming a cavity supported on an attaching and detaching mechanism, said attaching and detaching mechanism being capable of automatically attaching and detaching said exclusive portion and said general portion on said molding machine, wherein in case of including a slide which moves in a direction intersecting a die clamping direction, the slide comprises a slide holder corresponding to the general portion and a slide core corresponding to the exclusive portion, and wherein a slide attaching and detaching mechanism comprises a floating type clamp apparatus which connects the slide core and the slide holder in a floatable manner.

13. A molding die as claimed in claim 12, further comprising a sub clamp apparatus which enables and disables a rigid connection between the slide core and the slide holder.

14. A molding die as claimed in claim 12, wherein the slide core is provided with a stopper means which is engaged with an other exclusive portion so as to regulate an insertion position of the slide core.

15. A molding die as claimed in claim 12, wherein the slide attaching and detaching mechanism is constituted by a rigid connection type clamp apparatus which rigidly connects the slide core and the slide holder.

16. A molding die as claimed in claim 15, wherein the rigid connection type clamp apparatus is provided with an engaged member which is provided in the slide core, an engagement member which is provided in the slide holder so as to be freely engaged and disengaged with respect to the engaged member, and an actuator which is provided in the slide holder and engages and disengages the engagement member with respect to the engaged member.

17. A molding die as claimed in claim 16, wherein the engaged member commonly serves as a stopper which is engaged with the other exclusive portion so as to regulate an insertion position of the slide core.

18. A molding die as claimed in claim 12, wherein the floating type clamp apparatus is provided with a T-shaped slot which is provided in the slide core, a T-shaped clamper which is provided in the slide holder and has a leading end portion engageable with the T-shaped slot, and an actuator which makes the T-shaped clamper linearly move and rotate around an axis so as to engage and disengage the leading end portion with respect to the T-shaped slot.

19. A molding die as claimed in claim 18, wherein the actuator commonly uses a slide driving cylinder.

* * * * *